US011648542B2

(12) United States Patent
Masuda et al.

(10) Patent No.: US 11,648,542 B2
(45) Date of Patent: *May 16, 2023

(54) FUNCTIONAL STRUCTURAL BODY AND METHOD FOR MAKING FUNCTIONAL STRUCTURAL BODY

(71) Applicants: NATIONAL UNIVERSITY CORPORATION HOKKAIDO UNIVERSITY, Sapporo (JP); FURUKAWA ELECTRIC CO., LTD., Tokyo (JP)

(72) Inventors: Takao Masuda, Sapporo (JP); Yuta Nakasaka, Sapporo (JP); Takuya Yoshikawa, Sapporo (JP); Sadahiro Kato, Tokyo (JP); Masayuki Fukushima, Tokyo (JP); Kojiro Inamori, Tokyo (JP); Hiroko Takahashi, Tokyo (JP); Yuichiro Banba, Tokyo (JP); Kaori Sekine, Tokyo (JP)

(73) Assignees: NATIONAL UNIVERSITY CORPORATION HOKKAIDO UNIVERSITY, Sapporo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,679

(22) Filed: Nov. 27, 2019

(65) Prior Publication Data
US 2020/0114341 A1 Apr. 16, 2020

Related U.S. Application Data

(63) Continuation of application No. PCT/JP2018/021078, filed on May 31, 2018.

(30) Foreign Application Priority Data

May 31, 2017 (JP) .............................. JP2017-108583

(51) Int. Cl.
*B01J 29/76* (2006.01)
*B01J 29/14* (2006.01)
(Continued)

(52) U.S. Cl.
CPC ......... *B01J 29/7669* (2013.01); *B01J 29/035* (2013.01); *B01J 29/0352* (2013.01);
(Continued)

(58) Field of Classification Search
CPC ............... B01J 29/035; B01J 29/0352; B01J 29/0354; B01J 29/0356; B01J 29/0358; B01J 29/064; B01J 29/068; B01J 29/072; B01J 29/076; B01J 29/085; B01J 29/10; B01J 29/12; B01J 29/14; B01J 29/16; B01J 29/185; B01J 29/20; B01J 29/22; B01J 29/24; B01J 29/26; B01J 29/42; B01J 29/44; B01J 29/46; B01J 29/48; B01J 29/405; B01J 29/605; B01J 29/61; B01J 29/62; B01J 29/63; B01J 29/64; B01J 29/655; B01J 29/66; B01J 29/67; B01J 29/68; B01J 29/69; B01J 29/7007; B01J 29/7057; B01J 29/7038; B01J 29/7088; B01J 29/7615; B01J 29/7676; B01J 29/7815; B01J 29/7876; B01J 29/7415; B01J 29/7215; B01J 29/7476; B01J 29/7276; B01J 29/76; B01J 29/7669; B01J 2229/22; B01J 2229/40; B01J 2229/38; B01J 2229/126; B01J 2229/186; B01J 2229/14; B01J 2229/20; B01J 2229/32; B01J 2229/34; B01J 35/006; B01J 35/0006; B01J 35/0066; B01J 35/026;
(Continued)

(56) References Cited

U.S. PATENT DOCUMENTS 3,898,180 A * 8/1975 Crooks .................. C10G 45/04
502/240
4,552,855 A 11/1985 Ozin et al.
(Continued)

FOREIGN PATENT DOCUMENTS

AU 2012324802 A1 6/2014
CA 2256515 A1 12/1997
(Continued)

OTHER PUBLICATIONS

Do et al., "Zeolite Nanoclusters Coated onto the Mesopore Walls of SBA-15", J. Am. Cham. Soc. 2004, 126, pp. 14324-14325.*
4th Office Action dated May 7, 2021 in the corresponding AU application No. 2018277966.
English machine translation of JP 2000-511107 A, entitled "Metal-containing zeolite catalyst, its preparation and use for the conversion of hydrocarbons".
English machine translation of JPH0796195 A, entitled "Exhaust Gas Purification Catalyst" dated Sep. 29, 1993.
(Continued)

*Primary Examiner* — Elizabeth D Wood
(74) *Attorney, Agent, or Firm* — Dorsey & Whitney LLP

(57) ABSTRACT

To provide a functional structural body that can realize ong life time by suppressing the decline in function of the functional substance and that can attempt to save resources without requiring a complicated replacement operation, and to provide a method for making the functional structural body. The functional structural body (1) includes a skeletal body (10) of a porous structure composed of a zeolite-type compound, and at least one functional substance (20) present in the skeletal body (10), the skeletal body (10) has channels (11) connecting with each other, and the functional substance is present at least the channels (11) of the skeletal body (10).

15 Claims, 4 Drawing Sheets

(51) Int. Cl.
| | |
|---|---|
| B01J 29/68 | (2006.01) |
| B01J 35/00 | (2006.01) |
| B01J 35/04 | (2006.01) |
| B01J 35/10 | (2006.01) |
| B01J 37/02 | (2006.01) |
| B01J 37/03 | (2006.01) |
| B01J 37/10 | (2006.01) |
| B01J 29/035 | (2006.01) |
| B01J 29/068 | (2006.01) |
| B01J 29/064 | (2006.01) |
| B01J 29/16 | (2006.01) |
| B01J 29/18 | (2006.01) |
| B01J 29/076 | (2006.01) |
| B01J 29/12 | (2006.01) |
| B01J 29/072 | (2006.01) |
| B01J 29/10 | (2006.01) |
| B01J 29/22 | (2006.01) |
| B01J 29/08 | (2006.01) |
| B01J 29/20 | (2006.01) |
| B01J 29/26 | (2006.01) |
| B01J 29/61 | (2006.01) |
| B01J 29/24 | (2006.01) |
| B01J 29/42 | (2006.01) |
| B01J 29/62 | (2006.01) |
| B01J 29/60 | (2006.01) |
| B01J 29/46 | (2006.01) |
| B01J 29/40 | (2006.01) |
| B01J 29/48 | (2006.01) |
| B01J 29/44 | (2006.01) |
| B01J 29/65 | (2006.01) |
| B01J 29/64 | (2006.01) |
| B01J 29/69 | (2006.01) |
| B01J 29/70 | (2006.01) |
| B01J 29/67 | (2006.01) |
| B01J 29/63 | (2006.01) |
| B01J 29/66 | (2006.01) |
| B01J 29/72 | (2006.01) |
| B01J 29/78 | (2006.01) |
| B01J 29/74 | (2006.01) |

(52) U.S. Cl.
CPC ....... *B01J 29/0354* (2013.01); *B01J 29/0356* (2013.01); *B01J 29/0358* (2013.01); *B01J 29/064* (2013.01); *B01J 29/068* (2013.01); *B01J 29/072* (2013.01); *B01J 29/076* (2013.01); *B01J 29/085* (2013.01); *B01J 29/10* (2013.01); *B01J 29/12* (2013.01); *B01J 29/14* (2013.01); *B01J 29/16* (2013.01); *B01J 29/185* (2013.01); *B01J 29/20* (2013.01); *B01J 29/22* (2013.01); *B01J 29/24* (2013.01); *B01J 29/26* (2013.01); *B01J 29/405* (2013.01); *B01J 29/42* (2013.01); *B01J 29/44* (2013.01); *B01J 29/46* (2013.01); *B01J 29/48* (2013.01); *B01J 29/605* (2013.01); *B01J 29/61* (2013.01); *B01J 29/62* (2013.01); *B01J 29/63* (2013.01); *B01J 29/64* (2013.01); *B01J 29/655* (2013.01); *B01J 29/66* (2013.01); *B01J 29/67* (2013.01); *B01J 29/68* (2013.01); *B01J 29/69* (2013.01); *B01J 29/7007* (2013.01); *B01J 29/7038* (2013.01); *B01J 29/7057* (2013.01); *B01J 29/7088* (2013.01); *B01J 29/7215* (2013.01); *B01J 29/7276* (2013.01); *B01J 29/7415* (2013.01); *B01J 29/7476* (2013.01); *B01J 29/76* (2013.01); *B01J 29/7615* (2013.01); *B01J 29/7676* (2013.01); *B01J 29/7815* (2013.01); *B01J 29/7876* (2013.01); *B01J 35/0013* (2013.01); *B01J 35/04* (2013.01); *B01J 35/1057* (2013.01); *B01J 35/1061* (2013.01); *B01J 37/0203* (2013.01); *B01J 37/0236* (2013.01); *B01J 37/033* (2013.01); *B01J 37/10* (2013.01); *B01J 2229/22* (2013.01); *B01J 2229/38* (2013.01); *B01J 2229/40* (2013.01); *C10G 2300/70* (2013.01)

(58) Field of Classification Search
CPC .................. B01J 35/023; B01J 35/0073; B01J 35/0046; B01J 35/1057; B01J 37/0018; B01J 37/0072; B01J 37/0201; B01J 37/0207; B01J 37/0203; B01J 37/0205; B01J 37/0236; B01J 37/10; B01J 37/105; C10G 2300/70
USPC ........ 502/60, 63, 64, 65, 66, 69, 71, 73, 74, 502/77, 78, 79
See application file for complete search history.

(56) References Cited

U.S. PATENT DOCUMENTS

| | | |
|---|---|---|
| 5,236,575 A | 8/1993 | Bennett et al. |
| 5,275,720 A | 1/1994 | Ward |
| 5,849,652 A | 12/1998 | Davies et al. |
| 6,040,259 A | 3/2000 | Mohr et al. |
| 6,831,203 B1 | 12/2004 | Mohr et al. |
| 6,881,703 B2 | 4/2005 | Cutler et al. |
| 7,592,291 B2 | 9/2009 | Rollins et al. |
| 7,893,311 B2 | 2/2011 | Takamatsu et al. |
| 11,161,101 B2 * | 11/2021 | Kato ..................... B01J 23/464 |
| 2003/0109383 A1 | 6/2003 | Koike et al. |
| 2003/0188991 A1 | 10/2003 | Shan et al. |
| 2004/0176245 A1 | 9/2004 | Hagemeyer et al. |
| 2004/0192947 A1 | 9/2004 | Chane-ching et al. |
| 2005/0201920 A1 | 9/2005 | Shan et al. |
| 2006/0216227 A1 | 9/2006 | Idem et al. |
| 2007/0004593 A1 | 1/2007 | Ohno et al. |
| 2007/0167551 A1 | 7/2007 | Goodwin et al. |
| 2008/0045400 A1 | 2/2008 | Rollins et al. |
| 2008/0045403 A1 | 2/2008 | Rollins et al. |
| 2008/0051280 A1 | 2/2008 | Hagemeyer et al. |
| 2008/0072705 A1 | 3/2008 | Chaumonnot et al. |
| 2008/0280754 A1 | 11/2008 | Toledo et al. |
| 2008/0293990 A1 | 11/2008 | Stevenson et al. |
| 2009/0286677 A1 | 11/2009 | Takeshima et al. |
| 2009/0325790 A1 | 12/2009 | Haller et al. |
| 2010/0004118 A1 | 1/2010 | Liu et al. |
| 2011/0085944 A1 | 4/2011 | Rolllins et al. |
| 2011/0092356 A1 | 4/2011 | Rollins et al. |
| 2011/0092745 A1 | 4/2011 | Senoo et al. |
| 2011/0121238 A1 | 5/2011 | Wakatsuki |
| 2011/0293941 A1 | 12/2011 | Chaumonnot et al. |
| 2012/0060472 A1 | 3/2012 | Li et al. |
| 2012/0130138 A1 | 5/2012 | Yamaguchi et al. |
| 2012/0142238 A1 | 6/2012 | Saitou et al. |
| 2012/0231948 A1 | 9/2012 | Saito |
| 2013/0090445 A1 | 4/2013 | Hattori et al. |
| 2014/0021096 A1 | 1/2014 | Chaumonnot et al. |
| 2014/0128246 A1 | 5/2014 | Garcia-martinez |
| 2014/0147362 A1 | 5/2014 | Sasaki et al. |
| 2014/0284524 A1 | 9/2014 | Lee et al. |
| 2014/0303266 A1 * | 10/2014 | Hyman .................. B01J 29/146 502/79 |
| 2015/0018590 A1 | 1/2015 | Stevenson et al. |
| 2015/0290635 A1 | 10/2015 | Inokawa et al. |
| 2015/0367332 A1 | 12/2015 | Kuvettu et al. |
| 2016/0017238 A1 | 1/2016 | Stamires et al. |
| 2016/0023913 A1 | 1/2016 | Goel et al. |
| 2016/0030934 A1 | 2/2016 | Zhan et al. |
| 2016/0032202 A1 | 2/2016 | Yonemura et al. |
| 2016/0114314 A1 | 4/2016 | Ali et al. |
| 2016/0137516 A1 | 5/2016 | Kegnæs et al. |

(56) References Cited

U.S. PATENT DOCUMENTS

| | | |
|---|---|---|
| 2016/0369174 A1 | 12/2016 | Kool et al. |
| 2017/0036197 A1 | 2/2017 | Kegnæs et al. |
| 2018/0194700 A1 | 7/2018 | Pan et al. |
| 2019/0039056 A1 | 2/2019 | Kato et al. |
| 2020/0094229 A1 | 3/2020 | Masuda et al. |
| 2020/0094232 A1 | 3/2020 | Masuda et al. |
| 2020/0108374 A1 | 4/2020 | Masuda et al. |
| 2020/0108378 A1 | 4/2020 | Masuda et al. |
| 2020/0114335 A1 | 4/2020 | Masuda et al. |
| 2020/0114336 A1 | 4/2020 | Masuda et al. |
| 2020/0114337 A1 | 4/2020 | Masuda et al. |
| 2020/0114338 A1 | 4/2020 | Masuda et al. |
| 2020/0114339 A1 | 4/2020 | Masuda et al. |
| 2020/0115248 A1 | 4/2020 | Masuda et al. |
| 2020/0115640 A1 | 4/2020 | Masuda et al. |
| 2020/0254432 A1 | 8/2020 | Shirman et al. |

FOREIGN PATENT DOCUMENTS

| | | |
|---|---|---|
| CN | 1223602 A | 7/1999 |
| CN | 1720098 A | 1/2006 |
| CN | 1729138 A | 2/2006 |
| CN | 101130466 A | 2/2008 |
| CN | 101180125 A | 5/2008 |
| CN | 101362959 A | 2/2009 |
| CN | 101720252 A | 6/2010 |
| CN | 101909750 A | 12/2010 |
| CN | 102056869 A | 5/2011 |
| CN | 102099114 A | 6/2011 |
| CN | 102247887 A | 11/2011 |
| CN | 102574120 A | 7/2012 |
| CN | 103459012 A | 12/2013 |
| CN | 103663490 A | 3/2014 |
| CN | 103889577 A | 6/2014 |
| CN | 104650291 A | 5/2015 |
| CN | 105347359 A | 2/2016 |
| CN | 106362787 A | 2/2017 |
| EP | 0485180 A1 | 5/1992 |
| EP | 1709125 A1 | 10/2006 |
| EP | 2484444 A1 | 8/2012 |
| EP | 2692439 A1 | 2/2014 |
| JP | S5746925 A | 3/1982 |
| JP | H0549943 A * | 3/1993 |
| JP | H06-142456 A | 5/1994 |
| JP | H07-096195 A | 4/1995 |
| JP | H08155303 A | 6/1996 |
| JP | H1133412 A | 2/1999 |
| JP | H11151440 A | 6/1999 |
| JP | 2000197822 A | 7/2000 |
| JP | 200511107 A | 8/2000 |
| JP | 2000323164 A | 11/2000 |
| JP | 2002255537 A | 9/2002 |
| JP | 2002336704 A | 11/2002 |
| JP | 2004528158 A | 9/2004 |
| JP | 2005170903 A | 6/2005 |
| JP | 2005189586 A | 7/2005 |
| JP | 2005270734 A | 10/2005 |
| JP | 2005314208 A | 11/2005 |
| JP | 2006021994 A | 1/2006 |
| JP | 2007130525 A | 5/2007 |
| JP | 2007519799 A | 7/2007 |
| JP | 2008012382 A | 1/2008 |
| JP | 2008542177 A | 11/2008 |
| JP | 2009505830 A | 2/2009 |
| JP | 2009255014 A | 11/2009 |
| JP | 2010501496 A | 1/2010 |
| JP | 2010099638 a | 5/2010 |
| JP | 2010527769 A | 8/2010 |
| JP | 2011517439 A | 6/2011 |
| JP | 4879574 B2 | 2/2012 |
| JP | 2012153654 A | 8/2012 |
| JP | 2012170951 A | 9/2012 |
| JP | 2012210557 A | 11/2012 |
| JP | 2013255911 A | 12/2013 |
| JP | 2014104428 A | 6/2014 |
| JP | 2014534902 A | 12/2014 |
| JP | 5700376 B2 | 4/2015 |
| JP | 2015165138 A | 9/2015 |
| JP | 2015189586 A | 11/2015 |
| JP | 2016002527 A | 1/2016 |
| JP | 2016064407 A | 4/2016 |
| JP | 2016069318 A | 5/2016 |
| JP | 2016087522 A | 5/2016 |
| JP | 2016529190 A | 9/2016 |
| JP | 2017039218 A | 2/2017 |
| JP | 2017064647 A | 4/2017 |
| JP | 2017509732 A | 4/2017 |
| JP | 2017128480 A | 7/2017 |
| WO | 9745197 A1 | 12/1997 |
| WO | 2005083014 A1 | 9/2005 |
| WO | 2007000847 A1 | 1/2007 |
| WO | 2007023558 A1 | 3/2007 |
| WO | 2009096548 A1 | 8/2009 |
| WO | 2010097108 A1 | 9/2010 |
| WO | 2010097224 A2 | 9/2010 |
| WO | 2011065194 A1 | 6/2011 |
| WO | 2012105581 A1 | 8/2012 |
| WO | 2012170421 A1 | 12/2012 |
| WO | 2013057319 A2 | 4/2013 |
| WO | 2013115213 A1 | 8/2013 |
| WO | 2014083772 A1 | 6/2014 |
| WO | 2014132367 A1 | 9/2014 |
| WO | 2015001123 A1 | 1/2015 |
| WO | 2015155216 A1 | 10/2015 |
| WO | 2016014691 A1 | 1/2016 |
| WO | 2016181622 A1 | 11/2016 |
| WO | 2017000427 A1 | 1/2017 |
| WO | 2017072698 A1 | 5/2017 |

OTHER PUBLICATIONS https://sites.engineering.ucsb.edu/~jbraw/chemreacfun/ch7/slides-masswrxn-2up.pdf, College of Engineering, UC Santa Barbara accessed Apr. 26, 2021.

Office Action for AU Application No. 2018277966, dated Mar. 19, 2021.

Dai, Chengyi et al., "Hollow zeolite-encapsulated Fe—Cu bimetallic catalysts for phenol degradation", Catalysis Today, Elsevier, Amsterdam, NL. vol. 297, Feb. 7, 2007 (Feb. 7, 2017), pp. 335-343, XP085215768, ISSN: 0920-5861, DOI: 10.1016/J.CATTOD.2017.02.001.

Li, Shiwen et al., "Diffusion Driven Selectivity in Oxidation of Co in Presence of Propylene Using Zeolite Nano Shell as Membrane", ACS Catalysis, vol. 4, No. 12, Dec. 2014, pp. 4299-4303.

Li, Shiwen et al., "Diffusion-Driven Selectivity in Oxidation of Co in the Presence of Propylene Using Zeolite Nano Shell as Membrane", ACS Catalysis, vol. 4, No. 12, Nov. 2014.

Office Action for AU Application No. 2018277966, dated May 8, 2020.

English machine translation of CN 106362787 A, entitled "Preparation method for zeolite-immobilized photocatalyst" dated Feb. 1, 2017.

English machine translation of JP 2002255537 A entitled "Solid Acid Catalyst" dated Sep. 11,2002.

English machine translation of JP 2005314208 A entitled "Combined Porous Body and Its Manufacturing Method and Organic Substance Converting Method Using the Same" dated Nov. 10, 2005.

English machine translation of JP 2012170951 A entitled "Photocatalyst-Adsorbent Composite Powder" dated Sep. 10, 2012.

English machine translation of JP 2015165138 A entitled "Exhaust Gas Emission Control Device" dated Sep. 17, 2015.

English machine translation of JP 2016069318 A entitled "Storing Method for Secondary Alcohol and Loaded Body" dated May 9, 2016.

English machine translation of JP 2017128480 A entitled "Zeolite Including Metal Particle" dated Jul. 27, 2017.

English machine translation of JP H0549943A entitled "Oxidizing Catalyst" dated Mar. 2, 1993.

(56) References Cited

OTHER PUBLICATIONS

English machine translation of JPH1133412 entitled "A Production of Metal-Supporting Catalyst" dated Feb. 9, 1999.
English machine translation of WO 2007/023558 A1 entitled "Tungsten Oxide Photocatalyst, Process for Producing the Same, and Fiber Cloth Having Deodorizing/Antifouling Function" dated Mar. 1, 2007.
English machine translation of WO 2009/096548 A1 entitled "Silver-(Titanium Oxide)-Zeolite Adsorbent/Decomposing Material and Process for Production Thereof" dated Aug. 6, 2009.
English machine translation of WO 2012/105581 A1 entitled "Method for Producing Oxide Semiconductor Layer" dated Sep. 8, 2012.
Extended European Search Report for EP Application No. 18810418.6, dated Jan. 28, 2021.
Dai, Chengyi et al., "Hollow Zeolite Encapsulated Ni—Pt Bimetals for Sintering and Coking Resistant Dry Reforming of Methane", Journal of Materials Chemistry A, vol. 3, No. 32, Jun. 29, 2015, pp. 16461-16468.
Liu, Xue et al., "Drying Of Ni/Alumina Catalysts: Control of the Metal Distribution Using Surfacants and the Melt Infiltration Methods", Industrial & Engineering Chemistry Research, vol. 53, No. 14, Apr. 9, 2014, pp. 5792-5800.
Makshina, Ekaterina et al., "Methanol Oxidation On LaCo Mixed Oxide Supported Onto MCM-41 Molecular Sieve", Catalysis Today, vol. 131, No. 1, Nov. 2007, pp. 427-430.
Maneesha, Mishra et al., "[alpha]-Fe2O3 as a photocatalytic material: A review", Applied Catalysis A: General, Elsevier, Amsterdam, NL, vol. 498, Mar. 28, 2015 (Mar. 28, 2015), pp. 126-141, XP029220089, ISSN: 0926-860X, DOI: 10.1016/J.APCATA.2015.03.023.
Wang, Hong et al., "Research into eliminating particulate from diesel engine exhaust over zeolite covered with catalysts of perovskite-type oxides", 2009 International Conference On Energy and Environment Technology : ICEET 2009 ; Guilin, China, Oct. 16-18, 2009, IEEE, Piscataway, NJ, USA, Oct. 16, 2009 (Oct. 16, 2009), pp. 493-495, XP031588294, ISBN: 978-0-7695-3819-8.
Yokoi, Toshiyuki , "Characterization of Zeolites By Advanced SEM/STEM Techniques", The Hitachi Scientific Instrument News, vol. 7, Sep. 2016, pp. 17-23.
Yue, Ming B. et al., "Directly Transforming As-Synthesized MCM-41 To Mesoporous MFI Zeolite", Journal of Material Chemistry, vol. 18, No. 17, Mar. 13, 2008, p. 2044.
Zhijie, Wu et al., Hydrothermal synthesis of L TA-encapsulated metal clusters and consequences for catalyst stability, reactivity, and selectivity, Journal of Catalysis, Academic Press, Duluth, MN, US, vol. 311, Jan. 31, 2014 (Jan. 31, 2014), pp. 458-468, XP028612174, ISSN: 0021-9517, DOI: 10.1016/J.JCAT.2013.12.021,.
English translation of International Preliminary Report on Patentability for Application No. PCT/JP2018/021078, dated Dec. 3, 2019.
English translation of Written Opinion for Application No. PCT/JP2018/021078, dated Aug. 21, 2018.
International Search Report (EN translation of ISR only) and Written Opinion for Application No. PCT/JP2018/021078, dated Aug. 21, 2018.
Fujikawa, Takashi , "Current Status and Future Prospects of Petroleum Refining Catalysts", The Nikkan Kogyo Shimbun, Ltd., vol. 65, No. 1, Jan. 1, 2017, p. 22.
Fumoto, Eri et al., "Catalytic Cracking of Heavy Oil With Iron Oxide-Based Catalysts Using Hydrogen and Oxygen Species From Steam", Journal of the Japan Petroleum Institute, vol. 58, No. 5, Feb. 25, 2015, 329-335.
Haruta, Masatake , "Low-Temperature Combustion Catalysts Mainly for Co Oxidation", Journal of The Japan Petroleum Institute, vol. 37, No. 5, Sep. 1, 1994, pp. 480-491.
Ichikawa, Masaru et al., "Advanced Technology of Methane Chemical Conversion", CMC Publishing Co., Ltd., Jan. 2008.
Ismagilov, Z.R. et al., "Structural Changes of MO/ZSM-5 Catalysts During the Ethane Dehydroaromatization", Eurasian Chemico-Technological Journal, Journal 12, Nov. 2009, 9-16.

Laprune, David et al., "Highly Dispersed Nickel Particles Encapsulated in Multi-Hollow Silicalite-1 Single Crystal Nanoboxes: Effects of Siliceous Deposits and Phosphorous Species On the Catalytic Performances", ChemCatChem, vol. 9, Issue 12, dated Feb. 18, 2017, pp. 2297-2307.
Muroi, Takajyo , "Development Trends of Methane Chemistry Catalysts", Catalyst Round-table Conference News, No. 96, Nov. 1, 2016.
Muroi, Takashiro , "Reverse Water Gas Shift Catalysts", Industrial Catalyst News, No. 107, Aug. 1, 2017, 2 pages.
Sasaki, Makoto et al., "Templating Fabrication of Platinum Nanoparticles and Nanowires Using the Confined Mesoporous Channels of FSM-16—Their Structural Characterization and Catalytic Performances in Water Gas Shift Reaction", Journal of Molecular Catalysis A: Chemical, vol. 141, No. 1/3, May 6, 1999, p. 223-240.
Wu, Zhijie et al., "Hydrothermal Synthesis of Lta-Encapsulated Metal Clusters and Consequences for Catalyst Stability, Reactivity, and Selectivity", Journal of Catalysis, vol. 311, dated Jan. 31, 2014, pp. 458-468.
English Translation of CN 102247887(A).
Wang, D Y. et al., Study on methane aromatization over MoO3/HMCM-49 catalyst, 2004, Catalysis Today, 93-95, Jul. 2, 2004, 75-80.
Newsam, J.M., "The Zeolite Cage Structure", Science, Mar. 7, 1986, New Series, vol. 231, No. 2742, pp. 1093-1099 (Year: 1986).
Cho, Hong J. et al., "Zeolite-Encapsualted Pt Nanoparticlles for Tandem Catalysis", J. Am. Chem. Soc., Sep. 24, 2018, 13514-13520.
Li, Peijun et al., "Ultrastable Perovskite-Zeolite Composite Enabled by Encapsulation and In Situ Passivation", Angewandte Chemie International Edition vol. 59, Issue 51, Sep. 5, 2020, 23300-23306.
Wang, Junwen et al., "In Situ Encapsulated Pt Nanoparticles Dispersed in Low Temperature Oxygen for Partial Oxidation of Methane to Syngas", Catalysts, Aug. 27, 2019, 720-734.
Wen , et al., "Enhanced catalytic performance of Co/MFI by hydrothermal treatment", Catalysis Letters vol. 86, Nos. 1-3, Mar. 2003.
[English Translation] Notice of Reasons for Refusal dated Mar. 16, 2022 for Japanese Patent Application No. 2019-521322; pp. all.
[English Translation] Notice of Reasons for Refusal dated Mar. 28, 2022 for Japanese Patent Application No. 2019-521324; pp. all.
Cai et al. "Gold Nanoclusters Confined in a Supercage of Y Zeolite for Aerobic Oxidation of HMF under Mild Conditions", Chem. Rur. J, 2013, 19, pp. 14215-14223.
Corma et al. "A zeolite with interconnected 8-, 10-, and 12-ring pores and its unique catalytic selectivity", Nature Materials, vol. 2, Jun. 22, 2003, pp. 493-499.
Corma et al. "ITQ-15: The First ultralarge pore zeolite with a bi-directional pore system formed by intersecting 14- and 12-ring channels, and its catalytic implications", Chem. Commun., May 18, 2004, pp. 1356-1357.
Kalogeras et al. "Electrical Properties of Zeolitic Catalysts", Defect and Diffusion Forum vol. 164, Sep. 1998, pp. 1-36.
Mitra et al. "Molecular dynamics using quasielastic neutron scattering", Current Science, vol. 84, No. 5, Mar. 2003; pp. 653-662.
Nan Jiang et al. "The Adsorption Mechanisms of Organic Micropollutants On High-Silica Zeolites Causing S-Shaped Adsorption Isotherms: An Experimental and Monte Carlo Simulations Study", Chemical Engineering Journal; Nov. 2019; pp. all.
[English Translation] First Office Action dated May 16, 2022 for Chinese Patent Application No. 201880036071.3; pp. all.
[English Translation] First Office Action dated May 5, 2022 for Chinese Patent Application No. 201880036312.4; pp. all.
[English Translation] First Office Action dated May 7, 2022 for Chinese Patent Application No. 201880035210.0; pp. all.
[English Translation] Notice of Reasons for Refusal dated Jun. 6, 2022 for Japanese Patent Application No. 2019-521326; pp. all.
First Office Action dated May 6, 2022 for Australian Patent Application No. 2021202968; pp. all.
Dai, Chengyi, et al., "Hollow Zeolite encapsulated Ni—Pt bimetals for sintering and coking resistant dry reforming of methane", Journal of Materials Chemistry A, Jan. 1, 2015, 9 pages.

(56) References Cited

OTHER PUBLICATIONS

[Partial English Translation] Zhang, Yicheng, et al., "Advances in the catalysis of methanol to aromatics reaction", Chemical Industry and Engineering Progress, vol. 35 No. 3, Mar. 5, 2016, pp. 801-806.
[English Abstract] Zhang, Lian-Zhong, et al., "Preparation of Phenol and Acetone with Solid Acid Catalyst", [With Chemical World, Mar. 16, 2012, pp. 487-490.
[English Translation] Notice of Reasons for Refusal dated Feb. 7, 2022 for Japanese Patent Application No. 2019-521334.
[English Translation] Notice of Reasons for Refusal dated Feb. 7, 2022 for Japanese Patent Application No. 2019-521335.
[English Translation] Notice of Reasons for Refusal dated Feb. 7, 2022 for Japanese Patent Application No. JP2019-521325.
[English Translation] Notice of Reasons for Refusal dated Mar. 16, 2022 for Japanese Patent Application No. 2019-521331.
[English Translation] Saudi Arabian Office Action dated Jan. 27, 2022 for Saudi Arabian Patent Appiication No. 519410663.
Do, Trong-On et al., "Zeolite Nanoclusters Coated onto the Mesopore Walls of SBA-15", J. Am. Chem. SOC. vol. 126, No. 44, 2004, pp. 14324-14325.
[English Translation] First Office Action dated Apr. 20, 2022 for Chinese Patent Application No. 201880035803.7; pp. all.
[English Translation] Li, Jinlin, et al., "SBA-16 with Different Pore Size Supported Cobal Catalyst for Fischer-Tropsch Synthesis", Journal of South-Central University for Nationalities (National Science Edition); vol. 34 No. 4, Key Laboratory of Catalysis and Materials Science of the State, Ethnic Affairs Commission & Ministry of Education, Dec. 2015; pp. all.
[English Translation] Liu, Quansheng, et al., "Progress in Water-Gas-Shift Catalysts", Progress in Chemistry; vol. 17 No. 3; Institute of Chemical Engineering, Inner Mongolia University of Technology, Hohhot 010062, China, May 2005; pp. all.
[English Translation] Notice of Reasons for Refusal dated Jun. 28, 2022 for Japanese Patent Application No. 2019-521318; pp. all.
[English Translation] Notice of Reasons for Refusal dated Jun. 28, 2022 for Japanese Patent Application No. 2019-521319; pp. all.
[English Translation] Notice of Reasons for Refusal dated Jun. 28, 2022 for Japanese Patent Application No. 2019-521320; pp. all.
[English Translation] Notice of Reasons for Refusal dated Jun. 28, 2022 for Japanese Patent Application No. 2019-521321; pp. all.
[English Translation] Notice of Reasons for Refusal dated Sep. 27, 2022 for Japanese Patent Application No. 2019-521325; pp. all.
[English Translation] Notice of Reasons for Refusal dated Sep. 27, 2022 for Japanese Patent Application No. 2019-521334; pp. all.
[English Translation] Notice of Reasons for Refusal dated Sep. 27, 2022 for Japanese Patent Application No. 2019-521335; pp. all.
[English Translation] First Office Action dated Jul. 11, 2022 for Chinese Patent Application No. 201880036382.X.
[English Translation] First Office Action dated Jul. 13, 2022 for Chinese Patent Application No. 201880035026.6.
[English Translation] Notice of Reasons for Refusal dated Aug. 3, 2022 for Japanese Patent Application No. 2019-521322.
[English Translation] Notice of Reasons for Refusal dated Aug. 3, 2022 for Japanese Patent Application No. 2019-521331.
[English Translation] The First Office Action dated Jul. 20, 2022 for Chinese Patent Application No. 201880035173.3.
[English Translation] The First Office Action dated Jul. 20, 2022 for Chinese Patent Application No. 201880035360.1.
Dai, Chengyi, et al., "Synthesis of Hollow Nanocubes and Macroporous Monoliths of Silicalite-1 by Alkaline Treatment", Chemistry of Materials, Oct. 7, 2013, pp. 4197-4205.
Miao, Tao, et al., "Highly dispersed nickel within mesochannels of SBA-15 for CO methanation with enhanced activity and excellent thermostability", Fuel, Journal vol. 188, No. 12; homepage: www.elsevier.com/locate/fuel, 2017, pp. 267-276.

[English Translation] First Office Action dated Aug. 3, 2022 for Chinese Patent Application No. 201880035569.8; pp. all.
[English Translation] First Office Action dated Aug. 3, 2022 for Chinese Patent Application No. 201880036313.9; pp. all.
[English Translation] Notice of Reasons for Refusal dated Aug. 16, 2022 for Japanese Patent Application No. 2019-521324; pp. all.
[English Translation] "Preparation and Application of Molecular Sieves", Edited by Shanghai Reagent Factory, Jun. 1976; pp. all.
[English Translation] Notice of Reasons for Refusal for Japanese Patent Application No. 2019-521325 dated Sep. 27, 2022, pp. all.
[English Translation] Notice of Reasons for Refusal for Japanese Patent Application No. 2019-521334, dated Sep. 27, 2022, pp. all.
[English Translation] Notice of Reasons for Refusal for Japanese Patent Application No. 2019-521335, dated Sep. 27, 2022, pp. all.
[English Translation] Notice of Reasons for Refusal for Japanese Patent Application No. 2019-521326 dated Nov. 25, 2022, pp. all.
[English Translation] Second Office Action for Chinese Patent Application No. 201880035803.7 dated Nov. 10, 2022, pp. all.
[English Translation] Second Office Action for Chinese Patent Application No. 201880036312.4 dated Nov. 10, 2022, pp. all.
[English Translation] Zhong, Bangke, "Catalysis i Fine chemical process", Sinopec Press; ISBN 7-80164-251-1, Aug. 2002, 4 pages.
[English Translation] Second Office Action dated Dec. 23, 2022 in CN Application No. 201880035210.0; pp. all.
[English Translation] Second Office Action dated Jan. 5, 2023 in CN Application No. 201880035525.5; pp. all.
Office Action dated Dec. 18, 2022 for SA Application No. 519410677; pp. all.
Office Action dated Dec. 18, 2023 for SA Application No. 519410673; pp. all.
Office Action dated Dec. 26, 2022 for SA Application No. 519410680; pp. all.
Second Office Action dated Jan. 20, 2023 for CN Application No. 201880035360.1; pp. all.
Second Office Action dated Jan. 12, 2023 for CN Application No. 201880036382.X; pp. all.
Second Office Action dated Jan. 19, 2023 for CN Application No. 201880035017.7; pp. all.
Second Office Action dated Jan. 20, 2023 for CN Application No. 201880035026.6, pp. all.
Second Office Action dated Jan. 18, 2023 in CN Application No. 201880036313.9; pp. all.
Decision of Refusal for Japanese Patent Application No. 2019-521318, dated Feb. 1, 2023, pp. all.
Decision of Refusal for Japanese Patent Application No. 2019-521319, dated Feb. 1, 2023, pp. all.
Notice of Reasons for Refusal for Japanese Patent Application No. 2019-521320, dated Feb. 1, 2023, pp, all.
Notice of Reasons for Refusal for Japanese Patent Application No. 2019-521321, dated Feb. 1, 2023, pp. all.
[English Translation] Second Office Action dated Feb. 18, 2023 in CN Application No. 201880035173.3; pp. all.
[English Translation] Second Office Action dated Feb. 24, 2023 in CN Application No. 201880035569.8; pp. all.
[English Translation] Notice of Reasons for Refusal dated Mar. 22, 2023 in JP Application No. 2019-521324; pp. all.
[English Translation] Notice of Reasons for Refusal for Japanese Patent Application No. 2019-521322 dated Apr. 4, 2023, pp. all.
[English Translation] Notice of Reasons for Refusal for Japanese Patent Application No. 2019-521325 dated Apr. 4, 2023, pp. all.
[English Translation] Notice of Reasons for Refusal for Japanese Patent Application No. 2019-521331 dated Apr. 4, 2023, pp. all.
[English Translation] Notice of Reasons for Refusal for Japanese Patent Application No. JP-2019-521335 dated Apr. 4, 2023, pp. all.

* cited by examiner

FUNCTIONAL STRUCTURAL BODY AND METHOD FOR MAKING FUNCTIONAL STRUCTURAL BODY

CROSS REFERENCE TO RELATED APPLICATIONS

The present application is a continuation application of International Patent Application No. PCT/JP2018/021078 filed on May 31, 2018, which claims priority to Japanese Patent Application No. 2017-108583, filed on May 31, 2017. The contents of these applications are incorporated herein by reference in their entirety.

TECHNICAL FIELD

The present disclosure relates to a functional structural body having a skeletal body of a porous structure and a functional substance, and a method for making the functional structural body.

BACKGROUND ART

Petrochemical raw materials called naphtha and various fuels such as heavy oil, light oil, kerosene, gasoline, and LP gas are produced from crude oil in petroleum complexes in oil manufacturers. Since the crude oil is a mixture in which various impurities are mixed in addition to the petrochemical raw materials described above and the various fuels, a step of distilling and separating the components contained in the crude oil is required.

Therefore, in the petroleum refining process, the difference in boiling point of each component is used, and crude oil is heated at a shelf stage in a column in an atmospheric pressure distillation apparatus to separate the crude oil for each component, and then the separated substances are concentrated. As a result, a low-boiling point substance such as LP gas or naphtha is removed at the upper shelf stage of the atmospheric pressure distillation apparatus while a high-boiling point substance such as heavy oil is removed from the bottom of the atmospheric pressure distillation apparatus. Then, the separated and concentrated substances are subjected to secondary processing such as desulfurization to produce various fuel products.

In general, refining catalysts have been used to efficiently modify low boiling point naphtha and the like in the above petroleum refining process to produce gasoline having a high octane number and the like. Since the naphtha fraction in the crude oil has a low octane number as it is, and is incompatible as the gasoline that causes the vehicle to run, by modifying the paraffins and naphthenes having a low octane number in the naphtha fraction to an aromatic fractions having a high octane number using refining catalysts, modified gasoline having characteristics suitable for vehicle fuel is produced.

In addition, as crude oil becomes heavier, hydrocracking treatment is performed in which heavy oil is hydrodesulfurized using a hydrodesulfurization apparatus such as a direct desulfurization apparatus, an indirect desulfurization apparatus, and the like to obtain a desulfurized heavy oil, desulfurized heavy gas oil, and the like that are further decomposed to increase production of desulfurized naphtha, desulfurized kerosene, desulfurized gas oil, and the like. For example, by hydrocracking the atmospheric pressure distilled residue oil, the yields of the desulfurization light gas distillate, the desulfurization naphtha fraction are increased and the desulfurized heavy oil is decreased, and the LPG fraction, FCC gasoline fraction, and LCO fraction of the desulfurization heavy oil is produced in the catalytic cracking device, and thereby the residual oil is decreased and the distillate of light oil is increased. In this case, a catalyst including a crystalline aluminosilicate support, which is an exemplary zeolite, and a hydrocracking catalyst containing a specific proportion of zeolite to a porous inorganic oxide have been proposed.

For example, a catalyst is disclosed in which a metal made from a material selected from Pd, Pt, Co, Fe, Cr, Mo, W and mixtures thereof is deposited on the surface of a support including Y type zeolite as a hydrocracking catalyst (U.S. Patent Application Publication No. 2016/0,030,934).

Furthermore, in the automotive field, as a catalyst structure for exhaust emissions of automotive, a ceramic catalyst body is proposed in which a ceramic support is disposed on a ceramic surface of a substrate, and both a main catalyst component and a co-catalyst component are supported on the ceramic support. In this ceramic catalyst body, a large number of pores formed from lattice defects and the like in the crystal lattice are formed in the surface of a ceramic support made of $\gamma$-alumina, and a main catalyst component including Ce—Zr, Pt, and the like is directly supported near the surface of the ceramic support (U.S. Patent Application Publication No. 2003/0,109,383).

SUMMARY OF DISCLOSURE

Technical Problem

However, in the catalyst structure described above, because the catalyst particles are supported on or near the surfaces of supports, the catalyst particles move within the supports due to the effects of the force, heat, and the like from fluid, such as a material to be modified, during the modification process, and the aggregation of the catalyst particles (sintering) easily occurs. When aggregation occurs between catalyst particles, the catalyst activity decreases due to the reduction in effective surface area as a catalyst, and therefore the life of the catalyst structure becomes shorter than normal. Therefore, the catalyst structure itself must be replaced or regenerated over a short period of time, which leads to the problem that the replacement operation is cumbersome and resources saving cannot be achieved. Furthermore, since refining catalysts are typically connected to the downstream side of the atmospheric pressure distillation apparatus and are used continuously in a petroleum refining process, it is difficult to apply the catalyst re-activation technique, and even if the reactivation technique can be applied, the work is very complicated. Furthermore, the suppression or prevention of such a deterioration of the function over time is not only a problem in the catalytic field, but also in a variety of technical fields, and the solution is desired in order to maintain the function for a long term.

An object of the present disclosure is to provide a functional structural body that can realize a long life time by suppressing the decline in function of the functional substance and that can attempt to save resources without requiring a complicated replacement operation, and to provide a method for making the functional structural body.

Solution to Problem

As a result of diligent research to achieve the object described above, the present inventors have found that the functional structural body that can suppress the decline in function of the functional substance and that can realize a long life time can be obtained by including:

a skeletal body of a porous structure composed of a zeolite-type compound; and at least one functional substance present in the skeletal body, wherein the skeletal body has channels connecting with each other, and the functional substance is held at least in the channels of the skeletal body, and thus completed the present disclosure based on such finding.

In other words, the summary configurations of the present disclosure are as follows.

[1] A functional structural body, including:

a skeletal body of a porous structure composed of a zeolite-type compound; and at least one functional substance present in the skeletal body, wherein the skeletal body has channels connecting with each other, and the functional substance is present at least in the channels of the skeletal body.

[2] The functional structural body according to [1], wherein the channels have any one of a one-dimensional pore, a two-dimensional pore, and a three-dimensional pore defined by the framework of the zeolite-type compound and an enlarged pore portion which has a diameter different from that of any of the one-dimensional pore, the two-dimensional pore, and the three-dimensional pore, and the functional substance is present at least in the enlarged pore portion.

[3] The functional structural body according to [2], wherein the enlarged pore portion causes a plurality of pores constituting any one of the one-dimensional pore, a two-dimensional pore, and a three-dimensional pore to connect with each other.

[4] The functional structural body according to [1], wherein the functional substance is a catalytic substance, and the skeletal body is a support that supports at least one catalytic substance.

[5] The functional structural body according to [4], wherein the catalytic substance is metal oxide nanoparticles.

[6] The functional structural body according to [5], wherein an average particle diameter of the metal oxide nanoparticles is greater than an average inner diameter of the channels and is less than or equal to an inner diameter of the enlarged pore portion.

[7] The functional structural body according to [5], wherein a metal element (M) of the metal oxide nanoparticles is contained in an amount from 0.5 mass % to 2.5 mass % based on the functional structural body.

[8] The functional structural body according to [5], wherein an average particle size of the metal oxide nanoparticles is from 0.1 nm to 50 nm.

[9] The functional structural body according to [5], wherein the average particle size of the metal oxide nanoparticles is from 0.5 nm to 14.0 nm.

[10] The functional structural body according to [5], wherein a ratio of the average particle size of the metal oxide nanoparticles to the average inner diameter of the channels is from 0.06 to 500.

[11] The functional structural body according to [10], wherein a ratio of the average particle size of the metal oxide nanoparticles to the average inner diameter of the channels is from 0.1 to 36.

[12] The functional structural body according to [11], wherein a ratio of the average particle size of the metal oxide nanoparticles to the average inner diameter of the channels is from 1.7 to 4.5.

[13] The functional structural body according to [2], wherein the average inner diameter of the channels is from 0.1 nm to 1.5 nm, and the inner diameter of the enlarged pore portion is from 0.5 nm to 50 nm,

[14] The functional structural body according to [1], further including at least one functional substance held on an outer surface of the skeletal body.

[15] The functional structural body according to [14], wherein the content of the at least one functional substance present in the skeletal body is greater than that of a functional substance other than the at least one functional substance held on an outer surface of the skeletal body.

[16] The functional structural body according to [1], wherein the zeoliteR type compound is a silicate compound.

[17] A method for making a functional structural body, including:

a sintering step of a precursor material (B) obtained by impregnating a precursor material (A) for obtaining a skeletal body of a porous structure composed of zeolite-type compound with a metal-containing solution; and a hydrothermal treatment step of hydrothermal-treating the precursor (C) obtained by sintering the precursor material (B).

[18] The method for making a functional structural body according to [17], wherein from 5 to 500 mass % of a non-ionic surfactant is added to the precursor material (A) before the sintering step.

The method for making a functional structural body according to [17], wherein the precursor material (A) is impregnated with the metal-containing solution by adding the metal-containing solution in the precursor material (A) in multiple portions prior to the sintering step.

[20] The method for making a functional structural body according to [17], wherein in impregnating the precursor material (A) with the metal-containing solution prior to the sintering step, the value obtained by converting the added amount of the metal-containing solution added to the precursor material (A) to a ratio of silicon (Si) constituting the precursor material (A) to a metal element (M) included in the metal-containing solution added to the precursor material (A) (a ratio of number of atoms Si/M) is adjusted to from 10 to 1000.

[21] The method for making a functional structural body according to [17], wherein in the hydrothermal treatment step, the precursor material (C) and the structure directing agent are mixed.

[22] The method for making a functional structural body according to [17], wherein the hydrothermal treatment step is performed under a basic atmosphere.

Advantageous Effects of Disclosure

According to the present disclosure, the functional structural body that can realize a long life time by suppressing the decline in function of the functional substance and that can attempt to save resources without requiring a complicated replacement operation can be provided.

BRIEF DESCRIPTION OF DRAWINGS

FIG. 1A is a perspective view (partially illustrating in cross section), and FIG. 1B is a partially enlarged cross-sectional view.

FIG. 2A is a diagram illustrating the function of a sieve, and FIG. 2B is a diagram explaining the catalytic function.

DESCRIPTION OF EMBODIMENTS

Figure 1A:
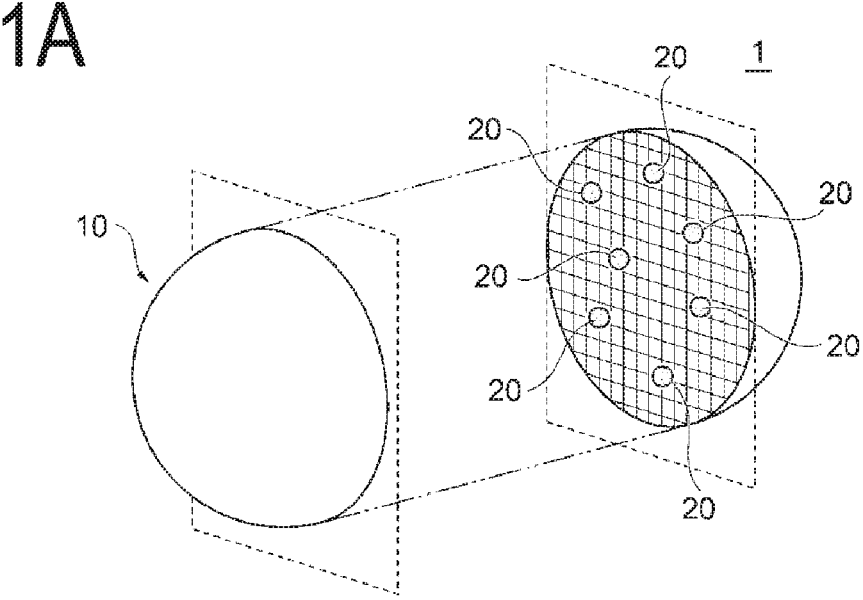
FIGS. 1A and 1B are diagrams schematically illustrating a functional structural body according to an embodiment of the present disclosure so that the inner structure can be understood.
Figure 1B:
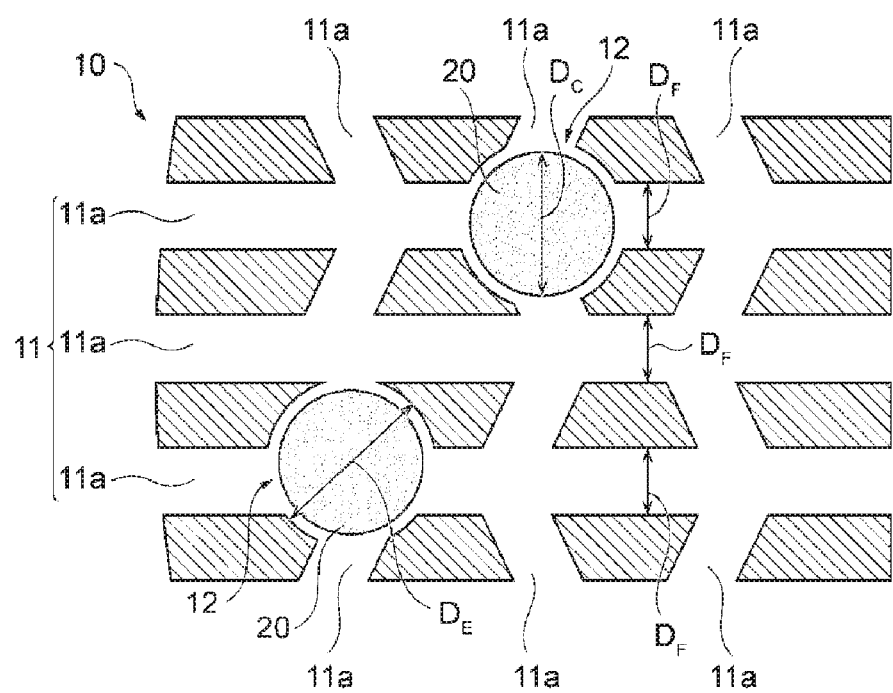

Hereinafter, embodiments of the present disclosure will be described in detail with reference to drawings.
Configuration of Functional Structural Body FIGS. 1A and 1B is a diagram schematically illustrating a configuration of a functional structural body according to an embodiment of the present disclosure. FIG. 1A is a perspective view (partially illustrated in cross section) and FIG. 1B is a partially enlarged cross-sectional view. Note that the functional structural body in FIGS. 1A and 1B is an example of the functional structural body, and the shape, dimension, and the like of each of the configurations according to the present disclosure are not limited to those illustrated in FIGS. 1A and 1B.

As illustrated in FIG. 1B, a functional structural body 1 includes a skeletal body 10 of a porous structure composed of a zeolite-type compound, and at least one functional substance 20 present in the skeletal body 10.

This functional substance 20 is a substance that exhibits one or more functions alone, or by cooperating with the skeletal body 10. Specific examples of the function described above include catalytic function, light emission (or fluorescent) function, light-absorbing function, and identification function. The functional substance 20 is preferably, for example, a catalyst material having a catalytic function. Note that when the functional substance 20 is the catalytic substance, the skeletal body 10 is a support that supports the catalytic substance.

In the functional structural body 1, a plurality of functional substances 20, 20, . . . are embedded in the porous structure of the skeletal body 10. The catalyst material, which is an example of the functional substance 20, is preferably at least one of metal oxide nanoparticles and metallic nanoparticles. The metal oxide nanoparticles and metallic nanoparticles are described in detail below. Furthermore, the functional substance 20 may be a metal xide, metal alloy, or particles containing a composite aterial thereof.

The skeletal body 10 is a porous structure, and as illustrated in FIG. 13, a plurality of pores 11a, 11a, . . . are preferably formed so as to have channels 11 connecting with each other. Here, the functional material 20 is present at least in the channel 11 of the skeletal body 10, and is preferably held at least in the channel 11 of the skeletal body 10.

With such a configuration, movement of the functional substances 20 within the skeletal body 10 is restricted, and aggregation between the functional substances 20 and 20 is effectively prevented. As a result, the decrease in effective surface area as the functional substance 20 can be effectively suppressed, and the function of the functional substance 20 lasts for a long period of time. In other words, according to the functional structural body 1, the decline in function due to aggregation of the functional substance 20 can be suppressed, and the life of the functional structural body 1 can be extended. In addition, due to the long life time of the functional structural body 1, the replacement frequency of the functional structural body 1 can be reduced, and the amount of waste of the used functional structural body 1 can be significantly reduced, and thereby can save resources.

Typically, when the functional structural body is used in a fluid (e.g., a heavy oil, or modified gas such as NOx, etc.), it can be subjected to external forces from the fluid. In this case, in a case where the functional substance is only held in the state of attachment to the outer surface of the skeletal body 10, there is a problem in that it is easy to disengage from the outer surface of the skeletal body 10 due to the influence of external force from the fluid. In contrast, in the functional structural body 1, the functional substance 20 is held at least in the channel 11 of the skeletal body 10, and therefore, even if subjected to an external force caused by a fluid, the functional substance 20 is less likely to detach from the skeletal body 10. That is, when the functional structural body 1 is in the fluid, the fluid flows into the channel 11 from the hole 11a of the skeletal body 10, so that the speed of the fluid flowing through the channel 11 is slower than the speed of the fluid flowing on the outer surface of the skeletal body 10 due to the flow path resistance (frictional force). Due to the influence of such flow path resistance, the pressure experienced by the functional substance 20 held in the channel 11 from the fluid is lower than the pressure at which the functional substance is received from the fluid outside of the skeletal body 10. As a result, separation of the functional substances 20 present in the skeletal body 11 can be effectively suppressed, and the function of the functional substance 20 can be stably maintained over a long period of time. Note that the flow path resistance as described above is thought to be larger so that the channel 11 of the skeletal body 10 has a plurality of bends and branches, and the interior of the skeletal body 10 becomes a more complex three-dimensional structure.

Preferably, the channel 11 has any one of a one-dimensional pore, a two-dimensional pore, and a three-dimensional pore defined by the framework of the zeolite-type compound and an enlarged pore portion which has a diameter different from that of any of the one-dimensional pore, the two-dimensional pore, and the three-dimensional pore. In this case, the functional substance 20 is preferably present at least in the enlarged pore portion 12. More preferably, the functional substance 20 is embedded at least in the enlarged pore portion 12. Here, the "one-dimensional pore" refers to a tunnel-type or cage-type pore forming a one-dimensional channel, or a plurality of tunnel-type or cage-type pores (a plurality of one-dimensional channels) forming a plurality of one-dimensional channels. Also, the "two-dimensional pore" refers to a two-dimensional channel in which a plurality of one-dimensional channels are connected two-dimensionally. The "three-dimensional pore" refers to a three-dimensional channel in which a plurality of one-dimensional channels are connected three-dimensionally.

As a result, the movement of the functional substance 20 within the skeletal body 10 is further restricted, and it is possible to further effectively prevent separation of the functional substance 20 and aggregation between the functional substances 20, 20. Embedding refers to a state in which the functional substance 20 is included in the skeletal body 10. At this time, the functional substance 20 and the skeletal body 10 need not necessarily be in direct contact with each other, but may be indirectly held by the skeletal body 10 with other substances (e.g., a surfactant, etc.) interposed between the functional material 20 and the skeletal body 10.

Although FIG. 1B illustrates the case in which the functional substance 20 is embedded in the enlarged pore portion 12, the functional substance 20 is not limited to this configuration only, and the functional substance 20 may be present in the channel 11 with a portion thereof protruding outward of the enlarged pore portion 12. Furthermore, the functional substance 20 may be partially embedded in a portion of the channel 11 other than the enlarged pore portion 12 (for example, an inner wall portion of the channel 11), or may be held by fixing, for example.

Additionally, the enlarged pore portion 12 preferably connects with the plurality of pores 11a, 11a constituting any one of the one-dimensional pore, the two-dimensional pore, and the three-dimensional pore. As a result, a separate channel different from the one-dimensional pore, the two-dimensional pore, or the three-dimensional pore is provided in the interior of the skeletal body 10, so that the function of the functional material 20 can be further exhibited.

Additionally, the channel 11 is formed three-dimensionally by including a branch portion or a merging portion within the skeletal body 10, and the enlarged pore portion 12 is preferably provided in the branch portion or the merging portion of the channel 11.

The average inner diameter $D_F$ of the channel 11 formed in the skeletal body 10 is calculated from the average value of the short diameter and the long diameter of the pore 11a constituting any of the one-dimensional pore, the two-dimensional pore, and the three-dimensional pore. For example, it is from 0.1 nm to 1.5 nm, and preferably from 0.5 nm to 0.8 nm. The inner diameter $D_E$ of the enlarged pore portion 12 is from 0.5 nm to 50 nm, for example. The inner diameter DE is preferably from 1.1 nm to 40 nm, and more preferably from 1.1 nm to 3.3 nm. For example, the inner diameter $D_E$ of the enlarged pore portion 12 depends on the pore diameter of the precursor material (A) described below and the average particle size $D_C$ of the functional substance 20 to be embedded. The inner diameter $D_E$ of the enlarged pore portion 12 is sized so that the enlarged pore portion 12 is able to embed the functional substance 20.

The skeletal body 10 is composed of a zeolite-type compound. Examples of zeolite-type compounds include zeolite analog compounds such as zeolites (alminosilicate salts), cation exchanged zeolites, silicate compounds such as silicalite, alminoborate salts, alminoarsenate salts, and germanate salts; and phosphate-based zeolite analog materials such as molybdenum phosphate. Among these, the zeolite-type compound is preferably a silicate compound.

The framework of the zeolite-type compound is selected from FAU type (Y type or X type), MTW type, MFI type (ZSM-5), FER type (ferrierite), LTA type (A type), MWW type (MCM-22), MOR type (mordenite), LTL type (L type), and BEA type (beta type). Preferably, it is MFI type, and more preferably ZSM-5. A plurality of pores having a pore diameter corresponding to each framework is formed in the zeolite-type compound. For example, the maximum pore diameter of MFI type is 0.636 nm (6.36 Å) and the average pore diameter is 0.560 nm (5.60 Å).

Hereinafter, the description will be given of the case in which the functional substance 20 is at least one of metal oxide nanoparticles and metallic nanoparticles (hereinafter, also referred to collectively as "nanoparticles").

When the functional substance 20 is nanoparticles described above, the nanoparticles 20 are primary particles or secondary particles formed by aggregating primary particles, but the average particle size $D_C$ of the nanoparticles 20 is preferably larger than the average inner diameter $D_F$ of the channel 11 and not greater than the inner diameter $D_E$ of the enlarged pore portion 12 ($D_F<D_C\leq D_E$). Such nanoparticles 20 are suitably embedded in the enlarged pore portion 12 within the channel 11, and the movement of the nanoparticles 20 within the skeletal body 10 is restricted. Thus, even if the nanoparticles 20 are subjected to external force from the fluid, movement of the nanoparticles 20 within the skeletal body 10 is suppressed, and it is possible to effectively prevent the nanoparticles 20, 20, . . . embedded in the enlarged pore portions 12, 12, . . . dispersed in the channel 11 of the skeletal body 10 from coming into contact with each other.

When the functional substance 20 is metal oxide nanoparticles, the average particle size $D_C$ of the metal oxide nanoparticles 20 is preferably from 0.1 nm to 50 nm, more preferably 0.1 nm or higher and less than 30 nm, and further preferably from 0.5 nm to 14.0 nm, and particularly preferably from 1.0 nm to 3.3 nm for primary particles and second particles. Furthermore, the ratio ($D_C/D_F$) of the average particle size $D_C$ of the metal oxide nanoparticles 20 to the average inner diameter $D_F$ of the channel 11 is preferably from 0.06 to 500, more preferably from 0.1 to 36, even more preferably from 1.1 to 36, and particularly preferably from 1.7 to 4.5.

When the functional substance 20 is metal oxide nanoparticles, the metal element (M) of the metal oxide nanoparticles is preferably contained in 0.5 to 2.5 mass % relative to the functional structural body 1, and more preferably from 0.5 to 1.5 mass % relative to the functional structural body 1. For example, when the metal element (m) is Co, the content of Co element (mass %) is expressed as {(mass of Co element)/(mass of all elements of the functional structural body 1)}×100.

The metal oxide nanoparticles only needs to be constituted by a metal oxide. For example, the metal oxide nanoparticles may be constituted by a single metal oxide, or may be constituted by a mixture of two or more types of metal oxides. Note that in the present specification, the "metal oxide" constituting the metal oxide nanoparticles (as the raw material) refers to an oxide containing one type of metal element (M) and a complex oxide containing two or more types of metal elements (M), and the term is a generic term for an oxide containing one or more metal elements (M).

Examples of such metal oxides include cobalt oxide ($CoO_x$), nickel oxide ($NiO_x$), iron oxide ($FeO_x$) copper oxide ($CuO_x$), zirconium oxide ($ZrO_x$), cerium oxide ($CeO_x$), aluminum oxide ($AlO_x$), niobium oxide ($NbO_x$), titanium oxide ($TiO_x$), bismuth oxide ($BiO_x$), molybdenum oxide ($MoO_x$), vanadium oxide ($VO_x$), and chromium oxide ($CrO_x$). Preferably, any one of oxides described above is the major component.

In addition, when the functional substance 20 is metallic nanoparticles, the average particle size $D_C$ of the metallic nanoparticles 20 is preferably from 0.08 nm to 30 nm, more preferably 0.08 nm or higher and less than 25 nm, and further preferably from 0.4 nm to 11.0 nm, and particularly preferably from 0.8 nm to 2.7 nm for primary particles and second particles. Furthermore, the ratio ($D_C/D_F$) of the average particle size $D_C$ of the metallic nanoparticles 20 to the average inner diameter $D_F$ of the channel 11 is preferably from 0.05 to 300, more preferably from 0.1 to 30, even more preferably from 1.1 to 30, and particularly preferably from 1.4 to 3.6.

When the functional substance 20 is metallic nanoparticles, the metal element (M) of the metallic nanoparticles is preferably contained in 0.5 to 2.5 mass % relative to the functional structural body 1, and more preferably from 0.5 to 1.5 mass % relative to the functional structural body 1.

The metallic fine particles only needs to be constituted by a metal that is not oxidized, and may be constituted by a single metal or a mixture of two or more types of metals, for example. Note that in the present specification, the "metal" constituting the metallic nanoparticles (as the raw material) refers to an elemental metal containing one type of metal element (M) and a metal alloy containing two or more types of metal elements (M), and the term is a generic term for a metal containing one or more metal elements (M).

Examples of such a metal include platinum (Pt), palladium (Pd), ruthenium (Ru), nickel (Ni), cobalt (Co), molybdenum (Mo), tungsten (W), iron (Fe), chromium (Cr), cerium (Ce), copper (Cu), magnesium (Mg), and aluminum (Al). Preferably, any one of metal described above is the major component.

Note that the functional substance 20 is preferably metal oxide nanoparticles in terms of durability.

Furthermore, the ratio of silicon (Si) constituting the skeletal body 10 to a metal element (M) constituting the nanoparticles 20 (the ratio of number of atoms Si/M) is preferably from 10 to 1000, and more preferably from 50 to 200. If the ratio is greater than 1000, the action as the functional substance may not be sufficiently obtained, such as low activity. On the other hand, in a case where the ratio is smaller than 10, the proportion of the nanoparticles 20 becomes too large, and the strength of the skeletal body 10 tends to decrease. Note that the nanoparticles 20, which are present in the interior of the skeletal body 10 or are supported, do not include nanoparticles adhered to the outer surface of the skeletal body 10.

Function of Functional Structural Body

The functional structural body 1 includes the skeletal body 10 of a porous structure and at least one functional substance 20 present in the skeletal body 10, as described above. The functional structural body 1 exhibits a function according to the functional substance 20 by bringing the functional substance 20 present in the skeletal body into contact with a fluid. In particular, the fluid in contact with the external surface 10a of the functional structural body 1 flows into the skeletal body 10 through the pore 11a formed in the outer surface 10a and guided into the channel 11, moves through the channel 11, and exits to the exterior of the functional structural body 1 through the other pore 11a. In the pathway through which fluid travels through the channel 11, contacting with the functional substance 20 held in the channel 11 results in a reaction (e.g., a catalytic reaction) depending on the function of the functional substance 20. In addition, the functional structural body 1 has molecular sieving capability due to the skeletal body being a porous structure.

Figure 2A:
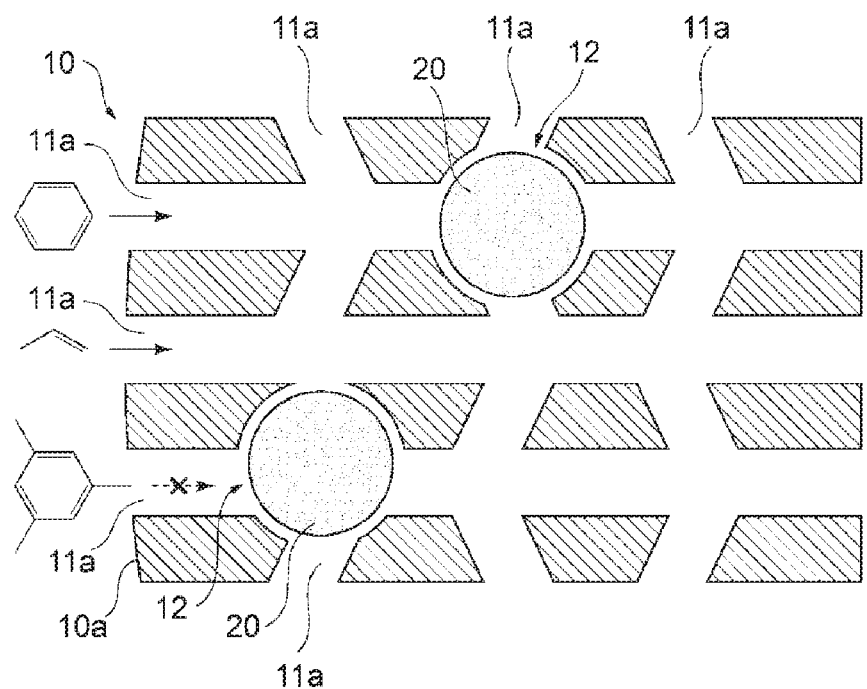
FIGS. 2A and 2B are partial enlarged cross-sectional views for explaining an example of the function of the functional structural body of FIGS. 1A and 1B.

First, the case in which the fluid is a liquid containing benzene, propylene, and mesitylene is described as an example using FIG. 2A for the molecular sieving capability of the functional structural body 1. As illustrated in FIG. 2A, a compound (e.g., benzene, propylene) constituted by molecules having a size that is less than or equal to the pore diameter of the pore 11a, in other words, less than or equal to the inner diameter of the channel 11, can enter the skeletal body 10. On the other hand, a compound made up of molecules having a size exceeding the pore diameter of the pore 11a (for example, mesitylene) cannot enter the skeletal body 10. In this way, when the fluid contains a plurality of types of compounds, the reaction of compounds that cannot enter the skeletal body 10 can be restricted and a compound capable of entering into the skeletal body 10 can react.

Of the compounds produced in the skeletal body 10 by the reaction, only compounds composed of molecules having a size less than or equal to the pore diameter of the pore 11a can exit through the pore 11a to the exterior of the skeletal body 10, and are obtained as reaction products. On the other hand, a compound that cannot exit to the exterior of the skeletal body 10 from the pore 11a can be released to the exterior of the skeletal body 10 when converted into a compound made up of molecules sized to be able to exit to the exterior of the skeletal body 10. In this way, a specified reaction product can be selectively obtained by using the functional structural body 1.

Figure 2B:
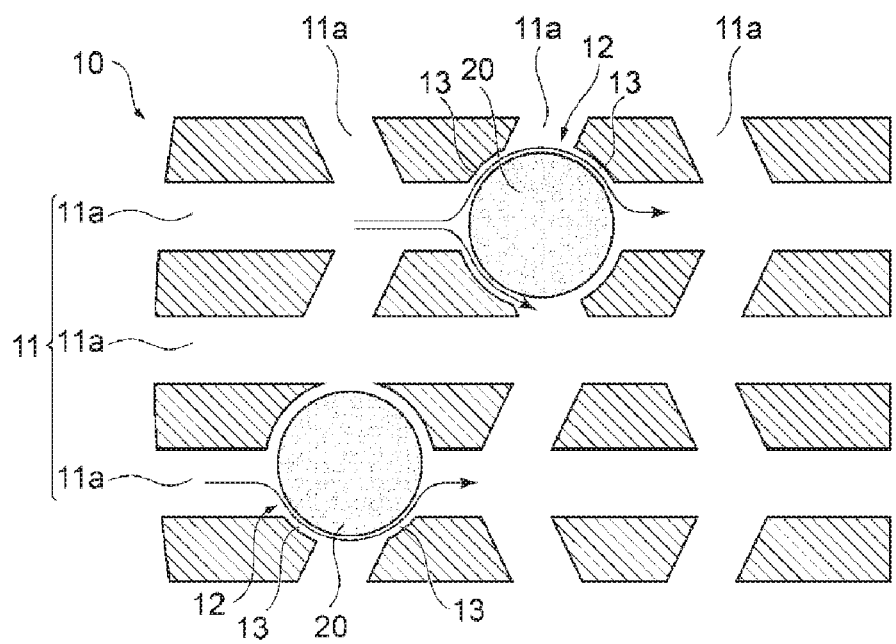

In the functional structural body 1, as illustrated in FIG. 2B, the functional substance 20 is suitably embedded in the enlarged pore portion 12 of the channel 11. When the functional substance 20 is metal oxide nanoparticles, in a case where the average particle size $D_C$ of the metal oxide nanoparticles is larger than the average inner diameter $D_F$ of the channel 11 and smaller than the inner diameter $D_E$ of the enlarged pore portion 12 ($D_F < D_C < D_E$), a small channel 13 is formed between the metal oxide nanoparticles and the diameter expanding portion 12. Thus, as indicated by the arrow in FIG. 2B, the fluid entering the small channel 13 comes into contact with the metal oxide nanoparticles. Because each metal oxide nanoparticle is embedded in the diameter expanding portion 12, movement within the skeletal body 10 is restricted. As a result, aggregation between the metal oxide nanoparticles in the skeletal body 10 is prevented. As a result, a large contact area between the metal oxide nanoparticles and the fluid can be stably maintained.

Next, the case in which the functional substance 20 has a catalytic function will be described. Specifically, the case in which the functional substance 20 is iron oxide ($FeO_x$) nanoparticles and dodecylbenzene which is a heavy oilis made to enter the skeletal body 10 of the functional structural body 1 will be described as an example. As dodecylbenzene enters the skeletal body 10, the dodecyl benzene is decomposed into various alcohols and ketones by an oxidative decomposition reaction, as described below. Furthermore, benzene, which is a light oil, is produced from a ketone (here, acetophenone), which is one of the degradation products. This means that the functional substance 20 functions as a catalyst in the oxidation decomposition reaction. In this way, the functional structural body 1 can be used to convert heavy oils to light oils. In the related art, hydrocracking treatment using hydrogen has been performed to convert heavy oils to light oils. In contrast, by using the functional structural body 1, hydrogen is not required. Thus, the functional structural body 1 can be utilized to convert heavy oils to light oils even in regions where hydrogen is difficult to supply. Furthermore, because hydrogen is not required, cost reduction can be realized, and it can be expected that the use of heavy oils that could not be sufficiently utilized can be promoted.

[Chemical Formula 1]

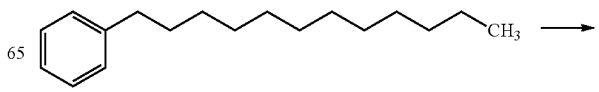

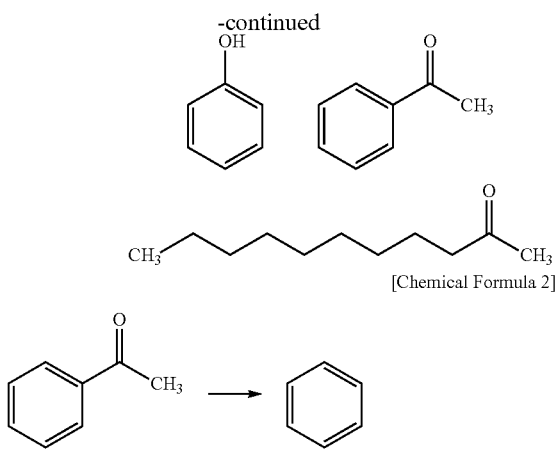

[Chemical Formula 2]

Method for Making Functional Structural Body

Figure 3:
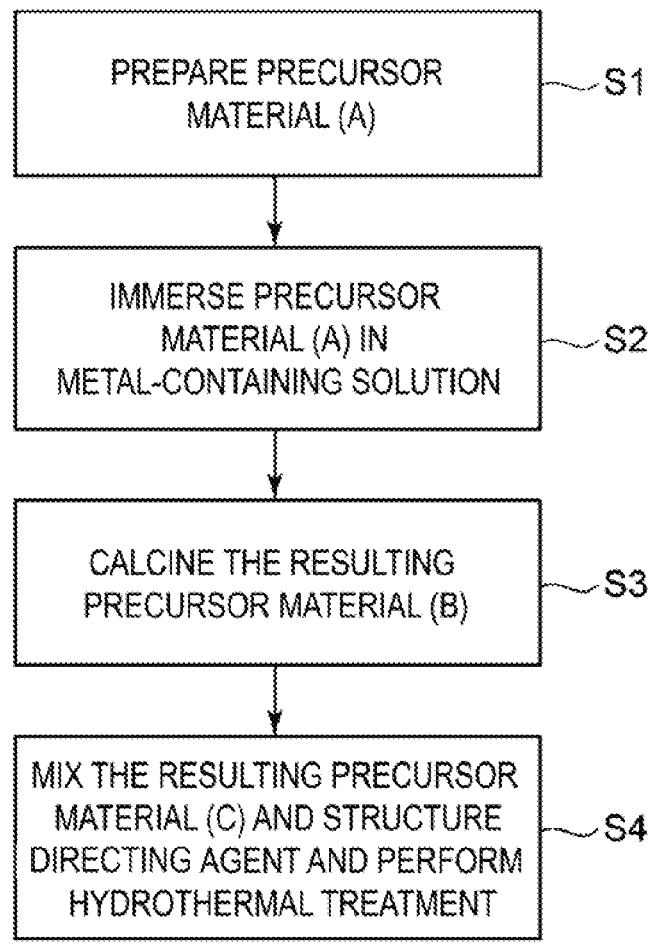
FIG. 3 is a flowchart illustrating an example of a method for making the functional structural body of FIGS. 1A and 1B.

FIG. 3 is a flowchart illustrating a method for making the functional structural body 1 of FIGS. 1A and 1B. An example of the method for making the functional structural body will be described below as an example of the case in which the functional substance present in the skeletal body is metal oxide nanoparticles.

Step S1: Preparation Step

As illustrated in FIG. 3, the precursor material (A) is first prepared for obtaining the skeletal body of the porous structure composed of the zeolite-type compound. The precursor material (A) is preferably a regular mesopore material, and can be appropriately selected according to the type (composition) of the zeolite-type compound constituting the skeletal body of the functional structural body.

Here, when the zeolite-type compound constituting the skeletal body of the functional structural body is a silicate compound, the regular mesopore material is preferably a compound including a Si—O skeletal body in which pores having a pore diameter from 1 to 50 nm are uniformly sized and regularly developed one-dimensionally, two-dimensionally, or three-dimensionally. While such a regular mesopore material is obtained as a variety of synthetic materials depending on the synthetic conditions. Specific examples of the synthetic material include SBA-1, SBA-15, SBA-16, KIT-6, FSM-I6, and MCM-41. Among them, MCM-41 is preferred. Note that the pore diameter of SBA-1 is from 10 to 30 nm, the pore diameter of SBA-15 is from 6 to 10 nm, the pore diameter of SBA-16 is 6 nm, the pore diameter of KIT-6 is 9 nm, the pore diameter of FSM-16 is from 3 to 5 nm, and the pore diameter of MCM-41 is from 1 to 10 nm. Examples of such a regular mesopore material include mesoporous silica, mesoporous aluminosilicate, and mesoporous metallosilicate.

The precursor material (A) may be a commercially available product or a synthetic product. When the precursor material (A) is synthesized, it can be synthesized by a known method for synthesizing a regular mesopore material. For example, a mixed solution including a raw material containing the constituent elements of the precursor material (A) and a molding agent for defining the structure of the precursor material (A) is prepared, and the pH is adjusted as necessary to perform hydrothermal treatment (hydrothermal synthesis). Thereafter, the precipitate (product) obtained by hydrothermal treatment is recovered (e.g., filtered), washed and dried as necessary, and then sintered to obtain a precursor material (A) which is a powdered regular mesopore material. Here, examples of the solvent of the mixed solution that can be used include water, an organic solvent such as alcohol, or a mixed solvent thereof. In addition, the raw material is selected according to the type of the skeletal body, but examples include silica agents such as tetraethoxysilane (TEOS), fumed silica, and quartz sand. In addition, various types of surfactants, block copolymers, and the like can be used as the molding agent, and it is preferably selected depending on the type of the synthetic materials of the regular mesopore material. For example, a surfactant such as hexadecyltrimethylammonium bromide is preferable when producing MCM-41. The hydrothermal treatment can be performed at from 0 to 2000 kPa at 80 to 800° C. for 5 hours to 240 hours in a sealed container. For example, the sintering treatment can be performed in air, at 350 to 850° C. for 2 hours to 30 hours.

Step S2: Impregnating Step

The prepared precursor material (A) is then impregnated with the metal-containing solution to obtain the precursor material (B).

The metal-containing solution is a solution containing a metal component (for example, a metal ion) corresponding to the metal element (M) constituting the metal oxide nanoparticles of the functional structural body, and can be prepared, for example, by dissolving a metal salt containing a metal element (M) in a solvent. Examples of such metal salts include metal salts such as chlorides, hydroxides, oxides, sulfates, and nitrates. Of these, nitrates are preferable. Examples of the solvent that can be used include water, an organic solvent such as alcohol, or a mixed solvent thereof.

The method for impregnating the precursor material (A) with the metal-containing solution is not particularly limited; however, for example, the metal-containing solution is preferably added in portions in a plurality of times while mixing the powdered precursor material (A) before the sintering step described below. In addition, the surfactant is preferably added to the precursor material (A) as the additive before adding the metal-containing solution to the precursor material (A) from the perspective of allowing the metal-containing solution to enter the pores of the precursor material (A) more easily. It is believed that such additives serve to cover the outer surface of the precursor material (A) and inhibit the subsequently added metal-containing solution from adhering to the outer surface of the precursor material (A), making it easier for the metal-containing solution to enter the pores of the precursor material (A).

Examples of such additives include non-ionic surfactants such as polyoxyethylene oleyl ether, polyoxyethylene alkyl ether, and polyoxyethylene alkylphenyl ether. It is believed that these surfactants do not adhere to the interior of the pores because their molecular size is large and cannot enter the pores of the precursor material (A), and will not interfere with the penetration of the metal-containing solution into the pores. As the method for adding the non-ionic surfactant, for example, it is preferable to add from 50 to 500 mass % of the non-ionic surfactant to the precursor material (A) prior to the sintering step described below. In a case where the added amount of the non-ionic surfactant to the precursor material (A) is less than 50 mass %, the aforementioned suppressing action will not easily occur, and when greater than 500 mass % of the non-ionic surfactant is added to the precursor material (A), the viscosity is too high, which is not preferable. Thus, the added amount of the non-ionic surfactant to the precursor material (A) is a value within the range described above.

Furthermore, the added amount of the metal-containing solution added to the precursor material (A) is preferably adjusted as appropriate in consideration of the amount of the metal element (M) contained in the metal-containing solution with which the precursor material (A) is impregnated (that is, the amount of the metal element (M) present in the precursor material (B)). For example, prior to the sintering step described below, the value obtained by converting the added amount of the metal-containing solution added to the precursor material (A) to a ratio of silicon (Si) constituting the precursor material (A) to a metal element (M) included in the metal-containing solution added to the precursor material (A) (the ratio of number of atoms Si/M) is preferably adjusted to from 10 to 1000, and more preferably from 50 to 200. For example, in a case where the surfactant is added to the precursor material (A) as the additive prior to adding the metal-containing solution to the precursor material (A), when the value obtained by converting the added amount of the metal-containing solution added to the precursor material (A) to the ratio of number of atoms Si/M is from 50 to 200, from 0.5 to 2.5 mass % of the metal element of the metal oxide nanoparticles can be included in the functional structural body. In the state of the precursor material (B), the amount of the metal element (M) present within the pores is generally proportional to the added amount of the metal-containing solution added to the precursor material (A) in a case where the metal concentration of the metal-containing solution, the presence or absence of additives, and other conditions such as temperature, pressure, and the like are the same. The amount of metal element (M) present in the precursor material (B) is also in a proportional relationship to the amount of metal element constituting the metal oxide nanoparticles embedded in the skeletal body of the functional structural body. Thus, by controlling the added amount of the metal-containing solution added to the precursor material (A) to the range described above, the pores of the precursor material (A) can be sufficiently impregnated with the metal-containing solution, and thus the amount of metal oxide nanoparticles present in the skeletal body of the functional structural body can be adjusted.

After impregnating the precursor material (A) with the metal-containing solution, a washing treatment may be performed as necessary. Examples of the solvent of the washing solution that can be used include water, an organic solvent such as alcohol, or a mixed solvent thereof. Furthermore, the precursor material (A) is preferably impregnated with the metal-containing solution, and after the washing treatment is performed as necessary, the precursor material (A) is further subjected to drying treatment. Drying treatments include overnight natural drying and high temperature drying at 150° C. or lower. Note that when sintering treatment described below is performed in the state in which there is a large amount of moisture remaining in the metal-containing solution and the wash solution in the precursor material (A), the skeletal structure as the regular mesopore material of the precursor material (A) may be broken, and thus it is preferable to dry them sufficiently.

Step S3: Sintering Step

Next, a precursor material (C) is obtained by sintering the precursor material (B) obtained by impregnating the precursor material (A) for obtaining the skeletal body of the porous structure composed of zeolite-type compound with the metal-containing solution.

For example, the sintering treatment is preferably performed in air, at 350 to 850° C. for 2 hours to 30 hours. The metal component that has entered the pores of the regular mesopore material undergoes crystal growth by such a sintering treatment, and metal oxide nanoparticles are formed in the pores.

Step S4: Hydrothermal Treatment Step

A mixed solution of the precursor material (C) and the structure directing agent is then prepared, and the precursor material (C) obtained by sintering the precursor material (B) is hydrothermal treated to obtain a functional structural body.

The structure directing agent is a molding agent for defining the framework of the skeletal body of the functional structural body, for example the surfactant can be used. The structure directing agent is preferably selected according to the framework of the skeletal body of the functional structural body, and for example, a surfactant such as tetraethylammonium bromide (TMABr), tetraethylammonium bromide (TEABr), and tetraethylammonium bromide (TPABr) are suitable.

The mixing of the precursor material (C) and the structure directing agent may be performed during the hydrothermal treatment step or may be performed before the hydrothermal treatment step. Furthermore, the method for preparing the mixed solution is not particularly limited, and the precursor material (C), the structure directing agent, and the solvent may be mixed simultaneously, or each of the dispersion solutions may be mixed after the precursor material (C) and the structure directing agent are each dispersed in individual solutions. Examples of the solvent that can be used include water, an organic solvent such as alcohol, or a mixed solvent thereof. In addition, it is preferable that the pH of the mixed solution is adjusted using an acid or a base prior to performing the hydrothermal treatment.

The hydrothermal treatment can be performed by a known method. For example, the hydrothermal treatment can be preferably performed at from 0 to 2000 kPa at 80 to 800° C. for 5 hours to 240 hours in a sealed container. Furthermore, the hydrothermal treatment is preferably performed under a basic atmosphere.

Although the reaction mechanism here is not necessarily clear, by performing hydrothermal treatment using the precursor material (C) as a raw material, the skeletal structure as the regular mesopore material of the precursor material (C) becomes increasingly disrupted. However, the action of the structure directing agent forms a new framework (porous structure) as the skeletal body of the functional structural body while maintaining the position of the metal oxide nanoparticles within the pores of the precursor material (C). The functional structural body obtained in this way includes the skeletal body having the porous structure and metal oxide nanoparticles present in the skeletal body, and the skeletal body has a channel in which the plurality of pores connect with each other by the porous structure, and at least a portion of the metal oxide nanoparticles are present in the channel of the skeletal body.

Furthermore, in the present embodiment, in the hydrothermal treatment step, a mixed solution in which the precursor material (C) and the structure directing agent are mixed is prepared, and the precursor material (C) is subjected to hydrothermal treatment, which is not a limitation. The precursor material (C) may be subjected to hydrothermal treatment without mixing the precursor material (C) and the structure directing agent.

The precipitate obtained after hydrothermal treatment (functional structural body) is preferably washed, dried, and sintered as necessary after recovery (e.g., filtration). Examples of the washing solution that can be used include water, an organic solvent such as alcohol, or a mixed solution thereof. Drying treatments include overnight natural drying and high temperature drying at 150° C. or lower. Note that when sintering treatment is performed in the state in which there is a large amount of moisture remaining in the precipitate, the framework as a skeletal body of the functional structural body may be broken, and thus it is preferable to dry the precipitate sufficiently. For example, the sintering treatment can be also performed in air, at 350 to 850° C. for 2 hours to 30 hours. Such sintering treatment burns out the structure directing agent that has been attached to the functional structural body. Furthermore, the functional defining agent can be used as-is without subjecting the recovered precipitate to sintering, depending on the intended use. For example, in a case where the environment in which the functional structural body is used is a high temperature environment of an oxidizing atmosphere, exposing the functional structural body to a usage environment for a period of time allows the structure directing agent to be burned out and to obtain a functional structural body similar to that when subjected to sintering treatment. Thus, the obtained functional structural body can be used as is.

The method for making the functional structural body in the case where the functional substance is a metal oxide nanoparticles has been described as an example, but also when the functional substance is metallic nanoparticles, a functional structural body can be produced generally in the similar manner as described above. For example, after obtaining the functional structural body having metal oxide particles as described above, the functional structural body in which metal nanoparticles present in the skeletal body can be obtained by reducing treatment under a reducing gas atmosphere such as hydrogen gas. In this case, the metal oxide nanoparticles present in the skeletal body are reduced, and metallic nanoparticles corresponding to the metal element (M) constituting the metal oxide nanoparticles are formed. Alternatively, by making the metal element (M) contained in the metal-containing solution with which the precursor material (A) is impregnated as the metal type that is not prone to oxidation (for example, a noble metal), the metallic nanoparticles can be grown in crystals in a sintering step (step S3), and then hydrothermal treatment is performed to obtain a functional structural body in which metal nanoparticles are present in the skeletal body.

Modified Example of Functional Structural Body 1

Figure 4:
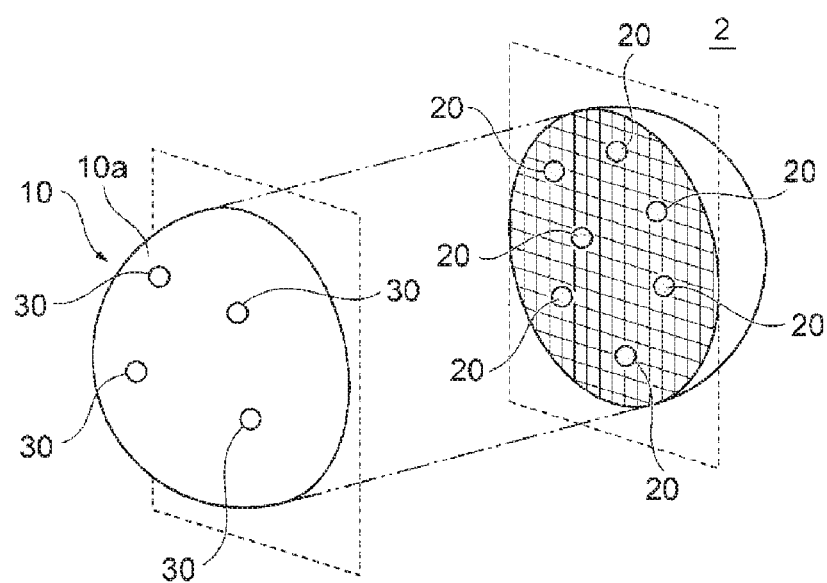
FIG. 4 is a schematic view illustrating a modified example of the functional structural body of FIGS. 1A and 1B.

FIG. 4 is a schematic view illustrating a modified example of the functional structural body 1 in FIGS. 1A and 1B.

Although the functional structural body 1 of FIGS. 1A and 1B illustrates the case in which it includes the skeletal body 10 and the functional substance 20 present in the skeletal body 10, the functional structural body 1 is not limited to this configuration. For example, as illustrated in FIG. 4, the functional structural body 2 may further include at least one functional material 30 held on the outer surface 10a of the skeletal body 10.

This functional substance 30 is a substance that exhibits one or more functions. The functions of the other functional material 30 may be the same or different from the function of the functional substance 20. A specific example of the function of the other functional substance 30 is the same as that described for the functional substance 20, and preferably has a catalytic function, and the functional substance 30 is a catalytic substance. Also, in a case where both the functional substances 20, 30 are materials having the same function, the material of the other functional substance 30 may be the same as or different from the material of the functional substance 20. According to this configuration, the content of functional substances held in the functional structural body 2 can be increased, and the functions of the functional substance can be further accelerated.

In this case, the content of the functional substance 20 present in the skeletal body 10 is preferably greater than that of the other functional substance 30 held on the outer surface 10a of the skeletal body 10. As a result, the function of the functional substance 20 held inside the skeletal body 10 becomes dominant, and functions of the functional substances are stably exhibited.

Hereinbefore, the functional structural body according to the present embodiments has been described, but the present disclosure is not limited to the above embodiments, and various modifications and changes are possible on the basis of the technical concept of the present disclosure.

EXAMPLES

Example 1 to 384

Synthesis of Precursor Material (A)

A mixed aqueous solution was prepared by mixing a silica agent (tetraethoxysilane (TEOS), available from Wako Pure Chemical Industries, Ltd.) and a surfactant as the molding agent. The pH was adjusted as appropriate, and hydrothermal treatment was performed at from 80 to 350° C. for 100 hours in a sealed container. Thereafter, the produced precipitate was filtered out, washed with water and ethanol, and then sintered in air at 600° C. for 24 hours to obtain the precursor material (A) of the type and having the pore diameter shown in Tables 1 to 8. Note that the following surfactant was used depending on the type of the precursor material (A).

MCM-41: Hexadecyltrimethylammonium bromide (CTAB) (manufactured by Wako Pure Chemical Industries, Ltd.)

SBA-1: Pluronic P123 (manufactured by BASF)

Fabrication of Precursor Material (B) and (C)

Next, a metal-containing aqueous solution was prepared by dissolving a metal salt containing the metal element (M) in water according to the metal element (M) constituting the metal oxide nanoparticles of the type shown in Tables 1 to 8. Note that the metal salt was used in accordance with the type of metal oxide nanoparticles ("metal oxide nanoparticles: metal salt").

$CoO_x$: Cobalt nitrate (II) hexahydrate (manufactured by Wako Pure Chemical Industries, Ltd.)

$NiO_x$: Nickel nitrate (II) hexahydrate (manufactured by Wako Pure Chemical Industries, Ltd.)

$FeO_x$: Iron nitrate (III) nonahydrate (manufactured by Wako Pure Chemical industries, Ltd.)

$CuO_x$: Copper nitrate (II) trihydrate (manufactured by Wako Pure Chemical industries, Ltd.)

Next, a metal-containing solution was added to the powdered precursor material (A) in portions, and dried at room temperature (20° C.±10° C.) for 12 hours or longer to obtain the precursor material (B).

Note that when the presence or absence of additives shown in Tables 1 to 8 is "yes", pretreatment in which an aqueous solution of polyoxyethylene (15) oleyl ether (NLKKOL BO-15 V, available from Nikko Chemicals Co., Ltd.) is added as the additive to the precursor material (A) prior to adding the metal-containing aqueous solution, and then the aqueous solution containing a metal was added as described above. Note that when "no" is used in the presence or absence of an additive, pretreatment with an additive such as that described above has not been performed.

Furthermore, the added amount of the metal-containing aqueous solution added to the precursor material (A) was adjusted so that the value obtained by converting to a ratio of silicon (Si) constituting the precursor material (A) to a metal element (M) included in the metal-containing solution is in Tables 1 to 8.

Next, the precursor material (B) impregnated with the metal-containing aqueous solution obtained as described above was sintered in air at 600° C. for 24 hours to obtain the precursor material (C).

Synthesis of Functional Structural Body.

The precursor material (C) obtained as described above and the structure directing agent shown in Tables 1 to 8 were mixed to produce a mixed aqueous solution. Hydrothermal treatment was performed under the conditions of at 80 to 350° C., at pH and time shown in Tables 1 to 8 in a sealed container. Thereafter, the produced precipitate was filtered out, washed with water, dried at 100° C. for 12 hours or longer, and further sintered in air at 600° C. for 24 hours to obtain a functional structural body having the skeletal body shown in Tables 1 to 8 and metal oxide nanoparticles as the functional substance (Example 1 to 384).

Comparative Example 1

In Comparative Example 1, cobalt oxide powder (II, III) having an average particle size of 50 nm or less (available from Sigma-Aldrich Japan LLC) was mixed with MFI type silicalite, and a functional structural body in which cobalt oxide nanoparticles were attached as the functional substance to the outer surface of the silicalite as the skeletal body. MFI type silicalite was synthesized in the similar manner as in Examples 52 to 57 except for a step of adding a metal.

Comparative Example 2

In Comparative Example 2, MFI type silicalite was synthesized in the similar manner as in Comparative Example 1 except that the step of attaching the cobalt oxide nanoparticles was omitted.

Examples 385 to 768

In Example 385 to 768, precursor materials (C) were obtained in the similar manner as in Comparative Example 1 except that the conditions in the synthesis of the precursor material (A) and the fabrication of the precursor materials (B) and (C) were changed as in Tables 9 to 16. Note that the metal salt used in making the metal-containing aqueous solution was used in accordance with the type of metallic nanoparticies below of ("metallic nanoparticies: metal salt").

Co. cobalt nitrate (II) hexahydrate (manufactured by Wako Pure Chemical Industries, Ltd.)
Ni: nickel nitrate (II) hexahydrate (manufactured by Wako Pure Chemical Industries, Ltd.)
Fe: iron nitrate (III) nonahydrate (manufactured by Wako Pure Chemical Industries, Ltd.)
Cu: Copper nitrate (II) trihydrate (manufactured by Wako Pure Chemical Industries, Ltd.)

Synthesis of Functional Structural Body

The precursor material (C) obtained as described above and the structur directing agent shown in Tables 9 to 16 were mixed to produce a mixed aqueous solution. Hydrothermal treatment was performed under the conditions of at from 80 to 350° C., at pH and time shown in Tables 9 to 16 in a sealed container. Thereafter, the produced precipitate was filtered off, washed with water, dried at 100° C. for 12 hours or longer, and then sintered in air at 600° C. for 24 hours. The sintered product was then recovered and reduction treatment was performed under the inflow of hydrogen gas at 400° C. for 350 minutes to obtain functional structural bodies containing the skeletal body shown in Tables 9 to 19 and metallic nanoparticles as the functional substance (Examples 385 to 768).

Evaluation

Various characteristic evaluations were performed on the functional structural bodies of the above examples and the silicalite of the comparative examples under the conditions described below.

[A] Cross Sectional Observation

An observation sample was produced using a pulverization method for the functional structural body of the examples described above and the cobalt oxide nanoparticles adhering silicalite of Comparative Example 1, and the cross section observation was performed using a transmission electron microscope (TEM) (TITAN G2, available from FEI).

As a result, it was confirmed that, in the functional structural body of the example described above, the functional substance is embedded and held inside the skeletal body made from silicalite or zeolite (is capsuled in silicalite or zeolite). On the other hand, in the silicalite of Comparative Example 1, the functional substances were only attached to the outer surface of the skeletal body and were not present inside the skeletal body.

In addition, of the examples described above, FeOx nano-particles were capsuled in the functional structure cut out by FIB (focused ion beam) processing, and the section element analysis was performed using SEM (SU8020, available from Hitachi High-Technologies Corporation), EDX (X-Max, available from Horiba, Ltd.). As a result, elements Fe were detected from inside the skeletal body.

It was confirmed that iron oxide nanoparticles were present in the skeletal body from the results of the cross-sectional observation using TEM and. SEM/EDX.

[B] Average Inner Diameter of the Channel the Skeletal Body and Average Particle Size of the Functional Substance In the TEM image taken by the cross-sectional observation performed in evaluation [A] above, 500 channels of the skeletal body were randomly selected, and the respective major diameter and the minor diameter were measured, and the respective inner diameters were calculated from the average values (N=500), and the average value of the inner diameter was determined to be the average inner diameter $D_F$ of the channel of the skeletal body. In addition, for the functional substances, 500 functional substances were randomly selected from the TEM image, and the respective particle sizes were measured (N=500), and the average value thereof was determined to be the average particle size $D_C$ of the functional substance. The results are shown in Tables 1 to 16.

Also, SAXS (small angle X-ray scattering) was used to analyze the average particle size and dispersion status of the functional substance. Measurements by SAXS were performed using a Spring-8 beam line BL19B2. The obtained SAXS data was fitted with a spherical model using the Guinier approximation method, and the particle size was calculated. Particle size was measured for the functional structural body in which the metal oxide is iron oxide nanoparticles. Furthermore, as a comparative reference, a commercially available iron oxide nanoparticles (available from Wako) was observed and measured on SEM.

As a result, in commercial products, various sizes of iron oxide nanoparticles were randomly present in a range of particle sizes of approximately 50 nm to 400 nm, whereas in the measurement results of SAXS, scattering peaks with particle sizes of 10 nm or less were also detected in the functional structural bodies of each example having an average particle size from 1.2 nm to 2.0 nm determined from the TEM image. From the results of SAXS measurement and the SEM/EDX cross-sectional measurement, it was found that functional substances having a particle size of 10 nm or less are present in the skeletal body in a dispersed state with an array of particle sizes and very high dispersion. In addition, in the functional structural body of Examples 385 to 768, the reduction treatment was performed at 400° C. or higher, but the particle size of 10 nm or less was maintained in each example after Example 385 and having an average particle size from 1.2 nm to 2.0 nm determined from the TEM image.

[C] Relationship Between the Added Amount of the Metal-Containing Solution and the Amount of Metal Embedded in the Skeletal Body A functional structural body in which metal oxide nanoparticles were embedded in the skeletal body at added amount of the ratio of number of atoms of Si/M=50, 100, 200, 1,000 (M=Co, Ni, Fe, Cu) was produced, and then the amount of metal (mass %) that was embedded in the skeletal body of the functional structural body produced at the above added amount was measured. Note that in the present measurement, a functional structural body having the ratio of number of atoms of Si/M=100, 200, 1000 is produced by adjusting the added amount of the metal-containing solution in the same manner as the functional structural body of the Si/M=100, 200, 1000 ratio of number of atoms of Examples 1 to 384, and Functional structural bodies with Si/M=50 ratio of number of atoms were made in the same manner as the functional structural body with the ratio of number of atoms of Si/M=100, 200, 1000, except that the added amount of the metal-containing solution was varied.

The amount of metal was quantified by ICP (radiofrequency inductively coupled plasma) alone or in combination with ICP and XRF (fluorescence X-ray analysis). XRF (energy dispersive fluorescent x-ray analyzer "SEA1200VX", available from SSI Nanotechnology) was performed under conditions of a vacuum atmosphere, an accelerating voltage 15 kV (using a Cr filter), or an accelerating voltage 50 kV (using a Pb filter).

XRF is a method for calculating the amount of metal present in terms of fluorescence intensity, and XRF alone cannot calculate a quantitative value (in terms of mass %). Therefore, the metal content of the functional structural body to which the metal was added at Si/M=100 was determined by ICP analysis, and the metal content of the functional structural body in which the metal was added at Si/M=50 and less than 100 was calculated based on XRF measurement results and ICP measurement results.

As a result, it was confirmed that the amount of metal embedded in the functional structural body increases as the added amount of the metal-containing solution increases, at least within a range that the ratio of numbers of atom is within 50 to 1000.

[D] Performance Evaluation

The catalytic capacity (performance) of the functional substances (catalytic substances) was evaluated for the functional structural bodies of the examples described above and the silicalite of the comparative examples. The results are shown in Tables 1 to 16.

(1) Catalytic Activity

The catalytic activity was evaluated under the following conditions:

First. 0.2 g of the functional structural body was charged in a normal pressure flow reactor, and a decomposition reaction of butyl benzene (model material for heavy oil) was performed with nitrogen gas ($N_2$) as a carrier gas (5 ml/min) at 400° C. for 2 hours.

After completion of the reaction, the generated gas and the generated liquid that were collected were analyzed by gas chromatography (GC) and gas chromatography mass spectrometry (GC/MS) for the composition.

Note that, as the analysis device, TRACE 1310 GC (available from Thermo Fisher Scientific Inc., detector: thermal conductivity detector, flame ionization detector), and TRACE DSQ (Thermo Fischer Scientific Inc., detector: mass detector, ionization method: EI (ion source temperature 250° C., MS transfer line temperature of 320° C.)) were used.

Furthermore, based on the results of the component analysis described above, the yield (mol %) of a compound having a molecular weight lower than that of butylbenzene (specifically, benzene, toluene, ethylbenzene, styrene, cumene, methane, ethane, ethylene, propane, propylene, butane, butene, and the like) was calculated. The yield of the compound was calculated as the percentage (mol %) of the total amount (mol) of the amount of the compound having a lower molecular weight than the butylbenzene contained in the production liquid (mol %) relative to the amount of butyl benzene material (mol) prior to the reaction.

In the present example, when the yield of a compound having a molecular weight lower than that of butyl benzene contained in the product liquid is 40 mol % or greater, it is determined that catalyst activity (resolution) is excellent, and considered as "A". When it is 25 mol % or greater and less than 40 mol %, it is determined that catalyst activity is good, and considered as "B". When it is 10 mol % or greater and less than 25 mol %, it is determined that catalyst activity is not good, but is pass level (acceptable), and considered as "C". When it is less than 10 mol %, it is determined that catalyst activity is poor (not pass), and considered as "D".

(2) Durability (Life Time)

The durability was evaluated under the following conditions:

First, the functional structural body used in evaluation (1) above was recovered and heated at 65° C. for 12 hours to produce a functional structural body after heating. Next, a decomposition reaction of butyl benzene (model material of heavy oil) was performed by the similar method as in evaluation (1) above using the obtained functional structural body after heating, and component analysis of the generated gas and the generated liquid was performed in the similar manner as in the above evaluation (1).

Based on the obtained analytical results, the yield (mol %) of a compound having a molecular weight lower than that of butylbenzen.e was determined in the similar manner as in evaluation (1) above. Furthermore, the degree of maintaining the yield of the above compound by the functional structural body after heating was compared to the yield of the above compound by the functional structural body prior to heating (the yield determined in evaluation (1) above). Specifically, the percentage (%) of the yield of the compound obtained by the functional structural body after heating (yield determined by evaluation (2) above) to the yield of the above compound by the functional structural body prior to heating (yield determined by the present evaluation (1) above) was calculated.

In the present embodiment, when the yield of the compound (yield determined by the present evaluation (2)) of the above compound due to the functional structural body after heating (yield determined by the present evaluation (2)) is maintained at least 80% compared to the yield of the compound obtained by the functional structural body prior to heating (yield determined by evaluation (I) above), it is determined that durability (heat resistance) is excellent, and considered as "A". When it is maintained 60% or greater and less than 80%, it is determined that durability (heat resistance) good, and considered as "B". When it is maintained 40% or greater and less than 60%, it is determined that durability (heat resistance) is not good, but is pass level (acceptable), and considered as "C". When it is reduced below 40%, it is determined that durability (heat resistance) is poor (not pass), and considered as "D".

Performance evaluations similar to those of evaluation (1) and (2) above were also performed on Comparative Examples 1 and 2. Note that Comparative Example 2 contains the skeletal body only, and do not contain the functional substance. Therefore, in the performance evaluation described above, only the skeletal body of Comparative Example 2 was charged in place of the functional structural body. The results are shown in Table 8.

TABLE 1

| | Making Conditions of Functional Structural Body | | | | | |
|---|---|---|---|---|---|---|
| | Precursor Material (A) | | Addition to Precursor Material (A) | Hydrothermal Treatment Conditions using Precursor Material (C) | | |
| No. | Type | Pore Diameter (nm) | Presence or Absence of Additives | Conversion Ratio of Added Amount of Metal-containing Solution (Ratio of Number of Atoms) Si/M | Type of Structure Directing Agent | pH | Time (h) |
| Example 1 | MCM-41 | 1.3 | Yes | 1000 | TEABr | 12 | 120 |
| Example 2 | | | | 500 | | | |
| Example 3 | | | | 200 | | | |
| Example 4 | | | | 100 | | | |
| Example 5 | | 2.0 | | | | | |
| Example 6 | | 2.4 | | | | | |
| Example 7 | | 2.6 | | | | | |
| Example 8 | | 3.3 | | | | | |
| Example 9 | | 6.6 | | | | | |
| Example 10 | SBA-1 | 13.2 | | | | | |
| Example 11 | | 19.8 | | | | | |
| Example 12 | | 26.4 | | | | | |
| Example 13 | MCM-41 | 1.3 | None | 1000 | | | |
| Example 14 | | | | 500 | | | |
| Example 15 | | | | 200 | | | |
| Example 16 | | | | 100 | | | |
| Example 17 | | 2.0 | | | | | |
| Example 18 | | 2.4 | | | | | |
| Example 19 | | 2.6 | | | | | |
| Example 20 | | 3.3 | | | | | |
| Example 21 | | 6.6 | | | | | |
| Example 22 | SBA-1 | 13.2 | | | | | |
| Example 23 | | 19.8 | | | | | |
| Example 24 | | 26.4 | | | | | |
| Example 25 | MCM-41 | 1.1 | Yes | 1000 | | 11 | 72 |
| Example 26 | | | | 500 | | | |
| Example 27 | | | | 200 | | | |
| Example 28 | | | | 100 | | | |
| Example 29 | | 1.6 | | | | | |
| Example 30 | | 2.0 | | | | | |
| Example 31 | | 2.2 | | | | | |
| Example 32 | | 2.7 | | | | | |
| Example 33 | | 5.4 | | | | | |
| Example 34 | SBA-1 | 10.9 | | | | | |
| Example 35 | | 16.3 | | | | | |
| Example 36 | | 21.8 | | | | | |
| Example 37 | MCM-41 | 1.1 | None | 1000 | | | |
| Example 38 | | | | 500 | | | |
| Example 39 | | | | 200 | | | |
| Example 40 | | | | 100 | | | |
| Example 41 | | 1.6 | | | | | |
| Example 42 | | 2.0 | | | | | |
| Example 43 | | 2.2 | | | | | |
| Example 44 | | 2.7 | | | | | |
| Example 45 | | 5.4 | | | | | |
| Example 46 | SBA-1 | 10.9 | | | | | |
| Example 47 | | 16.3 | | | | | |
| Example 48 | | 21.8 | | | | | |

TABLE 1-continued

| | Functional Structural Body | | | | | | |
|---|---|---|---|---|---|---|---|
| | Skeletal body Zeolite-Type Compound | | Functional Substance Metal Oxide | | | | |
| | | Average | Nanoparticles | | | Performance Evaluation | |
| | | Inner Diameter of Channels $D_F$ | | Average particle size $D_C$ | | Catalytic | |
| No. | Framework | (nm) | Type | (nm) | $D_C/D_F$ | Activity | Durability |
| Example 1 | FAU | 0.74 | $CoO_x$ | 0.13 | 0.2 | C | C |
| Example 2 | | | | 0.40 | 0.5 | C | C |
| Example 3 | | | | 0.66 | 0.9 | B | C |
| Example 4 | | | | 1.32 | 1.8 | A | B |
| Example 5 | | | | 1.98 | 2.7 | A | B |
| Example 6 | | | | 2.38 | 3.2 | A | A |
| Example 7 | | | | 2.64 | 3.6 | A | A |
| Example 8 | | | | 3.30 | 4.5 | A | A |
| Example 9 | | | | 6.61 | 8.9 | B | A |
| Example 10 | | | | 13.21 | 17.9 | B | A |
| Example 11 | | | | 19.82 | 26.8 | C | A |
| Example 12 | | | | 26.43 | 35.7 | C | A |
| Example 13 | | | | 0.13 | 0.2 | C | C |
| Example 14 | | | | 0.40 | 0.5 | C | C |
| Example 15 | | | | 0.66 | 0.9 | B | C |
| Example 16 | | | | 1.32 | 1.8 | A | B |
| Example 17 | | | | 1.98 | 2.7 | A | B |
| Example 18 | | | | 2.38 | 3.2 | B | A |
| Example 19 | | | | 2.64 | 3.6 | B | A |
| Example 20 | | | | 3.30 | 4.5 | B | A |
| Example 21 | | | | 6.61 | 8.9 | C | A |
| Example 22 | | | | 13.21 | 17.9 | C | A |
| Example 23 | | | | 19.82 | 26.8 | C | A |
| Example 24 | | | | 26.43 | 35.7 | C | A |
| Example 25 | MTW | 0.61 | | 0.11 | 0.2 | C | C |
| Example 26 | | | | 0.33 | 0.5 | C | C |
| Example 27 | | | | 0.54 | 0.9 | B | C |
| Example 28 | | | | 1.09 | 1.8 | A | B |
| Example 29 | | | | 1.63 | 2.7 | A | B |
| Example 30 | | | | 1.96 | 3.2 | A | B |
| Example 31 | | | | 2.18 | 3.6 | A | A |
| Example 32 | | | | 2.72 | 4.5 | A | A |
| Example 33 | | | | 5.45 | 8.9 | B | A |
| Example 34 | | | | 10.89 | 17.9 | B | A |
| Example 35 | | | | 16.34 | 26.8 | C | A |
| Example 36 | | | | 21.79 | 35.7 | C | A |
| Example 37 | | | | 0.11 | 0.2 | C | C |
| Example 38 | | | | 0.33 | 0.5 | C | C |
| Example 39 | | | | 0.54 | 0.9 | B | C |
| Example 40 | | | | 1.09 | 1.8 | A | B |
| Example 41 | | | | 1.63 | 2.7 | A | B |
| Example 42 | | | | 1.96 | 3.2 | A | B |
| Example 43 | | | | 2.18 | 3.6 | B | A |
| Example 44 | | | | 2.72 | 4.5 | B | A |
| Example 45 | | | | 5.45 | 8.9 | C | A |
| Example 46 | | | | 10.89 | 17.9 | C | A |
| Example 47 | | | | 16.34 | 26.8 | C | A |
| Example 48 | | | | 21.79 | 35.7 | C | A |

TABLE 2

| | Making Conditions of Functional Structural Body | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio of Added Amount of Metal-containing Solution (Ratio of Number of Atoms) Si/M | Type of Structure Directing Agent | pH | Time (h) |
| Example 49 | MCM-41 | 1.0 | Yes | 1000 | TPABr | 12 | 72 |
| Example 50 | | 1.0 | | 500 | | | |
| Example 51 | | 1.0 | | 200 | | | |
| Example 52 | | 1.0 | | 100 | | | |
| Example 53 | | 1.5 | | | | | |
| Example 54 | | 1.8 | | | | | |
| Example 55 | | 2.0 | | | | | |
| Example 56 | | 2.5 | | | | | |
| Example 57 | | 5.0 | | | | | |
| Example 58 | SBA-1 | 10.0 | | | | | |
| Example 59 | | 15.0 | | | | | |
| Example 60 | | 20.0 | | | | | |
| Example 61 | MCM-41 | 1.0 | None | 1000 | | | |
| Example 62 | | 1.0 | | 500 | | | |
| Example 63 | | 1.0 | | 200 | | | |
| Example 64 | | 1.0 | | 100 | | | |
| Example 65 | | 1.5 | | | | | |
| Example 66 | | 1.8 | | | | | |
| Example 67 | | 2.0 | | | | | |
| Example 68 | | 2.5 | | | | | |
| Example 69 | | 5.0 | | | | | |
| Example 70 | SBA-1 | 10.0 | | | | | |
| Example 71 | | 15.0 | | | | | |
| Example 72 | | 20.0 | | | | | |
| Example 73 | MCM-41 | 1.0 | Yes | 1000 | TMABr | 12 | 120 |
| Example 74 | | 1.0 | | 500 | | | |
| Example 75 | | 1.0 | | 200 | | | |
| Example 76 | | 1.0 | | 100 | | | |
| Example 77 | | 1.5 | | | | | |
| Example 78 | | 1.8 | | | | | |
| Example 79 | | 2.0 | | | | | |
| Example 80 | | 2.5 | | | | | |
| Example 81 | | 5.1 | | | | | |
| Example 82 | SBA-1 | 10.2 | | | | | |
| Example 83 | | 15.3 | | | | | |
| Example 84 | | 20.4 | | | | | |
| Example 85 | MCM-41 | 1.0 | None | 1000 | | | |
| Example 86 | | 1.0 | | 500 | | | |
| Example 87 | | 1.0 | | 200 | | | |
| Example 88 | | 1.0 | | 100 | | | |
| Example 89 | | 1.5 | | | | | |
| Example 90 | | 1.8 | | | | | |
| Example 91 | | 2.0 | | | | | |
| Example 92 | | 2.5 | | | | | |
| Example 93 | | 5.1 | | | | | |
| Example 94 | SBA-1 | 10.2 | | | | | |
| Example 95 | | 15.3 | | | | | |
| Example 96 | | 20.4 | | | | | |

| | Functional Structural Body | | | | | | |
|---|---|---|---|---|---|---|---|
| | Skeletal Body Zeolite-Type Compound | | Functional Substance Metal Oxide Nanoparticles | | | Performance Evaluation | |
| No. | Framework | Average Inner Diameter of Channels $D_F$ (nm) | Type | Average particle size $D_C$ (nm) | $D_C/D_F$ | Catalytic Activity | Durability |
| Example 49 | MFI | 0.56 | $CoO_x$ | 0.10 | 0.2 | C | C |
| Example 50 | | 0.56 | | 0.30 | 0.5 | C | C |
| Example 51 | | 0.56 | | 0.50 | 0.9 | B | C |

TABLE 2-continued

| | | | | | | |
|---|---|---|---|---|---|---|
| Example 52 | | 0.56 | 1.00 | 1.8 | A | B |
| Example 53 | | 0.56 | 1.50 | 2.7 | A | B |
| Example 54 | | 0.56 | 1.08 | 3.2 | A | A |
| Example 55 | | 0.56 | 2.00 | 3.6 | A | A |
| Example 56 | | 0.56 | 2.50 | 4.5 | A | A |
| Example 57 | | 0.56 | 5.00 | 8.9 | B | A |
| Example 58 | | 0.56 | 10.00 | 17.9 | B | A |
| Example 59 | | 0.56 | 15.00 | 26.8 | C | A |
| Example 60 | | 0.56 | 20.00 | 35.7 | C | A |
| Example 61 | | 0.56 | 0.10 | 0.2 | C | C |
| Example 62 | | 0.56 | 0.30 | 0.5 | C | C |
| Example 63 | | 0.56 | 0.50 | 0.9 | B | C |
| Example 64 | | 0.56 | 1.00 | 1.8 | A | B |
| Example 65 | | 0.56 | 1.50 | 2.7 | A | B |
| Example 66 | | 0.56 | 1.80 | 3.2 | B | A |
| Example 67 | | 0.56 | 2.00 | 3.6 | B | A |
| Example 68 | | 0.56 | 2.50 | 4.5 | B | A |
| Example 69 | | 0.56 | 5.00 | 8.9 | C | A |
| Example 70 | | 0.56 | 10.00 | 17.9 | C | A |
| Example 71 | | 0.56 | 15.00 | 26.8 | C | A |
| Example 72 | | 0.56 | 20.00 | 35.7 | C | A |
| Example 73 | FER | 0.57 | 0.10 | 0.2 | C | C |
| Example 74 | | 0.57 | 0.31 | 0.5 | C | C |
| Example 75 | | 0.57 | 0.51 | 0.9 | B | C |
| Example 76 | | 0.57 | 1.02 | 1.8 | A | B |
| Example 77 | | 0.57 | 1.53 | 2.7 | A | B |
| Example 78 | | 0.57 | 1.83 | 3.2 | A | B |
| Example 79 | | 0.57 | 2.04 | 3.6 | A | A |
| Example 80 | | 0.57 | 2.54 | 4.5 | A | A |
| Example 81 | | 0.57 | 5.09 | 8.9 | B | A |
| Example 82 | | 0.57 | 10.18 | 17.9 | B | A |
| Example 83 | | 0.57 | 15.27 | 26.8 | C | A |
| Example 84 | | 0.57 | 20.36 | 35.7 | C | A |
| Example 85 | | 0.57 | 0.10 | 0.2 | C | C |
| Example 86 | | 0.57 | 0.31 | 0.5 | C | C |
| Example 87 | | 0.57 | 0.51 | 0.9 | B | C |
| Example 88 | | 0.57 | 1.02 | 1.8 | A | B |
| Example 89 | | 0.57 | 1.53 | 2.7 | A | B |
| Example 90 | | 0.57 | 1.83 | 3.2 | A | B |
| Example 91 | | 0.57 | 2.04 | 3.6 | B | A |
| Example 92 | | 0.57 | 2.54 | 4.5 | B | A |
| Example 93 | | 0.57 | 5.09 | 8.9 | C | A |
| Example 94 | | 0.57 | 10.18 | 17.9 | C | A |
| Example 95 | | 0.57 | 15.27 | 26.8 | C | A |
| Example 96 | | 0.57 | 20.36 | 35.7 | C | A |

TABLE 3

Making Conditions of Functional Structural Body

| | Precursor Material (A) | | Addition to Precursor Material (A) | | Hydrothermal Treatment Conditions using Precursor Material (C) | | |
|---|---|---|---|---|---|---|---|
| No. | Type | Pore Diameter (nm) | Presence or Absence of Additives | Conversion Ratio of Added Amount of Metal-containing Solution (Ratio of Number of Atoms) Si/M | Type of Structure Directing Agent | pH | Time (h) |
| Example 97 | MCM 41 | 1.3 | Yes | 1000 | TEABr | 12 | 120 |
| Example 98 | | | | 500 | | | |
| Example 99 | | | | 200 | | | |
| Example 100 | | | | 100 | | | |
| Example 101 | | 2.0 | | | | | |
| Example 102 | | 2.4 | | | | | |
| Example 103 | | 2.6 | | | | | |
| Example 104 | | 3.3 | | | | | |
| Example 105 | | 6.6 | | | | | |
| Example 106 | SBA 1 | 13.2 | | | | | |
| Example 107 | | 19.8 | | | | | |
| Example 108 | | 26.4 | | | | | |
| Example 109 | MCM-41 | 1.3 | None | 1000 | | | |
| Example 110 | | | | 500 | | | |
| Example 111 | | | | 200 | | | |

TABLE 3-continued

| No. | Framework | | Yes/None | | | |
|---|---|---|---|---|---|---|
| Example 112 | | | | 100 | | |
| Example 113 | | 2.0 | | | | |
| Example 114 | | 2.4 | | | | |
| Example 115 | | 2.6 | | | | |
| Example 116 | | 3.3 | | | | |
| Example 117 | | 6.6 | | | | |
| Example 118 | SBA-1 | 13.2 | | | | |
| Example 119 | | 19.8 | | | | |
| Example 120 | | 26.4 | | | | |
| Example 121 | MCM-41 | 1.1 | Yes | 1000 | 11 | 72 |
| Example 122 | | | | 500 | | |
| Example 123 | | | | 200 | | |
| Example 124 | | | | 100 | | |
| Example 125 | | 1.6 | | | | |
| Example 126 | | 2.0 | | | | |
| Example 127 | | 2.2 | | | | |
| Example 128 | | 2.7 | | | | |
| Example 129 | | 5.4 | | | | |
| Example 130 | SBA-1 | 10.9 | | | | |
| Example 131 | | 16.3 | | | | |
| Example 132 | | 21.8 | | | | |
| Example 133 | MCM-41 | 1.1 | None | 1000 | | |
| Example 134 | | | | 500 | | |
| Example 135 | | | | 200 | | |
| Example 136 | | | | 100 | | |
| Example 137 | | 1.6 | | | | |
| Example 138 | | 2.0 | | | | |
| Example 139 | | 2.2 | | | | |
| Example 140 | | 2.7 | | | | |
| Example 141 | | 5.4 | | | | |
| Example 142 | SBA-1 | 10.9 | | | | |
| Example 143 | | 16.3 | | | | |
| Example 144 | | 21.8 | | | | |

| | Functional Structural Body | | | | | | |
|---|---|---|---|---|---|---|---|
| | Skeletal Body Zeolite-Type Compound | | Functional Substance Metal Oxide Nanoparticles | | | Performance Evaluation | |
| No. | Framework | Average Inner Diameter of Channels $D_F$ (nm) | Type | Average particle size $D_C$ (nm) | $D_C/D_F$ | Catalytic Activity | Durability |
| Example 97 | FAU | 0.74 | $NiO_x$ | 0.13 | 0.2 | C | C |
| Example 98 | | | | 0.40 | 0.5 | C | C |
| Example 99 | | | | 0.66 | 0.9 | B | C |
| Example 100 | | | | 1.32 | 1.8 | A | B |
| Example 101 | | | | 1.98 | 2.7 | A | B |
| Example 102 | | | | 2.38 | 3.2 | A | A |
| Example 103 | | | | 2.64 | 3.6 | A | A |
| Example 104 | | | | 3.30 | 4.5 | A | A |
| Example 105 | | | | 6.61 | 8.9 | B | A |
| Example 106 | | | | 13.21 | 17.9 | B | A |
| Example 107 | | | | 19.82 | 26.8 | C | A |
| Example 108 | | | | 26.43 | 35.7 | C | A |
| Example 109 | | | | 0.13 | 0.2 | C | C |
| Example 110 | | | | 0.40 | 0.5 | C | C |
| Example 111 | | | | 0.66 | 0.9 | B | C |
| Example 112 | | | | 1.32 | 1.8 | A | B |
| Example 113 | | | | 1.98 | 2.7 | A | B |
| Example 114 | | | | 2.38 | 3.2 | B | A |
| Example 115 | | | | 2.64 | 3.6 | B | A |
| Example 116 | | | | 3.30 | 4.5 | B | A |
| Example 117 | | | | 6.61 | 8.9 | C | A |
| Example 118 | | | | 13.21 | 17.9 | C | A |
| Example 119 | | | | 19.82 | 26.8 | C | A |
| Example 120 | | | | 26.43 | 35.7 | C | A |
| Example 121 | MTW | 0.61 | | 0.11 | 0.2 | C | C |
| Example 122 | | | | 0.33 | 0.5 | C | C |
| Example 123 | | | | 0.54 | 0.9 | B | C |
| Example 124 | | | | 1.09 | 1.8 | A | B |
| Example 125 | | | | 1.63 | 2.7 | A | B |
| Example 126 | | | | 1.96 | 3.2 | A | B |
| Example 127 | | | | 2.18 | 3.6 | A | A |
| Example 128 | | | | 2.72 | 4.5 | A | A |

TABLE 3-continued

| | | | | |
|---|---|---|---|---|
| Example 129 | 5.45 | 8.9 | B | A |
| Example 130 | 10.89 | 17.9 | B | A |
| Example 131 | 16.34 | 26.8 | C | A |
| Example 132 | 21.79 | 35.7 | C | A |
| Example 133 | 0.11 | 0.2 | C | C |
| Example 134 | 0.33 | 0.5 | C | C |
| Example 135 | 0.54 | 0.9 | B | C |
| Example 136 | 1.09 | 1.8 | A | B |
| Example 137 | 1.63 | 2.7 | A | B |
| Example 138 | 1.96 | 3.2 | A | B |
| Example 139 | 2.18 | 3.6 | B | A |
| Example 140 | 2.72 | 4.5 | B | A |
| Example 141 | 5.45 | 8.9 | C | A |
| Example 142 | 10.89 | 17.9 | C | A |
| Example 143 | 16.34 | 26.8 | C | A |
| Example 144 | 21.79 | 35.7 | C | A |

TABLE 4

| | Making Conditions of Functional Structural Body | | | | | |
|---|---|---|---|---|---|---|
| | Precursor Material (A) | | Addition to Precursor Material (A) | | Hydrothermal Treatment Conditions using Precursor Material (C) | |
| No. | Type | Pore Diameter (nm) | Presence or Absence of Additives | Conversion Ratio of Added Amount of Metal-containing Solution (Ratio of Number of Atoms) Si/M | Type of Structure Directing Agent | pH | Time (h) |
| Example 145 | MCM-41 | 1.0 | Yes | 1000 | TEABr | 12 | 72 |
| Example 146 | | 1.0 | | 500 | | | |
| Example 147 | | 1.0 | | 200 | | | |
| Example 148 | | 1.0 | | 100 | | | |
| Example 149 | | 1.5 | | | | | |
| Example 150 | | 1.8 | | | | | |
| Example 151 | | 2.0 | | | | | |
| Example 152 | | 2.5 | | | | | |
| Example 153 | | 5.0 | | | | | |
| Example 154 | SBA-1 | 10.0 | | | | | |
| Example 155 | | 15.0 | | | | | |
| Example 156 | | 20.0 | | | | | |
| Example 157 | MCM-41 | 1.0 | None | 1000 | | | |
| Example 158 | | 1.0 | | 500 | | | |
| Example 159 | | 1.0 | | 200 | | | |
| Example 160 | | 1.0 | | 100 | | | |
| Example 161 | | 1.5 | | | | | |
| Example 162 | | 1.8 | | | | | |
| Example 163 | | 2.0 | | | | | |
| Example 164 | | 2.5 | | | | | |
| Example 165 | | 5.0 | | | | | |
| Example 166 | SBA-1 | 10.0 | | | | | |
| Example 167 | | 15.0 | | | | | |
| Example 168 | | 20.0 | | | | | |
| Example 169 | MCM-41 | 1.0 | Yes | 1000 | TMABr | 12 | 120 |
| Example 170 | | 1.0 | | 500 | | | |
| Example 171 | | 1.0 | | 200 | | | |
| Example 172 | | 1.0 | | 100 | | | |
| Example 173 | | 1.5 | | | | | |
| Example 174 | | 1.8 | | | | | |
| Example 175 | | 2.0 | | | | | |
| Example 176 | | 2.5 | | | | | |
| Example 177 | | 5.1 | | | | | |
| Example 178 | SBA-1 | 10.2 | | | | | |
| Example 179 | | 15.3 | | | | | |
| Example 180 | | 20.4 | | | | | |
| Example 181 | MCM-41 | 1.0 | None | 1000 | | | |
| Example 182 | | 1.0 | | 500 | | | |
| Example 183 | | 1.0 | | 200 | | | |
| Example 184 | | 1.0 | | 100 | | | |
| Example 185 | | 1.5 | | | | | |
| Example 186 | | 1.8 | | | | | |
| Example 187 | | 2.0 | | | | | |
| Example 188 | | 2.5 | | | | | |

TABLE 4-continued

| | | |
|---|---|---|
| Example 189 | | 5.1 |
| Example 190 | SBA-1 | 10.2 |
| Example 191 | | 15.3 |
| Example 192 | | 20.4 |

| | Functional Structural Body | | | | | |
|---|---|---|---|---|---|---|
| | Skeletal Body Zeolite-Type Compound | | Functional Substance Metal Oxide Nanoparticles | | | Performance Evaluation |
| No. | Framework | Average Inner Diameter of Channels $D_F$ (nm) | Type | Average particle size $D_C$ (nm) | $D_C/D_F$ | Catalytic Activity | Durability |
| Example 145 | MFI | 0.56 | $NiO_x$ | 0.10 | 0.2 | C | C |
| Example 146 | | 0.56 | | 0.30 | 0.5 | C | C |
| Example 147 | | 0.56 | | 0.50 | 0.9 | B | C |
| Example 148 | | 0.56 | | 1.00 | 1.8 | A | B |
| Example 149 | | 0.56 | | 1.5 | 2.7 | A | B |
| Example 150 | | 0.56 | | 1.8 | 3.2 | A | A |
| Example 151 | | 0.56 | | 2.0 | 3.6 | A | A |
| Example 152 | | 0.56 | | 2.5 | 4.5 | A | A |
| Example 153 | | 0.56 | | 5.0 | 8.9 | B | A |
| Example 154 | | 0.56 | | 10.0 | 17.9 | B | A |
| Example 155 | | 0.56 | | 15.0 | 26.8 | C | A |
| Example 156 | | 0.56 | | 20.0 | 35.7 | C | A |
| Example 157 | | 0.56 | | 0.10 | 0.2 | C | C |
| Example 158 | | 0.56 | | 0.30 | 0.5 | C | C |
| Example 159 | | 0.56 | | 0.50 | 0.9 | B | C |
| Example 160 | | 0.56 | | 1.0 | 1.8 | A | B |
| Example 161 | | 0.56 | | 1.5 | 2.7 | A | B |
| Example 162 | | 0.56 | | 1.8 | 3.2 | B | A |
| Example 163 | | 0.56 | | 2.0 | 3.6 | B | A |
| Example 164 | | 0.56 | | 2.5 | 4.5 | B | A |
| Example 165 | | 0.56 | | 5.0 | 8.9 | C | A |
| Example 166 | | 0.56 | | 10.0 | 17.9 | C | A |
| Example 167 | | 0.56 | | 15.0 | 26.8 | C | A |
| Example 168 | | 0.56 | | 20.0 | 35.7 | C | A |
| Example 169 | FER | 0.57 | | 0.10 | 0.2 | C | C |
| Example 170 | | 0.57 | | 0.31 | 0.5 | C | C |
| Example 171 | | 0.57 | | 0.51 | 0.9 | B | C |
| Example 172 | | 0.57 | | 1.02 | 1.8 | A | B |
| Example 173 | | 0.57 | | 1.5 | 2.7 | A | B |
| Example 174 | | 0.57 | | 1.8 | 3.2 | A | B |
| Example 175 | | 0.57 | | 2.0 | 3.6 | A | A |
| Example 176 | | 0.57 | | 2.5 | 4.5 | A | A |
| Example 177 | | 0.57 | | 5.1 | 8.9 | B | A |
| Example 178 | | 0.57 | | 10.2 | 17.9 | B | A |
| Example 179 | | 0.57 | | 15.3 | 26.8 | C | A |
| Example 180 | | 0.57 | | 20.4 | 35.7 | C | A |
| Example 181 | | 0.57 | | 0.10 | 0.2 | C | C |
| Example 182 | | 0.57 | | 0.31 | 0.5 | C | C |
| Example 183 | | 0.57 | | 0.51 | 0.9 | B | C |
| Example 184 | | 0.57 | | 1.0 | 1.8 | A | B |
| Example 185 | | 0.57 | | 1.5 | 2.7 | A | B |
| Example 186 | | 0.57 | | 1.8 | 3.2 | A | B |
| Example 187 | | 0.57 | | 2.0 | 3.6 | B | A |
| Example 188 | | 0.57 | | 2.5 | 4.5 | B | A |
| Example 189 | | 0.57 | | 5.1 | 8.9 | C | A |
| Example 190 | | 0.57 | | 10.2 | 17.9 | C | A |
| Example 191 | | 0.57 | | 15.3 | 26.8 | C | A |
| Example 192 | | 0.57 | | 20.4 | 35.7 | C | A |

TABLE 5

| | Making Conditions of Functional Structural Body | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio of Added Amount of Metal-containing Solution (Ratio of Number of Atoms) Si/M | Type of Structure Directing Agent | pH | Time (h) |
| Example 193 | MCM-41 | 1.3 | Yes | 1000 | TEABr | 12 | 120 |
| Example 194 | | | | 500 | | | |
| Example 195 | | | | 200 | | | |
| Example 196 | | | | 100 | | | |
| Example 197 | | 2.0 | | | | | |
| Example 198 | | 2.4 | | | | | |
| Example 199 | | 2.6 | | | | | |
| Example 200 | | 3.3 | | | | | |
| Example 201 | | 6.6 | | | | | |
| Example 202 | SBA-1 | 13.2 | | | | | |
| Example 203 | | 19.8 | | | | | |
| Example 204 | | 26.4 | | | | | |
| Example 205 | MCM-41 | 1.3 | None | 1000 | | | |
| Example 206 | | | | 500 | | | |
| Example 207 | | | | 200 | | | |
| Example 208 | | | | 100 | | | |
| Example 209 | | 2.0 | | | | | |
| Example 210 | | 2.4 | | | | | |
| Example 211 | | 2.6 | | | | | |
| Example 212 | | 3.3 | | | | | |
| Example 213 | | 6.6 | | | | | |
| Example 214 | SBA-1 | 13.2 | | | | | |
| Example 215 | | 19.8 | | | | | |
| Example 216 | | 26.4 | | | | | |
| Example 217 | MCM-41 | 1.1 | Yes | 1000 | | 11 | 72 |
| Example 218 | | | | 500 | | | |
| Example 219 | | | | 200 | | | |
| Example 220 | | | | 100 | | | |
| Example 221 | | 1.6 | | | | | |
| Example 222 | | 2.0 | | | | | |
| Example 223 | | 2.2 | | | | | |
| Example 224 | | 2.7 | | | | | |
| Example 225 | | 5.4 | | | | | |
| Example 226 | SBA-1 | 10.9 | | | | | |
| Example 227 | | 16.3 | | | | | |
| Example 228 | | 21.8 | | | | | |
| Example 229 | MCM-41 | 1.1 | None | 1000 | | | |
| Example 230 | | | | 500 | | | |
| Example 231 | | | | 200 | | | |
| Example 232 | | | | 100 | | | |
| Example 233 | | 1.6 | | | | | |
| Example 234 | | 2.0 | | | | | |
| Example 235 | | 2.2 | | | | | |
| Example 236 | | 2.7 | | | | | |
| Example 237 | | 5.4 | | | | | |
| Example 238 | SBA-1 | 10.9 | | | | | |
| Example 239 | | 16.3 | | | | | |
| Example 240 | | 21.8 | | | | | |

| | Functional Structural Body | | | | | | |
|---|---|---|---|---|---|---|---|
| | Skeletal Body Zeolite-Type Compound | | Functional Substance Metal Oxide Nanoparticles | | | Performance Evaluation | |
| No. | Framework | Average Inner Diameter of Channels $D_F$ (nm) | Type | Average particle size $D_C$ (nm) | $D_C/D_F$ | Catalytic Activity | Durability |
| Example 193 | FAU | 0.74 | $FeO_x$ | 0.13 | 0.2 | C | C |
| Example 194 | | | | 0.40 | 0.5 | C | C |
| Example 195 | | | | 0.66 | 0.9 | B | C |

TABLE 5-continued

| | | | | | |
|---|---|---|---|---|---|
| Example 196 | | | 1.32 | 1.8 | A | B |
| Example 197 | | | 1.98 | 2.7 | A | B |
| Example 198 | | | 2.38 | 3.2 | A | A |
| Example 199 | | | 2.64 | 3.6 | A | A |
| Example 200 | | | 3.30 | 4.5 | A | A |
| Example 201 | | | 6.61 | 8.9 | B | A |
| Example 202 | | | 13.21 | 17.9 | B | A |
| Example 203 | | | 19.82 | 26.8 | C | A |
| Example 204 | | | 26.43 | 35.7 | C | A |
| Example 205 | | | 0.13 | 0.2 | C | C |
| Example 206 | | | 0.40 | 0.5 | C | C |
| Example 207 | | | 0.66 | 0.9 | B | C |
| Example 208 | | | 1.32 | 1.8 | A | B |
| Example 209 | | | 1.98 | 2.7 | A | B |
| Example 210 | | | 2.38 | 3.2 | B | A |
| Example 211 | | | 2.64 | 3.6 | B | A |
| Example 212 | | | 3.30 | 4.5 | B | A |
| Example 213 | | | 6.61 | 8.9 | C | A |
| Example 214 | | | 13.21 | 17.9 | C | A |
| Example 215 | | | 19.82 | 26.8 | C | A |
| Example 216 | | | 26.43 | 35.7 | C | A |
| Example 217 | MTW | 0.61 | 0.11 | 0.2 | C | C |
| Example 218 | | | 0.33 | 0.5 | C | C |
| Example 219 | | | 0.54 | 0.9 | B | C |
| Example 220 | | | 1.09 | 1.8 | A | B |
| Example 221 | | | 1.63 | 2.7 | A | B |
| Example 222 | | | 1.96 | 3.2 | A | B |
| Example 223 | | | 2.18 | 3.6 | A | A |
| Example 224 | | | 2.72 | 4.5 | A | A |
| Example 225 | | | 5.45 | 8.9 | B | A |
| Example 226 | | | 10.89 | 17.9 | B | A |
| Example 227 | | | 16.34 | 26.8 | C | A |
| Example 228 | | | 21.79 | 35.7 | C | A |
| Example 229 | | | 0.11 | 0.2 | C | C |
| Example 230 | | | 0.33 | 0.5 | C | C |
| Example 231 | | | 0.54 | 0.9 | B | C |
| Example 232 | | | 1.09 | 1.8 | A | B |
| Example 233 | | | 1.63 | 2.7 | A | B |
| Example 234 | | | 1.96 | 3.2 | A | B |
| Example 235 | | | 2.18 | 3.6 | B | A |
| Example 236 | | | 2.72 | 4.5 | B | A |
| Example 237 | | | 5.45 | 8.9 | C | A |
| Example 238 | | | 10.89 | 17.9 | C | A |
| Example 239 | | | 16.34 | 26.8 | C | A |
| Example 240 | | | 21.79 | 35.7 | C | A |

TABLE 6

| | Making Conditions of Functional Structural Body | | | | | |
|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio of Added Amount of Metal-containing Solution (Ratio of Number of Atoms) Si/M | Type of Structure Directing Agent | pH | Time (h) |
| Example 241 | MCM-41 | 1.0 | Yes | 1000 | TPABr | 12 | 72 |
| Example 242 | | 1.0 | | 500 | | | |
| Example 243 | | 1.0 | | 200 | | | |
| Example 244 | | 1.0 | | 100 | | | |
| Example 245 | | 1.5 | | | | | |
| Example 246 | | 1.8 | | | | | |
| Example 247 | | 2.0 | | | | | |
| Example 248 | | 2.5 | | | | | |
| Example 249 | | 5.0 | | | | | |
| Example 250 | SBA-1 | 10.0 | | | | | |
| Example 251 | | 15.0 | | | | | |
| Example 252 | | 20.0 | | | | | |
| Example 253 | MCM-41 | 1.0 | None | 1000 | | | |
| Example 254 | | 1.0 | | 500 | | | |
| Example 255 | | 1.0 | | 200 | | | |

TABLE 6-continued

| No. | | | | | | | |
|---|---|---|---|---|---|---|---|
| Example 256 | | 1.0 | | 100 | | | |
| Example 257 | | 1.5 | | | | | |
| Example 258 | | 1.8 | | | | | |
| Example 259 | | 2.0 | | | | | |
| Example 260 | | 2.5 | | | | | |
| Example 261 | | 5.0 | | | | | |
| Example 262 | SBA-1 | 10.0 | | | | | |
| Example 263 | | 15.0 | | | | | |
| Example 264 | | 20.0 | | | | | |
| Example 265 | MCM-41 | 1.0 | Yes | 1000 | TMABr | 12 | 120 |
| Example 266 | | 1.0 | | 500 | | | |
| Example 267 | | 1.0 | | 200 | | | |
| Example 268 | | 1.0 | | 100 | | | |
| Example 269 | | 1.5 | | | | | |
| Example 270 | | 1.8 | | | | | |
| Example 271 | | 2.0 | | | | | |
| Example 272 | | 2.5 | | | | | |
| Example 273 | | 5.1 | | | | | |
| Example 274 | SBA-1 | 10.2 | | | | | |
| Example 275 | | 15.3 | | | | | |
| Example 276 | | 20.4 | | | | | |
| Example 277 | MCM-41 | 1.0 | None | 1000 | | | |
| Example 278 | | 1.0 | | 500 | | | |
| Example 279 | | 1.0 | | 200 | | | |
| Example 280 | | 1.0 | | 100 | | | |
| Example 281 | | 1.5 | | | | | |
| Example 282 | | 1.8 | | | | | |
| Example 283 | | 2.0 | | | | | |
| Example 284 | | 2.5 | | | | | |
| Example 285 | | 5.1 | | | | | |
| Example 286 | SBA-1 | 10.2 | | | | | |
| Example 287 | | 15.3 | | | | | |
| Example 288 | | 20.4 | | | | | |

| | Functional Structural Body | | | | | |
|---|---|---|---|---|---|---|
| | Skeletal Body Zeolite-Type Compound | Functional Substance Metal Oxide Nanoparticles | | | Performance Evaluation | |
| No. | Framework | Average Inner Diameter of Channels $D_F$ (nm) | Type | Average particle size $D_C$ (nm) | $D_C/D_F$ | Catalytic Activity | Durability |
| Example 241 | MFI | 0.56 | FeO$_x$ | 0.10 | 0.2 | C | C |
| Example 242 | | 0.56 | | 0.30 | 0.5 | C | C |
| Example 243 | | 0.56 | | 0.50 | 0.9 | B | C |
| Example 244 | | 0.56 | | 1.00 | 1.8 | A | B |
| Example 245 | | 0.56 | | 1.50 | 2.7 | A | B |
| Example 246 | | 0.56 | | 1.80 | 3.2 | A | A |
| Example 247 | | 0.56 | | 2.00 | 3.6 | A | A |
| Example 248 | | 0.56 | | 2.50 | 4.5 | A | A |
| Example 249 | | 0.56 | | 5.00 | 8.9 | B | A |
| Example 250 | | 0.56 | | 10.00 | 17.9 | B | A |
| Example 251 | | 0.56 | | 15.00 | 26.8 | C | A |
| Example 252 | | 0.56 | | 20.00 | 35.7 | C | A |
| Example 253 | | 0.56 | | 0.10 | 0.2 | C | C |
| Example 254 | | 0.56 | | 0.30 | 0.5 | C | C |
| Example 255 | | 0.56 | | 0.50 | 0.9 | B | C |
| Example 256 | | 0.56 | | 1.00 | 1.8 | A | B |
| Example 257 | | 0.56 | | 1.50 | 2.7 | A | B |
| Example 258 | | 0.56 | | 1.80 | 3.2 | B | A |
| Example 259 | | 0.56 | | 2.00 | 3.6 | B | A |
| Example 260 | | 0.56 | | 2.50 | 4.5 | B | A |
| Example 261 | | 0.56 | | 5.00 | 8.9 | C | A |
| Example 262 | | 0.56 | | 10.00 | 17.9 | C | A |
| Example 263 | | 0.56 | | 15.00 | 26.8 | C | A |
| Example 264 | | 0.56 | | 20.00 | 35.7 | C | A |
| Example 265 | FER | 0.57 | | 0.10 | 0.2 | C | C |
| Example 266 | | 0.57 | | 0.31 | 0.5 | C | C |
| Example 267 | | 0.57 | | 0.51 | 0.9 | B | C |
| Example 268 | | 0.57 | | 1.02 | 1.8 | A | B |
| Example 269 | | 0.57 | | 1.53 | 2.7 | A | B |
| Example 270 | | 0.57 | | 1.83 | 3.2 | A | B |
| Example 271 | | 0.57 | | 2.04 | 3.6 | A | A |
| Example 272 | | 0.57 | | 2.54 | 4.5 | A | A |

TABLE 6-continued

| | | | | | |
|---|---|---|---|---|---|
| Example 273 | 0.57 | 5.09 | 8.9 | B | A |
| Example 274 | 0.57 | 10.18 | 17.9 | B | A |
| Example 275 | 0.57 | 15.27 | 26.8 | C | A |
| Example 276 | 0.57 | 20.36 | 35.7 | C | A |
| Example 277 | 0.57 | 0.10 | 0.2 | C | C |
| Example 278 | 0.57 | 0.31 | 0.5 | C | C |
| Example 279 | 0.57 | 0.51 | 0.9 | B | C |
| Example 280 | 0.57 | 1.02 | 1.8 | A | B |
| Example 281 | 0.57 | 1.53 | 2.7 | A | B |
| Example 282 | 0.57 | 1.83 | 3.2 | A | B |
| Example 283 | 0.57 | 2.04 | 3.6 | B | A |
| Example 284 | 0.57 | 2.54 | 4.5 | B | A |
| Example 285 | 0.57 | 5.09 | 8.9 | C | A |
| Example 286 | 0.57 | 10.18 | 17.9 | C | A |
| Example 287 | 0.57 | 15.27 | 26.8 | C | A |
| Example 288 | 0.57 | 20.36 | 35.7 | C | A |

TABLE 7

Making Conditions of Functional Structural Body

| | Precursor Material (A) | | Addition to Precursor Material (A) | | Hydrothermal Treatment Conditions using Precursor Material (C) | | |
|---|---|---|---|---|---|---|---|
| No. | Type | Pore Diameter (nm) | Presence or Absence of Additives | Conversion Ratio of Added Amount of Metal-containing Solution (Ratio of Number of Atoms) Si/M | Type of Structure Directing Agent | pH | Time (h) |
| Example 289 | MCM-41 | 1.3 | | 1000 | TEABr | 12 | 120 |
| Example 290 | | | | 500 | | | |
| Example 291 | | | | 200 | | | |
| Example 292 | | | | 100 | | | |
| Example 293 | | 2.0 | | | | | |
| Example 294 | | 2.4 | | | | | |
| Example 295 | | 2.6 | | | | | |
| Example 296 | | 3.3 | | | | | |
| Example 297 | | 6.6 | | | | | |
| Example 298 | SBA-1 | 13.2 | | | | | |
| Example 299 | | 19.8 | | | | | |
| Example 300 | | 26.4 | | | | | |
| Example 301 | MCM-41 | 1.3 | None | 1000 | | | |
| Example 302 | | | | 500 | | | |
| Example 303 | | | | 200 | | | |
| Example 304 | | | | 100 | | | |
| Example 305 | | 2.0 | | | | | |
| Example 306 | | 2.4 | | | | | |
| Example 307 | | 2.6 | | | | | |
| Example 308 | | 3.3 | | | | | |
| Example 309 | | 6.6 | | | | | |
| Example 310 | SBA-1 | 13.2 | | | | | |
| Example 311 | | 19.8 | | | | | |
| Example 312 | | 26.4 | | | | | |
| Example 313 | MCM-41 | 1.1 | Yes | 1000 | | 11 | 72 |
| Example 314 | | | | 500 | | | |
| Example 315 | | | | 200 | | | |
| Example 316 | | | | 100 | | | |
| Example 317 | | 1.6 | | | | | |
| Example 318 | | 2.0 | | | | | |
| Example 319 | | 2.2 | | | | | |
| Example 320 | | 2.7 | | | | | |
| Example 321 | | 5.4 | | | | | |
| Example 322 | SBA-1 | 10.9 | | | | | |
| Example 323 | | 16.3 | | | | | |
| Example 324 | | 21.8 | | | | | |
| Example 325 | MCM-41 | 1.1 | None | 1000 | | | |
| Example 326 | | | | 500 | | | |
| Example 327 | | | | 200 | | | |
| Example 328 | | | | 100 | | | |
| Example 329 | | 1.6 | | | | | |
| Example 330 | | 2.0 | | | | | |
| Example 331 | | 2.2 | | | | | |
| Example 332 | | 2.7 | | | | | |

TABLE 7-continued

| | | | | | | |
|---|---|---|---|---|---|---|
| Example 333 | | 5.4 | | | | |
| Example 334 | SBA-1 | 10.9 | | | | |
| Example 335 | | 16.3 | | | | |
| Example 336 | | 21.8 | | | | |

| | Functional Structural Body | | | | | |
|---|---|---|---|---|---|---|
| | Skeletal Body Zeolite-Type Compound | | Functional Substance Metal Oxide Nanoparticles | | | |
| | | Average Inner Diameter of Channels $D_F$ | | Average particle size $D_C$ | | Performance Evaluation |
| No. | Framework | (nm) | Type | (nm) | $D_C/D_F$ | Catalytic Activity | Durability |
| Example 289 | FAU | 0.74 | $CuO_x$ | 0.13 | 0.2 | C | C |
| Example 290 | | | | 0.40 | 0.5 | B | C |
| Example 291 | | | | 0.66 | 0.9 | A | B |
| Example 292 | | | | 1.32 | 1.8 | A | B |
| Example 293 | | | | 1.98 | 2.7 | A | A |
| Example 294 | | | | 2.38 | 3.2 | A | A |
| Example 295 | | | | 2.64 | 3.6 | A | A |
| Example 296 | | | | 3.30 | 4.5 | B | A |
| Example 297 | | | | 6.61 | 8.9 | B | A |
| Example 298 | | | | 13.21 | 17.9 | C | A |
| Example 299 | | | | 19.82 | 26.8 | C | A |
| Example 300 | | | | 26.43 | 35.7 | C | C |
| Example 301 | | | | 0.13 | 0.2 | C | C |
| Example 302 | | | | 0.40 | 0.5 | B | C |
| Example 303 | | | | 0.66 | 0.9 | A | B |
| Example 304 | | | | 1.32 | 1.8 | A | B |
| Example 305 | | | | 1.98 | 2.7 | A | B |
| Example 306 | | | | 2.38 | 3.2 | B | A |
| Example 307 | | | | 2.64 | 3.6 | B | A |
| Example 308 | | | | 3.30 | 4.5 | B | A |
| Example 309 | | | | 6.61 | 8.9 | C | A |
| Example 310 | | | | 13.21 | 17.9 | C | A |
| Example 311 | | | | 19.82 | 26.8 | C | A |
| Example 312 | | | | 26.43 | 35.7 | C | A |
| Example 313 | MTW | 0.61 | | 0.11 | 0.2 | C | C |
| Example 314 | | | | 0.33 | 0.5 | C | C |
| Example 315 | | | | 0.54 | 0.9 | B | C |
| Example 316 | | | | 1.09 | 1.8 | A | B |
| Example 317 | | | | 1.63 | 2.7 | A | B |
| Example 318 | | | | 1.96 | 3.2 | A | B |
| Example 319 | | | | 2.18 | 3.6 | A | A |
| Example 320 | | | | 2.72 | 4.5 | A | A |
| Example 321 | | | | 5.45 | 8.9 | B | A |
| Example 322 | | | | 10.89 | 17.9 | B | A |
| Example 323 | | | | 16.34 | 26.8 | C | A |
| Example 324 | | | | 21.79 | 35.7 | C | A |
| Example 325 | | | | 0.11 | 0.2 | C | C |
| Example 326 | | | | 0.33 | 0.5 | C | C |
| Example 327 | | | | 0.54 | 0.9 | B | C |
| Example 328 | | | | 1.09 | 1.8 | A | B |
| Example 329 | | | | 1.63 | 2.7 | A | B |
| Example 330 | | | | 1.96 | 3.2 | A | B |
| Example 331 | | | | 2.18 | 3.6 | B | A |
| Example 332 | | | | 2.72 | 4.5 | B | A |
| Example 333 | | | | 5.45 | 8.9 | C | A |
| Example 334 | | | | 10.89 | 17.9 | C | A |
| Example 335 | | | | 16.34 | 26.8 | C | A |
| Example 336 | | | | 21.79 | 35.7 | C | A |

TABLE 8

| | Making Conditions of Functional Structural Body | | | | | | |
|---|---|---|---|---|---|---|---|
| | Addition to Precursor Material (A) | | | Hydrothermal Treatment Conditions using Precursor Material (C) | | | |
| | Precursor Material (A) | | | Conversion Ratio of Added Amount of Metal-containing Solution (Ratio of Number of Atoms) Si/M | Type of Structure Directing Agent | | |
| No. | Type | Pore Diameter (nm) | Presence or Absence of Additives | | | pH | Time (h) |
| Example 337 | MCM 41 | 1.0 | Yes | 1000 | TPABr | 12 | 72 |
| Example 338 | | 1.0 | | 500 | | | |
| Example 339 | | 1.0 | | 200 | | | |
| Example 340 | | 1.0 | | 100 | | | |
| Example 341 | | 1.5 | | | | | |
| Example 342 | | 1.8 | | | | | |
| Example 343 | | 2.0 | | | | | |
| Example 344 | | 2.5 | | | | | |
| Example 345 | | 5.0 | | | | | |
| Example 346 | SBA-1 | 10.0 | | | | | |
| Example 347 | | 15.0 | | | | | |
| Example 348 | | 20.0 | | | | | |
| Example 349 | MCM- 41 | 1.0 | None | 1000 | | | |
| Example 350 | | 1.0 | | 500 | | | |
| Example 351 | | 1.0 | | 200 | | | |
| Example 352 | | 1.0 | | 100 | | | |
| Example 353 | | 1.5 | | | | | |
| Example 354 | | 1.8 | | | | | |
| Example 355 | | 2.0 | | | | | |
| Example 356 | | 2.5 | | | | | |
| Example 357 | | 5.0 | | | | | |
| Example 358 | SBA-1 | 10.0 | | | | | |
| Example 359 | | 15.0 | | | | | |
| Example 360 | | 20.0 | | | | | |
| Example 361 | MCM- 41 | 1.0 | Yes | 1000 | TMABr | 12 | 120 |
| Example 362 | | 1.0 | | 500 | | | |
| Example 363 | | 1.0 | | 200 | | | |
| Example 364 | | 1.0 | | 100 | | | |
| Example 365 | | 1.5 | | | | | |
| Example 366 | | 1.8 | | | | | |
| Example 367 | | 2.0 | | | | | |
| Example 368 | | 2.5 | | | | | |
| Example 369 | | 5.1 | | | | | |
| Example 370 | SBA-1 | 10.2 | | | | | |
| Example 371 | | 15.3 | | | | | |
| Example 372 | | 20.4 | | | | | |
| Example 373 | MCM- 41 | 1.0 | None | 1000 | | | |
| Example 374 | | 1.0 | | 500 | | | |
| Example 375 | | 1.0 | | 200 | | | |
| Example 376 | | 1.0 | | 100 | | | |
| Example 377 | | 1.5 | | | | | |
| Example 378 | | 1.8 | | | | | |
| Example 379 | | 2.0 | | | | | |
| Example 380 | | 2.5 | | | | | |
| Example 381 | | 5.1 | | | | | |
| Example 382 | SBA-1 | 10.2 | | | | | |
| Example 383 | | 15.3 | | | | | |
| Example 384 | | 20.4 | | | | | |
| Comparative Example 1 | | | | — | | | |
| Comparative Example 1 | | | | — | | | |

TABLE 8-continued

| | | Functional Structural Body | | | | | |
|---|---|---|---|---|---|---|---|
| | | Skeletal Body Zeolite-Type Compound | | Functional Substance Metal Oxide Nanoparticles | | | |
| | | Average Inner Diameter of Channels | | Average particle | | Performance Evaluation | |
| No. | Framework | $D_F$ (nm) | Type | size $D_C$ (nm) | $D_C/D_F$ | Catalytic Activity | Durability |
| Example 337 | MFI | 0.56 | $CuO_x$ | 0.10 | 0.2 | C | C |
| Example 338 | | 0.56 | | 0.30 | 0.5 | C | C |
| Example 339 | | 0.56 | | 0.50 | 0.9 | B | C |
| Example 340 | | 0.56 | | 1.00 | 1.8 | A | B |
| Example 341 | | 0.56 | | 1.50 | 2.7 | A | B |
| Example 342 | | 0.56 | | 1.80 | 3.2 | A | A |
| Example 343 | | 0.56 | | 2.00 | 3.6 | A | A |
| Example 344 | | 0.56 | | 2.50 | 4.5 | A | A |
| Example 345 | | 0.56 | | 5.00 | 8.9 | B | A |
| Example 346 | | 0.56 | | 10.00 | 17.9 | B | A |
| Example 347 | | 0.56 | | 15.00 | 26.8 | C | A |
| Example 348 | | 0.56 | | 20.00 | 35.7 | C | A |
| Example 349 | | 0.56 | | 0.10 | 0.2 | C | C |
| Example 350 | | 0.56 | | 0.30 | 0.5 | C | C |
| Example 351 | | 0.56 | | 0.50 | 0.9 | B | C |
| Example 352 | | 0.56 | | 1.00 | 1.8 | A | B |
| Example 353 | | 0.56 | | 1.50 | 2.7 | A | B |
| Example 354 | | 0.56 | | 1.80 | 3.2 | B | A |
| Example 355 | | 0.56 | | 2.00 | 3.6 | B | A |
| Example 356 | | 0.56 | | 2.50 | 4.5 | B | A |
| Example 357 | | 0.56 | | 5.00 | 8.9 | C | A |
| Example 358 | | 0.56 | | 10.00 | 17.9 | C | A |
| Example 359 | | 0.56 | | 15.00 | 26.8 | C | A |
| Example 360 | | 0.56 | | 20.00 | 35.7 | C | A |
| Example 361 | FER | 0.57 | | 0.10 | 0.2 | C | C |
| Example 362 | | 0.57 | | 0.31 | 0.5 | C | C |
| Example 363 | | 0.57 | | 0.51 | 0.9 | B | C |
| Example 364 | | 0.57 | | 1.02 | 1.8 | A | B |
| Example 365 | | 0.57 | | 1.53 | 2.7 | A | B |
| Example 366 | | 0.57 | | 1.83 | 3.2 | A | B |
| Example 367 | | 0.57 | | 2.04 | 3.6 | A | A |
| Example 368 | | 0.57 | | 2.54 | 4.5 | A | A |
| Example 369 | | 0.57 | | 5.09 | 8.9 | B | A |
| Example 370 | | 0.57 | | 10.18 | 17.9 | B | A |
| Example 371 | | 0.57 | | 15.27 | 26.8 | C | A |
| Example 372 | | 0.57 | | 20.36 | 35.7 | C | A |
| Example 373 | | 0.57 | | 0.10 | 0.2 | C | C |
| Example 374 | | 0.57 | | 0.31 | 0.5 | C | C |
| Example 375 | | 0.57 | | 0.51 | 0.9 | B | C |
| Example 376 | | 0.57 | | 1.02 | 1.8 | A | B |
| Example 377 | | 0.57 | | 1.53 | 2.7 | A | B |
| Example 378 | | 0.57 | | 1.83 | 3.2 | A | B |
| Example 379 | | 0.57 | | 2.04 | 3.6 | B | A |
| Example 380 | | 0.57 | | 2.54 | 4.5 | B | A |
| Example 381 | | 0.57 | | 5.09 | 8.9 | C | A |
| Example 382 | | 0.57 | | 10.18 | 17.9 | C | A |
| Example 383 | | 0.57 | | 15.27 | 26.8 | C | A |
| Example 384 | | 0.57 | | 20.36 | 35.7 | C | A |
| Comparative Example 1 | MFI type silicalite | 0.56 | $CoO_x$ | ≤50 | ≤67.6 | C | D |
| Comparative Example 1 | MFI type silicalite | 0.56 | — | — | — | D | D |

TABLE 9

| | Making Conditions of Functional Structural Body | | | | | | |
|---|---|---|---|---|---|---|---|
| | Precursor Material (A) | | Addition to Precursor Material (A) | | | Hydrothermal Treatment Conditions using Precursor Material (C) | |
| No. | Type | Pore Diameter (nm) | Presence or Absence of Additives | Conversion Ratio of Added Amount of Metal-containing Solution (Ratio of Number of Atoms) Si/M | Type of Structure Directing Agent | pH | Time (h) |
| Example 385 | MCM-41 | 1.3 | Yes | 1000 | TEABr | 12 | 120 |
| Example 386 | | | | 500 | | | |
| Example 387 | | | | 200 | | | |
| Example 388 | | | | 100 | | | |
| Example 389 | | 2.0 | | | | | |
| Example 390 | | 2.4 | | | | | |
| Example 391 | | 2.6 | | | | | |
| Example 392 | | 3.3 | | | | | |
| Example 393 | | 6.6 | | | | | |
| Example 394 | SBA-1 | 13.2 | | | | | |
| Example 395 | | 19.8 | | | | | |
| Example 396 | | 26.4 | | | | | |
| Example 397 | MCM-41 | 1.3 | None | 1000 | | | |
| Example 398 | | | | 500 | | | |
| Example 399 | | | | 200 | | | |
| Example 400 | | | | 100 | | | |
| Example 401 | | 2.0 | | | | | |
| Example 402 | | 2.4 | | | | | |
| Example 403 | | 2.6 | | | | | |
| Example 404 | | 3.3 | | | | | |
| Example 405 | | 6.6 | | | | | |
| Example 406 | SBA-1 | 13.2 | | | | | |
| Example 407 | | 19.8 | | | | | |
| Example 408 | | 26.4 | | | | | |
| Example 409 | MCM-41 | 1.1 | Yes | 1000 | | 11 | 72 |
| Example 410 | | | | 500 | | | |
| Example 411 | | | | 200 | | | |
| Example 412 | | | | 100 | | | |
| Example 413 | | 1.6 | | | | | |
| Example 414 | | 2.0 | | | | | |
| Example 415 | | 2.2 | | | | | |
| Example 416 | | 2.7 | | | | | |
| Example 417 | | 5.4 | | | | | |
| Example 418 | SBA-1 | 10.9 | | | | | |
| Example 419 | | 16.3 | | | | | |
| Example 420 | | 21.8 | | | | | |
| Example 421 | MCM-41 | 1.1 | None | 1000 | | | |
| Example 422 | | | | 500 | | | |
| Example 423 | | | | 200 | | | |
| Example 424 | | | | 100 | | | |
| Example 425 | | 1.6 | | | | | |
| Example 426 | | 2.0 | | | | | |
| Example 427 | | 2.2 | | | | | |
| Example 428 | | 2.7 | | | | | |
| Example 429 | | 5.4 | | | | | |
| Example 430 | SBA-1 | 10.9 | | | | | |
| Example 431 | | 16.3 | | | | | |
| Example 432 | | 21.8 | | | | | |

| | Functional structural Body | | | | | | |
|---|---|---|---|---|---|---|---|
| | Skeletal Body Zeolite-Type Compound | | Functional Substance Metal Oxide Nanoparticles | | | Performance Evaluation | |
| | | Average Inner Diameter of Channels | | Average particle | | | |
| No. | Framework | $D_F$ (nm) | Type | size $D_C$ (nm) | $D_C/D_F$ | Catalytic Activity | Durability |
| Example 385 | FAU | 0.74 | Co | 0.11 | 0.1 | C | C |
| Example 386 | | 0.74 | | 0.32 | 0.4 | C | C |

TABLE 9-continued

| | | | | | |
|---|---|---|---|---|---|
| Example 387 | | 0.74 | 0.53 | 0.7 | B | C |
| Example 388 | | 0.74 | 1.06 | 1.4 | A | B |
| Example 389 | | 0.74 | 1.59 | 2.1 | A | B |
| Example 390 | | 0.74 | 1.90 | 2.6 | A | A |
| Example 391 | | 0.74 | 2.11 | 2.9 | A | A |
| Example 392 | | 0.74 | 2.64 | 3.6 | A | A |
| Example 393 | | 0.74 | 5.29 | 7.1 | B | A |
| Example 394 | | 0.74 | 10.57 | 14.3 | B | A |
| Example 395 | | 0.74 | 15.86 | 21.4 | C | A |
| Example 396 | | 0.74 | 21.14 | 28.6 | C | A |
| Example 397 | | 0.74 | 0.11 | 0.1 | C | C |
| Example 398 | | 0.74 | 0.32 | 0.4 | C | C |
| Example 399 | | 0.74 | 0.53 | 0.7 | B | C |
| Example 400 | | 0.74 | 1.06 | 1.4 | A | B |
| Example 401 | | 0.74 | 1.59 | 2.1 | A | B |
| Example 402 | | 0.74 | 1.90 | 2.6 | B | A |
| Example 403 | | 0.74 | 2.11 | 2.9 | B | A |
| Example 404 | | 0.74 | 2.64 | 3.6 | B | A |
| Example 405 | | 0.74 | 5.29 | 7.1 | C | A |
| Example 406 | | 0.74 | 10.57 | 14.3 | C | A |
| Example 407 | | 0.74 | 15.86 | 21.4 | C | A |
| Example 408 | | 0.74 | 21.14 | 28.6 | C | A |
| Example 409 | MTW | 0.61 | 0.09 | 0.1 | C | C |
| Example 410 | | 0.61 | 0.26 | 0.4 | C | C |
| Example 411 | | 0.61 | 0.44 | 0.7 | B | C |
| Example 412 | | 0.61 | 0.87 | 1.4 | A | B |
| Example 413 | | 0.61 | 1.31 | 2.1 | A | B |
| Example 414 | | 0.61 | 1.57 | 2.6 | A | B |
| Example 415 | | 0.61 | 1.74 | 2.9 | A | A |
| Example 416 | | 0.61 | 2.18 | 3.6 | A | A |
| Example 417 | | 0.61 | 4.36 | 7.1 | B | A |
| Example 418 | | 0.61 | 8.71 | 14.3 | B | A |
| Example 419 | | 0.61 | 13.07 | 21.4 | C | A |
| Example 420 | | 0.61 | 17.43 | 28.6 | C | A |
| Example 421 | | 0.61 | 0.09 | 0.1 | C | C |
| Example 422 | | 0.61 | 0.26 | 0.4 | C | C |
| Example 423 | | 0.61 | 0.44 | 0.7 | B | C |
| Example 424 | | 0.61 | 0.87 | 1.4 | A | B |
| Example 425 | | 0.61 | 1.31 | 2.1 | A | B |
| Example 426 | | 0.61 | 1.57 | 2.6 | A | B |
| Example 427 | | 0.61 | 1.74 | 2.9 | B | A |
| Example 428 | | 0.61 | 2.18 | 3.6 | B | A |
| Example 429 | | 0.61 | 4.36 | 7.1 | C | A |
| Example 430 | | 0.61 | 8.71 | 14.3 | C | A |
| Example 431 | | 0.61 | 13.07 | 21.4 | C | A |
| Example 432 | | 0.61 | 17.43 | 28.6 | C | A |

TABLE 10

| | Making Conditions of Functional Structural Body | | | | | |
|---|---|---|---|---|---|---|
| | Precursor Material (A) | | Addition to Precursor Material (A) | | Hydrothermal Treatment Conditions using Precursor Material (C) | |
| No. | Type | Pore Diameter (nm) | Presence or Absence of Additives | Conversion Ratio of Added Amount of Metal-containing Solution (Ratio of Number of Atoms) Si/M | Type of Structure Directing Agent | pH | Time (h) |
| Example 433 | MCM-41 | 1.0 | Yes | 1000 | TPABr | 12 | 72 |
| Example 434 | | 1.0 | | 500 | | | |
| Example 435 | | 1.0 | | 200 | | | |
| Example 436 | | 1.0 | | 100 | | | |
| Example 437 | | 1.5 | | | | | |
| Example 438 | | 1.8 | | | | | |
| Example 439 | | 2.0 | | | | | |
| Example 440 | | 2.5 | | | | | |
| Example 441 | | 5.0 | | | | | |
| Example 442 | SBA-1 | 10.0 | | | | | |
| Example 443 | | 15.0 | | | | | |
| Example 444 | | 20.0 | | | | | |
| Example 445 | MCM-41 | 1.0 | None | 1000 | | | |
| Example 446 | | 1.0 | | 500 | | | |

TABLE 10-continued

| | | | | | | | |
|---|---|---|---|---|---|---|---|
| Example 447 | | 1.0 | | 200 | | | |
| Example 448 | | 1.0 | | 100 | | | |
| Example 449 | | 1.5 | | | | | |
| Example 450 | | 1.8 | | | | | |
| Example 451 | | 2.0 | | | | | |
| Example 452 | | 2.5 | | | | | |
| Example 453 | | 5.0 | | | | | |
| Example 454 | SBA-1 | 10.0 | | | | | |
| Example 455 | | 15.0 | | | | | |
| Example 456 | | 20.0 | | | | | |
| Example 457 | MCM- | 1.0 | Yes | 1000 | TMABr | 12 | 120 |
| Example 458 | 41 | 1.0 | | 500 | | | |
| Example 459 | | 1.0 | | 200 | | | |
| Example 460 | | 1.0 | | 100 | | | |
| Example 461 | | 1.5 | | | | | |
| Example 462 | | 1.8 | | | | | |
| Example 463 | | 2.0 | | | | | |
| Example 464 | | 2.5 | | | | | |
| Example 465 | | 5.1 | | | | | |
| Example 466 | SBA-1 | 10.2 | | | | | |
| Example 467 | | 15.3 | | | | | |
| Example 468 | | 20.4 | | | | | |
| Example 469 | MCM- | 1.0 | None | 1000 | | | |
| Example 470 | 41 | 1.0 | | 500 | | | |
| Example 471 | | 1.0 | | 200 | | | |
| Example 472 | | 1.0 | | 100 | | | |
| Example 473 | | 1.5 | | | | | |
| Example 474 | | 1.8 | | | | | |
| Example 475 | | 2.0 | | | | | |
| Example 476 | | 2.5 | | | | | |
| Example 477 | | 5.1 | | | | | |
| Example 478 | SBA-1 | 10.2 | | | | | |
| Example 479 | | 15.3 | | | | | |
| Example 480 | | 20.4 | | | | | |

| | | Functional Structural Body | | | | | |
|---|---|---|---|---|---|---|---|
| | | Skeletal Body Zeolite-Type Compound | Functional Substance Metal Oxide Nanoparticles | | | Performance Evaluation | |
| | | Average Inner Diameter of Channels | | Average particle | | | |
| No. | Framework | $D_F$ (nm) | Type | size $D_C$ (nm) | $D_C/D_F$ | Catalytic Activity | Durability |
| Example 433 | MFI | 0.56 | Co | 0.08 | 0.1 | C | C |
| Example 434 | | 0.56 | | 0.24 | 0.4 | C | C |
| Example 435 | | 0.56 | | 0.40 | 0.7 | B | C |
| Example 436 | | 0.56 | | 0.80 | 1.4 | A | B |
| Example 437 | | 0.56 | | 1.20 | 2.1 | A | B |
| Example 438 | | 0.56 | | 1.44 | 2.6 | A | A |
| Example 439 | | 0.56 | | 1.60 | 2.9 | A | A |
| Example 440 | | 0.56 | | 2.00 | 3.6 | A | A |
| Example 441 | | 0.56 | | 4.00 | 7.1 | B | A |
| Example 442 | | 0.56 | | 8.00 | 14.3 | B | A |
| Example 443 | | 0.56 | | 12.00 | 21.4 | C | A |
| Example 444 | | 0.56 | | 16.00 | 28.6 | C | A |
| Example 445 | | 0.56 | | 0.80 | 0.1 | C | C |
| Example 446 | | 0.56 | | 0.24 | 0.4 | C | C |
| Example 447 | | 0.56 | | 0.40 | 0.7 | B | C |
| Example 448 | | 0.56 | | 0.80 | 1.4 | A | B |
| Example 449 | | 0.56 | | 1.20 | 2.1 | A | B |
| Example 450 | | 0.56 | | 1.44 | 2.6 | B | A |
| Example 451 | | 0.56 | | 1.60 | 2.9 | B | A |
| Example 452 | | 0.56 | | 2.00 | 3.6 | B | A |
| Example 453 | | 0.56 | | 4.00 | 7.1 | C | A |
| Example 454 | | 0.56 | | 8.00 | 14.3 | C | A |
| Example 455 | | 0.56 | | 12.00 | 21.4 | C | A |
| Example 456 | | 0.56 | | 16.00 | 28.6 | C | A |
| Example 457 | FER | 0.57 | | 0.08 | 0.1 | C | C |
| Example 458 | | 0.57 | | 0.24 | 0.4 | C | C |
| Example 459 | | 0.57 | | 0.41 | 0.7 | B | C |
| Example 460 | | 0.57 | | 0.81 | 1.4 | A | B |
| Example 461 | | 0.57 | | 1.22 | 2.1 | A | B |

TABLE 10-continued

| | | | | | |
|---|---|---|---|---|---|
| Example 462 | 0.57 | 1.47 | 2.6 | A | B |
| Example 463 | 0.57 | 1.63 | 2.9 | A | A |
| Example 464 | 0.57 | 2.04 | 3.6 | A | A |
| Example 465 | 0.57 | 4.07 | 7.1 | B | A |
| Example 466 | 0.57 | 8.14 | 14.3 | B | A |
| Example 467 | 0.57 | 12.21 | 21.4 | C | A |
| Example 468 | 0.57 | 16.29 | 28.6 | C | A |
| Example 469 | 0.57 | 0.08 | 0.1 | C | C |
| Example 470 | 0.57 | 0.24 | 0.4 | C | C |
| Example 471 | 0.57 | 0.41 | 0.7 | B | C |
| Example 472 | 0.57 | 0.81 | 1.4 | A | B |
| Example 473 | 0.57 | 1.22 | 2.1 | A | B |
| Example 474 | 0.57 | 1.47 | 2.6 | A | B |
| Example 475 | 0.57 | 1.63 | 2.9 | B | A |
| Example 476 | 0.57 | 2.04 | 3.6 | B | A |
| Example 477 | 0.57 | 4.07 | 7.1 | C | A |
| Example 478 | 0.57 | 8.14 | 14.3 | C | A |
| Example 479 | 0.57 | 12.21 | 21.4 | C | A |
| Example 480 | 0.57 | 16.29 | 28.6 | C | A |

TABLE 11

| | Making Conditions of Functional Structural Body | | | | | |
|---|---|---|---|---|---|---|
| | Precursor Material (A) | | Addition to Precursor Material (A) | | Hydrothermal Treatment Conditions using Precursor Material (C) | |
| | | | | Conversion Ratio of Added Amount of Metal-containing Solution (Ratio of Number of Atoms) Si/M | | |
| No. | Type | Pore Diameter (nm) | Presence or Absence of Additives | | Type of Structure Directing Agent | pH | Time (h) |
| Example 481 | MCM-41 | 1.3 | Yes | 1000 | TEABr | 12 | 120 |
| Example 482 | | | | 500 | | | |
| Example 483 | | | | 200 | | | |
| Example 484 | | | | 100 | | | |
| Example 485 | | 2.0 | | | | | |
| Example 486 | | 2.4 | | | | | |
| Example 487 | | 2.6 | | | | | |
| Example 488 | | 3.3 | | | | | |
| Example 489 | | 6.6 | | | | | |
| Example 490 | SBA-1 | 13.2 | | | | | |
| Example 491 | | 19.8 | | | | | |
| Example 492 | | 26.4 | | | | | |
| Example 493 | MCM-41 | 1.3 | None | 1000 | | | |
| Example 494 | | | | 500 | | | |
| Example 495 | | | | 200 | | | |
| Example 496 | | | | 100 | | | |
| Example 497 | | 2.0 | | | | | |
| Example 498 | | 2.4 | | | | | |
| Example 499 | | 2.6 | | | | | |
| Example 500 | | 3.3 | | | | | |
| Example 501 | | 6.6 | | | | | |
| Example 502 | SBA-1 | 13.2 | | | | | |
| Example 503 | | 19.8 | | | | | |
| Example 504 | | 26.4 | | | | | |
| Example 505 | MCM-41 | 1.1 | Yes | 1000 | | | |
| Example 506 | | | | 500 | | | |
| Example 507 | | | | 200 | | | |
| Example 508 | | | | 100 | | | |
| Example 509 | | 1.6 | | | | | |
| Example 510 | | 2.0 | | | | | |
| Example 511 | | 2.2 | | | | | |
| Example 512 | | 2.7 | | | | | |
| Example 513 | | 5.4 | | | | | |
| Example 514 | SBA-1 | 10.9 | | | | | |
| Example 515 | | 16.3 | | | | | |
| Example 516 | | 21.8 | | | | | |
| Example 517 | MCM-41 | 1.1 | None | 1000 | | 11 | 72 |
| Example 518 | | | | 500 | | | |
| Example 519 | | | | 200 | | | |
| Example 520 | | | | 100 | | | |
| Example 521 | | 1.6 | | | | | |

TABLE 11-continued

| | | |
|---|---|---|
| Example 522 | | 2.0 |
| Example 523 | | 2.2 |
| Example 524 | | 2.7 |
| Example 525 | | 5.4 |
| Example 526 | SBA-1 | 10.9 |
| Example 527 | | 16.3 |
| Example 528 | | 21.8 |

| | Functional Structural Body | | | | | |
|---|---|---|---|---|---|---|
| | Skeletal Body Zeolite-Type Compound | | Functional Substance Metal Oxide Nanoparticles | | Performance Evaluation | |
| | | Average Inner Diameter of Channels | | Average particle | | |
| No. | Framework | $D_F$ (nm) | Type | size $D_C$ (nm) | $D_C/D_F$ | Catalytic Activity | Durability |
| Example 481 | FAU | 0.74 | Ni | 0.11 | 0.1 | C | C |
| Example 482 | | 0.74 | | 0.32 | 0.4 | C | C |
| Example 483 | | 0.74 | | 0.53 | 0.7 | B | C |
| Example 484 | | 0.74 | | 1.06 | 1.4 | A | B |
| Example 485 | | 0.74 | | 1.59 | 2.1 | A | B |
| Example 486 | | 0.74 | | 1.90 | 2.6 | A | A |
| Example 487 | | 0.74 | | 2.11 | 2.9 | A | A |
| Example 488 | | 0.74 | | 2.64 | 3.6 | A | A |
| Example 489 | | 0.74 | | 5.29 | 7.1 | B | A |
| Example 490 | | 0.74 | | 10.57 | 14.3 | B | A |
| Example 491 | | 0.74 | | 15.86 | 21.4 | C | A |
| Example 492 | | 0.74 | | 21.14 | 28.6 | C | A |
| Example 493 | | 0.74 | | 0.11 | 0.1 | C | C |
| Example 494 | | 0.74 | | 0.32 | 0.4 | C | C |
| Example 495 | | 0.74 | | 0.53 | 0.7 | B | C |
| Example 496 | | 0.74 | | 1.06 | 1.4 | A | B |
| Example 497 | | 0.74 | | 1.59 | 2.1 | A | B |
| Example 498 | | 0.74 | | 1.90 | 2.6 | B | A |
| Example 499 | | 0.74 | | 2.11 | 2.9 | B | A |
| Example 500 | | 0.74 | | 2.64 | 3.6 | B | A |
| Example 501 | | 0.74 | | 5.29 | 7.1 | C | A |
| Example 502 | | 0.74 | | 10.57 | 14.3 | C | A |
| Example 503 | | 0.74 | | 15.86 | 21.4 | C | A |
| Example 504 | | 0.74 | | 21.14 | 28.6 | C | A |
| Example 505 | | 0.61 | | 0.09 | 0.1 | C | C |
| Example 506 | | 0.61 | | 0.26 | 0.4 | C | C |
| Example 507 | | 0.61 | | 0.44 | 0.7 | B | C |
| Example 508 | | 0.61 | | 0.87 | 1.4 | A | B |
| Example 509 | | 0.61 | | 1.31 | 2.1 | A | B |
| Example 510 | | 0.61 | | 1.57 | 2.6 | A | B |
| Example 511 | | 0.61 | | 1.74 | 2.9 | A | A |
| Example 512 | | 0.61 | | 2.18 | 3.6 | A | A |
| Example 513 | | 0.61 | | 4.36 | 7.1 | B | A |
| Example 514 | | 0.61 | | 8.71 | 14.3 | B | A |
| Example 515 | | 0.61 | | 13.07 | 21.4 | C | A |
| Example 516 | | 0.61 | | 17.43 | 28.6 | C | A |
| Example 517 | MTW | 0.61 | | 0.09 | 0.1 | C | C |
| Example 518 | | 0.61 | | 0.26 | 0.4 | C | C |
| Example 519 | | 0.61 | | 0.44 | 0.7 | B | C |
| Example 520 | | 0.61 | | 0.87 | 1.4 | A | B |
| Example 521 | | 0.61 | | 1.31 | 2.1 | A | B |
| Example 522 | | 0.61 | | 1.57 | 2.6 | A | B |
| Example 523 | | 0.61 | | 1.74 | 2.9 | B | A |
| Example 524 | | 0.61 | | 2.18 | 3.6 | B | A |
| Example 525 | | 0.61 | | 4.36 | 7.1 | C | A |
| Example 526 | | 0.61 | | 8.71 | 14.3 | C | A |
| Example 527 | | 0.61 | | 13.07 | 21.4 | C | A |
| Example 528 | | 0.61 | | 17.43 | 28.6 | C | A |

TABLE 12

| | Making Conditions of Functional Structural Body | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio of Added Amount of Metal-containing Solution (atomic ratio) Si/M | Type of Structure Directing Agent | pH | Time (h) |
| Example 529 | MCM-41 | 1.0 | Yes | 1000 | TPABr | 12 | 72 |
| Example 530 | | 1.0 | | 500 | | | |
| Example 531 | | 1.0 | | 200 | | | |
| Example 532 | | 1.0 | | 100 | | | |
| Example 533 | | 1.5 | | | | | |
| Example 534 | | 1.8 | | | | | |
| Example 535 | | 2.0 | | | | | |
| Example 536 | | 2.5 | | | | | |
| Example 537 | | 5.0 | | | | | |
| Example 538 | SBA-1 | 10.0 | | | | | |
| Example 539 | | 15.0 | | | | | |
| Example 540 | | 20.0 | | | | | |
| Example 541 | MCM-41 | 1.0 | None | 1000 | | | |
| Example 542 | | 1.0 | | 500 | | | |
| Example 543 | | 1.0 | | 200 | | | |
| Example 544 | | 1.0 | | 100 | | | |
| Example 545 | | 1.5 | | | | | |
| Example 546 | | 1.8 | | | | | |
| Example 547 | | 2.0 | | | | | |
| Example 548 | | 2.5 | | | | | |
| Example 549 | | 5.0 | | | | | |
| Example 550 | SBA-1 | 10.0 | | | | | |
| Example 551 | | 15.0 | | | | | |
| Example 552 | | 20.0 | | | | | |
| Example 553 | MCM-41 | 1.0 | Yes | 1000 | TMABr | 12 | 120 |
| Example 554 | | 1.0 | | 500 | | | |
| Example 555 | | 1.0 | | 200 | | | |
| Example 556 | | 1.0 | | 100 | | | |
| Example 557 | | 1.5 | | | | | |
| Example 558 | | 1.8 | | | | | |
| Example 559 | | 2.0 | | | | | |
| Example 560 | | 2.5 | | | | | |
| Example 561 | | 5.1 | | | | | |
| Example 562 | SBA-1 | 10.2 | | | | | |
| Example 563 | | 15.3 | | | | | |
| Example 564 | | 20.4 | | | | | |
| Example 565 | MCM-41 | 1.0 | None | 1000 | | | |
| Example 566 | | 1.0 | | 500 | | | |
| Example 567 | | 1.0 | | 200 | | | |
| Example 568 | | 1.0 | | 100 | | | |
| Example 569 | | 1.5 | | | | | |
| Example 570 | | 1.8 | | | | | |
| Example 571 | | 2.0 | | | | | |
| Example 572 | | 2.5 | | | | | |
| Example 573 | | 5.1 | | | | | |
| Example 574 | SBA-1 | 10.2 | | | | | |
| Example 575 | | 15.3 | | | | | |
| Example 576 | | 20.4 | | | | | |

TABLE 12-continued

| | Functional Structural Body | | | | | | |
|---|---|---|---|---|---|---|---|
| | Skeletal Body Zeolite-Type Compound | | Functional Substance Metal Oxide Nanoparticles | | | | |
| | | Average Inner Diameter of Channels | | Average particle | | Performance Evaluation | |
| No. | Framework | $D_F$ (nm) | Type | size $D_C$ (nm) | $D_C/D_F$ | Catalytic Activity | Durability |
| Example 529 | MFI | 0.56 | Ni | 0.08 | 0.1 | C | C |
| Example 530 | | 0.56 | | 0.24 | 0.4 | C | C |
| Example 531 | | 0.56 | | 0.40 | 0.7 | B | C |
| Example 532 | | 0.56 | | 0.80 | 1.4 | A | B |
| Example 533 | | 0.56 | | 1.20 | 2.1 | A | B |
| Example 534 | | 0.56 | | 1.44 | 2.6 | A | A |
| Example 535 | | 0.56 | | 1.60 | 2.9 | A | A |
| Example 536 | | 0.56 | | 2.00 | 3.6 | A | A |
| Example 537 | | 0.56 | | 4.00 | 7.1 | B | A |
| Example 538 | | 0.56 | | 8.00 | 14.3 | B | A |
| Example 539 | | 0.56 | | 12.00 | 21.4 | C | A |
| Example 540 | | 0.56 | | 16.00 | 28.6 | C | A |
| Example 541 | | 0.56 | | 0.08 | 0.1 | C | C |
| Example 542 | | 0.56 | | 0.24 | 0.4 | C | C |
| Example 543 | | 0.56 | | 0.40 | 0.7 | B | C |
| Example 544 | | 0.56 | | 0.80 | 1.4 | A | B |
| Example 545 | | 0.56 | | 1.20 | 2.1 | A | B |
| Example 546 | | 0.56 | | 1.44 | 2.6 | B | A |
| Example 547 | | 0.56 | | 1.60 | 2.9 | B | A |
| Example 548 | | 0.56 | | 2.00 | 3.6 | B | A |
| Example 549 | | 0.56 | | 4.00 | 7.1 | C | A |
| Example 550 | | 0.56 | | 8.00 | 14.3 | C | A |
| Example 551 | | 0.56 | | 12.00 | 21.4 | C | A |
| Example 552 | | 0.56 | | 16.00 | 28.6 | C | A |
| Example 553 | FER | 0.57 | | 0.08 | 0.1 | C | C |
| Example 554 | | 0.57 | | 0.24 | 0.4 | C | C |
| Example 555 | | 0.57 | | 0.41 | 0.7 | B | C |
| Example 556 | | 0.57 | | 0.81 | 1.4 | A | B |
| Example 557 | | 0.57 | | 1.22 | 2.1 | A | B |
| Example 558 | | 0.57 | | 1.47 | 2.6 | A | B |
| Example 559 | | 0.57 | | 1.63 | 2.9 | A | A |
| Example 560 | | 0.57 | | 2.04 | 3.6 | A | A |
| Example 561 | | 0.57 | | 4.07 | 7.1 | B | A |
| Example 562 | | 0.57 | | 8.14 | 14.3 | B | A |
| Example 563 | | 0.57 | | 12.21 | 21.4 | C | A |
| Example 564 | | 0.57 | | 16.29 | 28.6 | C | A |
| Example 565 | | 0.57 | | 0.08 | 0.1 | C | C |
| Example 566 | | 0.57 | | 0.24 | 0.4 | C | C |
| Example 567 | | 0.57 | | 0.41 | 0.7 | B | C |
| Example 568 | | 0.57 | | 0.81 | 1.4 | A | B |
| Example 569 | | 0.57 | | 1.22 | 2.1 | A | B |
| Example 570 | | 0.57 | | 1.47 | 2.6 | A | B |
| Example 571 | | 0.57 | | 1.63 | 2.9 | B | A |
| Example 572 | | 0.57 | | 2.04 | 3.6 | B | A |
| Example 573 | | 0.57 | | 4.07 | 7.1 | C | A |
| Example 574 | | 0.57 | | 8.14 | 14.3 | C | A |
| Example 575 | | 0.57 | | 12.21 | 21.4 | C | A |
| Example 576 | | 0.57 | | 16.29 | 28.6 | C | A |

TABLE 13

| | Making Conditions of Functional Structural Body | | | | | | |
|---|---|---|---|---|---|---|---|
| | Precursor Material (A) | | Addition to Precursor Material (A) | | Hydrothermal Treatment Conditions using Precursor Material (C) | | |
| | | | Presence or Absence of Additives | Conversion Ratio of Added Amount of Metal-containing Solution (Ratio of Number of Atoms) Si/M | Type of Structure Directing Agent | | |
| No. | Type | Pore Diameter (nm) | | | | pH | Time (h) |
| Example 577 | MCM-41 | 1.3 | Yes | 1000 | TEABr | 12 | 120 |
| Example 578 | | | | 500 | | | |
| Example 579 | | | | 200 | | | |
| Example 580 | | | | 100 | | | |
| Example 581 | | 2.0 | | | | | |
| Example 582 | | 2.4 | | | | | |
| Example 583 | | 2.6 | | | | | |
| Example 584 | | 3.3 | | | | | |
| Example 585 | | 6.6 | | | | | |
| Example 586 | SBA-1 | 13.2 | | | | | |
| Example 587 | | 19.8 | | | | | |
| Example 588 | | 26.4 | | | | | |
| Example 589 | MCM-41 | 1.3 | None | 1000 | | | |
| Example 590 | | | | 500 | | | |
| Example 591 | | | | 200 | | | |
| Example 592 | | | | 100 | | | |
| Example 593 | | 2.0 | | | | | |
| Example 594 | | 2.4 | | | | | |
| Example 595 | | 2.6 | | | | | |
| Example 596 | | 3.3 | | | | | |
| Example 597 | | 6.6 | | | | | |
| Example 598 | SBA-1 | 13.2 | | | | | |
| Example 599 | | 19.8 | | | | | |
| Example 600 | | 26.4 | | | | | |
| Example 601 | MCM-41 | 1.1 | Yes | 1000 | | 11 | 72 |
| Example 602 | | | | 500 | | | |
| Example 603 | | | | 200 | | | |
| Example 604 | | | | 100 | | | |
| Example 605 | | 1.6 | | | | | |
| Example 606 | | 2.0 | | | | | |
| Example 607 | | 2.2 | | | | | |
| Example 608 | | 2.7 | | | | | |
| Example 609 | | 5.4 | | | | | |
| Example 610 | SBA-1 | 10.9 | | | | | |
| Example 611 | | 16.3 | | | | | |
| Example 612 | | 21.8 | | | | | |
| Example 613 | MCM-41 | 1.1 | None | 1000 | | | |
| Example 614 | | | | 500 | | | |
| Example 615 | | | | 200 | | | |
| Example 616 | | | | 100 | | | |
| Example 617 | | 1.6 | | | | | |
| Example 618 | | 2.0 | | | | | |
| Example 619 | | 2.2 | | | | | |
| Example 620 | | 2.7 | | | | | |
| Example 621 | | 5.4 | | | | | |
| Example 622 | SBA-1 | 10.9 | | | | | |
| Example 623 | | 16.3 | | | | | |
| Example 624 | | 21.8 | | | | | |

TABLE 13-continued

| | Functional Structural Body | | | | | | |
|---|---|---|---|---|---|---|---|
| | Skeletal Body Zeolite-Type Compound | | Functional Substance Metal Oxide Nanoparticles | | | | |
| | | Average Inner Diameter of Channels | | Average particle | | Performance Evaluation | |
| No. | Framework | $D_F$ (nm) | Type | size $D_C$ (nm) | $D_C/D_F$ | Catalytic Activity | Durability |
| Example 577 | FAU | 0.74 | Fe | 0.11 | 0.1 | C | C |
| Example 578 | | 0.74 | | 0.32 | 0.4 | C | C |
| Example 579 | | 0.74 | | 0.53 | 0.7 | B | C |
| Example 580 | | 0.74 | | 1.06 | 1.4 | A | B |
| Example 581 | | 0.74 | | 1.59 | 2.1 | A | B |
| Example 582 | | 0.74 | | 1.90 | 2.6 | A | A |
| Example 583 | | 0.74 | | 2.11 | 2.9 | A | A |
| Example 584 | | 0.74 | | 2.64 | 3.6 | A | A |
| Example 585 | | 0.74 | | 5.29 | 7.1 | B | A |
| Example 586 | | 0.74 | | 10.57 | 14.3 | B | A |
| Example 587 | | 0.74 | | 15.86 | 21.4 | C | A |
| Example 588 | | 0.74 | | 21.14 | 28.6 | C | A |
| Example 589 | | 0.74 | | 0.11 | 0.1 | C | C |
| Example 590 | | 0.74 | | 0.32 | 0.4 | C | C |
| Example 591 | | 0.74 | | 0.53 | 0.7 | B | C |
| Example 592 | | 0.74 | | 1.06 | 1.4 | A | B |
| Example 593 | | 0.74 | | 1.59 | 2.1 | A | B |
| Example 594 | | 0.74 | | 1.90 | 2.6 | B | A |
| Example 595 | | 0.74 | | 2.11 | 2.9 | B | A |
| Example 596 | | 0.74 | | 2.64 | 3.6 | B | A |
| Example 597 | | 0.74 | | 5.29 | 7.1 | C | A |
| Example 598 | | 0.74 | | 10.57 | 14.3 | C | A |
| Example 599 | | 0.74 | | 15.86 | 21.4 | C | A |
| Example 600 | | 0.74 | | 21.14 | 28.6 | C | A |
| Example 601 | MTW | 0.61 | | 0.09 | 0.1 | C | C |
| Example 602 | | 0.61 | | 0.26 | 0.4 | C | C |
| Example 603 | | 0.61 | | 0.44 | 0.7 | B | C |
| Example 604 | | 0.61 | | 0.87 | 1.4 | A | B |
| Example 605 | | 0.61 | | 1.31 | 2.1 | A | B |
| Example 606 | | 0.61 | | 1.57 | 2.6 | A | B |
| Example 607 | | 0.61 | | 1.74 | 2.9 | A | A |
| Example 608 | | 0.61 | | 2.18 | 3.6 | A | A |
| Example 609 | | 0.61 | | 4.36 | 7.1 | B | A |
| Example 610 | | 0.61 | | 8.71 | 14.3 | B | A |
| Example 611 | | 0.61 | | 13.07 | 21.4 | C | A |
| Example 612 | | 0.61 | | 17.43 | 28.6 | C | A |
| Example 613 | | 0.61 | | 0.09 | 0.1 | C | C |
| Example 614 | | 0.61 | | 0.26 | 0.4 | C | C |
| Example 615 | | 0.61 | | 0.44 | 0.7 | B | C |
| Example 616 | | 0.61 | | 0.87 | 1.4 | A | B |
| Example 617 | | 0.61 | | 1.31 | 2.1 | A | B |
| Example 618 | | 0.61 | | 1.57 | 2.6 | A | B |
| Example 619 | | 0.61 | | 1.74 | 2.9 | B | A |
| Example 620 | | 0.61 | | 2.18 | 3.6 | B | A |
| Example 621 | | 0.61 | | 4.36 | 7.1 | C | A |
| Example 622 | | 0.61 | | 8.71 | 14.3 | C | A |
| Example 623 | | 0.61 | | 13.07 | 21.4 | C | A |
| Example 624 | | 0.61 | | 17.43 | 28.6 | C | A |

TABLE 14

| | Making Conditions of Functional Structural Body | | | | | | |
|---|---|---|---|---|---|---|---|
| | Precursor Material (A) | | Addition to Precursor Material (A) | | Hydrothermal Treatment Conditions using Precursor Material (C) | | |
| | | | Presence or Absence of Additives | Conversion Ratio of Added Amount of Metal-containing Solution (Ratio of Number of Atoms) Si/M | Type of Structural Directing Agent | | |
| No. | Type | Pore Diameter (nm) | | | | pH | Time (h) |
| Example 625 | MCM- | 1.0 | Yes | 1000 | TPABr | 12 | 72 |
| Example 626 | 41 | 1.0 | | 500 | | | |
| Example 627 | | 1.0 | | 200 | | | |
| Example 628 | | 1.0 | | 100 | | | |
| Example 629 | | 1.5 | | | | | |
| Example 630 | | 1.8 | | | | | |
| Example 631 | | 2.0 | | | | | |
| Example 632 | | 2.5 | | | | | |
| Example 633 | | 5.0 | | | | | |
| Example 634 | SBA-1 | 10.0 | | | | | |
| Example 635 | | 15.0 | | | | | |
| Example 636 | | 20.0 | | | | | |
| Example 637 | MCM- | 1.0 | None | 1000 | | | |
| Example 638 | 41 | 1.0 | | 500 | | | |
| Example 639 | | 1.0 | | 200 | | | |
| Example 640 | | 1.0 | | 100 | | | |
| Example 641 | | 1.5 | | | | | |
| Example 642 | | 1.8 | | | | | |
| Example 643 | | 2.0 | | | | | |
| Example 644 | | 2.5 | | | | | |
| Example 645 | | 5.0 | | | | | |
| Example 646 | SBA-1 | 10.0 | | | | | |
| Example 647 | | 15.0 | | | | | |
| Example 648 | | 20.0 | | | | | |
| Example 649 | MCM- | 1.0 | Yes | 1000 | TMABr | 12 | 120 |
| Example 650 | 41 | 1.0 | | 500 | | | |
| Example 651 | | 1.0 | | 200 | | | |
| Example 652 | | 1.0 | | 100 | | | |
| Example 653 | | 1.5 | | | | | |
| Example 654 | | 1.8 | | | | | |
| Example 655 | | 2.0 | | | | | |
| Example 656 | | 2.5 | | | | | |
| Example 657 | | 5.1 | | | | | |
| Example 658 | SBA-1 | 10.2 | | | | | |
| Example 659 | | 15.3 | | | | | |
| Example 660 | | 20.4 | | | | | |
| Example 661 | MCM- | 1.0 | None | 1000 | | | |
| Example 662 | 41 | 1.0 | | 500 | | | |
| Example 663 | | 1.0 | | 200 | | | |
| Example 664 | | 1.0 | | 100 | | | |
| Example 665 | | 1.5 | | | | | |
| Example 666 | | 1.8 | | | | | |
| Example 667 | | 2.0 | | | | | |
| Example 668 | | 2.5 | | | | | |
| Example 669 | | 5.1 | | | | | |
| Example 670 | SBA-1 | 10.2 | | | | | |
| Example 671 | | 15.3 | | | | | |
| Example 672 | | 20.4 | | | | | |

TABLE 14-continued

| | Functional Structural Body | | | | | | |
|---|---|---|---|---|---|---|---|
| | Skeletal Body Zeolite-Type Compound | | Functional Substance Metal Oxide Nanoparticles | | | | |
| | | Average Inner Diameter of Channels | | Average particle | | Performance Evaluation | |
| No. | Framework | $D_F$ (nm) | Type | size $D_C$ (nm) | $D_C/D_F$ | Catalytic Activity | Durability |
| Example 625 | MFI | 0.56 | Fe | 0.08 | 0.1 | C | C |
| Example 626 | | 0.56 | | 0.24 | 0.4 | C | C |
| Example 627 | | 0.56 | | 0.40 | 0.7 | B | C |
| Example 628 | | 0.56 | | 0.80 | 1.4 | A | B |
| Example 629 | | 0.56 | | 1.20 | 2.1 | A | B |
| Example 630 | | 0.56 | | 1.44 | 2.6 | A | A |
| Example 631 | | 0.56 | | 1.60 | 2.9 | A | A |
| Example 632 | | 0.56 | | 2.00 | 3.6 | A | A |
| Example 633 | | 0.56 | | 4.00 | 7.1 | B | A |
| Example 634 | | 0.56 | | 8.00 | 14.3 | B | A |
| Example 635 | | 0.56 | | 12.00 | 21.4 | C | A |
| Example 636 | | 0.56 | | 16.00 | 28.6 | C | A |
| Example 637 | | 0.56 | | 0.08 | 0.1 | C | C |
| Example 638 | | 0.56 | | 0.24 | 0.4 | C | C |
| Example 639 | | 0.56 | | 0.40 | 0.7 | B | C |
| Example 640 | | 0.56 | | 0.80 | 1.4 | A | B |
| Example 641 | | 0.56 | | 1.20 | 2.1 | A | B |
| Example 642 | | 0.56 | | 1.44 | 2.6 | B | A |
| Example 643 | | 0.56 | | 1.60 | 2.9 | B | A |
| Example 644 | | 0.56 | | 2.00 | 3.6 | B | A |
| Example 645 | | 0.56 | | 4.00 | 7.1 | C | A |
| Example 646 | | 0.56 | | 8.00 | 14.3 | C | A |
| Example 647 | | 0.56 | | 12.00 | 21.4 | C | A |
| Example 648 | | 0.56 | | 16.00 | 28.6 | C | A |
| Example 649 | FER | 0.57 | | 0.08 | 0.1 | C | C |
| Example 650 | | 0.57 | | 0.24 | 0.4 | C | C |
| Example 651 | | 0.57 | | 0.41 | 0.7 | B | C |
| Example 652 | | 0.57 | | 0.81 | 1.4 | A | B |
| Example 653 | | 0.57 | | 1.22 | 2.1 | A | B |
| Example 654 | | 0.57 | | 1.47 | 2.6 | A | B |
| Example 655 | | 0.57 | | 1.63 | 2.9 | A | A |
| Example 656 | | 0.57 | | 2.04 | 3.6 | A | A |
| Example 657 | | 0.57 | | 4.07 | 7.1 | B | A |
| Example 658 | | 0.57 | | 8.14 | 14.3 | B | A |
| Example 659 | | 0.57 | | 12.21 | 21.4 | C | A |
| Example 660 | | 0.57 | | 16.29 | 28.6 | C | A |
| Example 661 | | 0.57 | | 0.08 | 0.1 | C | C |
| Example 662 | | 0.57 | | 0.24 | 0.4 | C | C |
| Example 663 | | 0.57 | | 0.41 | 0.7 | B | C |
| Example 664 | | 0.57 | | 0.81 | 1.4 | A | B |
| Example 665 | | 0.57 | | 1.22 | 2.1 | A | B |
| Example 666 | | 0.57 | | 1.47 | 2.6 | A | B |
| Example 667 | | 0.57 | | 1.63 | 2.9 | B | A |
| Example 668 | | 0.57 | | 2.04 | 3.6 | B | A |
| Example 669 | | 0.57 | | 4.07 | 7.1 | C | A |
| Example 670 | | 0.57 | | 8.14 | 14.3 | C | A |
| Example 671 | | 0.57 | | 12.21 | 21.4 | C | A |
| Example 672 | | 0.57 | | 16.29 | 28.6 | C | A |

TABLE 15

| | Making Conditions of Functional Structural Body | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio of Added Amount of Metal-containing Solution (Ratio of Number of Atoms) Si/M | Type of Structural Directing Agent | pH | Time (h) |
| Example 673 | MCM-41 | 1.3 | Yes | 1000 | TEABr | 12 | 120 |
| Example 674 | | | | 500 | | | |
| Example 675 | | | | 200 | | | |
| Example 676 | | | | 100 | | | |
| Example 677 | | 2.0 | | | | | |
| Example 678 | | 2.4 | | | | | |
| Example 679 | | 2.6 | | | | | |
| Example 680 | | 3.3 | | | | | |
| Example 681 | | 6.6 | | | | | |
| Example 682 | SBA-1 | 13.2 | | | | | |
| Example 683 | | 19.8 | | | | | |
| Example 684 | | 26.4 | | | | | |
| Example 685 | MCM-41 | 1.3 | None | 1000 | | | |
| Example 686 | | | | 500 | | | |
| Example 687 | | | | 200 | | | |
| Example 688 | | | | 100 | | | |
| Example 689 | | 2.0 | | | | | |
| Example 690 | | 2.4 | | | | | |
| Example 691 | | 2.6 | | | | | |
| Example 692 | | 3.3 | | | | | |
| Example 693 | | 6.6 | | | | | |
| Example 694 | SBA-1 | 13.2 | | | | | |
| Example 695 | | 19.8 | | | | | |
| Example 696 | | 26.4 | | | | | |
| Example 697 | MCM-41 | 1.1 | Yes | 1000 | | 11 | 72 |
| Example 698 | | | | 500 | | | |
| Example 699 | | | | 200 | | | |
| Example 700 | | | | 100 | | | |
| Example 701 | | 1.6 | | | | | |
| Example 702 | | 2.0 | | | | | |
| Example 703 | | 2.2 | | | | | |
| Example 704 | | 2.7 | | | | | |
| Example 705 | | 5.4 | | | | | |
| Example 706 | SBA-1 | 10.9 | | | | | |
| Example 707 | | 16.3 | | | | | |
| Example 708 | | 21.8 | | | | | |
| Example 709 | MCM-41 | 1.1 | None | 1000 | | | |
| Example 710 | | | | 500 | | | |
| Example 711 | | | | 200 | | | |
| Example 712 | | | | 100 | | | |
| Example 713 | | 1.6 | | | | | |
| Example 714 | | 2.0 | | | | | |
| Example 715 | | 2.2 | | | | | |
| Example 716 | | 2.7 | | | | | |
| Example 717 | | 5.4 | | | | | |
| Example 718 | SBA-1 | 10.9 | | | | | |
| Example 719 | | 16.3 | | | | | |
| Example 720 | | 21.8 | | | | | |

TABLE 15-continued

| | Functional Structural Body | | | | | |
|---|---|---|---|---|---|---|
| | Skeletal Body Zeolite-Type Compound | | Functional Substance Metal Oxide Nanoparticles | | | |
| | Average Inner Diameter of Channels | | Average particle | | Performance Evaluation | |
| No. | Framework | $D_F$ (nm) | Type | size $D_C$ (nm) | $D_C/D_F$ | Catalytic Activity | Durability |
|---|---|---|---|---|---|---|---|
| Example 673 | FAU | 0.74 | Cu | 0.11 | 0.1 | C | C |
| Example 674 | | 0.74 | | 0.32 | 0.4 | C | C |
| Example 675 | | 0.74 | | 0.53 | 0.7 | B | C |
| Example 676 | | 0.74 | | 1.06 | 1.4 | A | B |
| Example 677 | | 0.74 | | 1.59 | 2.1 | A | B |
| Example 678 | | 0.74 | | 1.90 | 2.6 | A | A |
| Example 679 | | 0.74 | | 2.11 | 2.9 | A | A |
| Example 680 | | 0.74 | | 2.64 | 3.6 | A | A |
| Example 681 | | 0.74 | | 5.29 | 7.1 | B | A |
| Example 682 | | 0.74 | | 10.57 | 14.3 | B | A |
| Example 683 | | 0.74 | | 15.86 | 21.4 | C | A |
| Example 684 | | 0.74 | | 21.14 | 28.6 | C | A |
| Example 685 | | 0.74 | | 0.11 | 0.1 | C | C |
| Example 686 | | 0.74 | | 0.32 | 0.4 | C | C |
| Example 687 | | 0.74 | | 0.53 | 0.7 | B | C |
| Example 688 | | 0.74 | | 1.06 | 1.4 | A | B |
| Example 689 | | 0.74 | | 1.59 | 2.1 | A | B |
| Example 690 | | 0.74 | | 1.90 | 2.6 | B | A |
| Example 691 | | 0.74 | | 2.11 | 2.9 | B | A |
| Example 692 | | 0.74 | | 2.64 | 3.6 | B | A |
| Example 693 | | 0.74 | | 5.29 | 7.1 | C | A |
| Example 694 | | 0.74 | | 10.57 | 14.3 | C | A |
| Example 695 | | 0.74 | | 15.86 | 21.4 | C | A |
| Example 696 | | 0.74 | | 21.14 | 28.6 | C | A |
| Example 697 | MTW | 0.61 | | 0.09 | 0.1 | C | C |
| Example 698 | | 0.61 | | 0.26 | 0.4 | C | C |
| Example 699 | | 0.61 | | 0.44 | 0.7 | B | C |
| Example 700 | | 0.61 | | 0.87 | 1.4 | A | B |
| Example 701 | | 0.61 | | 1.31 | 2.1 | A | B |
| Example 702 | | 0.61 | | 1.57 | 2.6 | A | B |
| Example 703 | | 0.61 | | 1.74 | 2.9 | A | A |
| Example 704 | | 0.61 | | 2.18 | 3.6 | A | A |
| Example 705 | | 0.61 | | 4.36 | 7.1 | B | A |
| Example 706 | | 0.61 | | 8.71 | 14.3 | B | A |
| Example 707 | | 0.61 | | 13.07 | 21.4 | C | A |
| Example 708 | | 0.61 | | 17.43 | 28.6 | C | A |
| Example 709 | | 0.61 | | 0.09 | 0.1 | C | C |
| Example 710 | | 0.61 | | 0.26 | 0.4 | C | C |
| Example 711 | | 0.61 | | 0.44 | 0.7 | B | C |
| Example 712 | | 0.61 | | 0.87 | 1.4 | A | B |
| Example 713 | | 0.61 | | 1.31 | 2.1 | A | B |
| Example 714 | | 0.61 | | 1.57 | 2.6 | A | B |
| Example 715 | | 0.61 | | 1.74 | 2.9 | B | A |
| Example 716 | | 0.61 | | 2.18 | 3.6 | B | A |
| Example 717 | | 0.61 | | 4.36 | 7.1 | C | A |
| Example 718 | | 0.61 | | 8.71 | 14.3 | C | A |
| Example 719 | | 0.61 | | 13.07 | 21.4 | C | A |
| Example 720 | | 0.61 | | 17.43 | 28.6 | C | A |

TABLE 16

| | Making Conditions of Functional Structural Body | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio of Added Amount of Metal-containing Solution (Ratio of Number of Atoms) Si/M | Type of Structural Directing Agent | pH | Time (h) |
| Example 721 | MCM-41 | 1.0 | Yes | 1000 | TPABr | 12 | 72 |
| Example 722 | | 1.0 | | 500 | | | |
| Example 723 | | 1.0 | | 200 | | | |
| Example 724 | | 1.0 | | 100 | | | |
| Example 725 | | 1.5 | | | | | |
| Example 726 | | 1.8 | | | | | |
| Example 727 | | 2.0 | | | | | |
| Example 728 | | 2.5 | | | | | |
| Example 729 | | 5.0 | | | | | |
| Example 730 | SBA-1 | 10.0 | | | | | |
| Example 731 | | 15.0 | | | | | |
| Example 732 | | 20.0 | | | | | |
| Example 733 | MCM-41 | 1.0 | None | 1000 | | | |
| Example 734 | | 1.0 | | 500 | | | |
| Example 735 | | 1.0 | | 200 | | | |
| Example 736 | | 1.0 | | 100 | | | |
| Example 737 | | 1.5 | | | | | |
| Example 738 | | 1.8 | | | | | |
| Example 739 | | 2.0 | | | | | |
| Example 740 | | 2.5 | | | | | |
| Example 741 | | 5.0 | | | | | |
| Example 742 | SBA-1 | 10.0 | | | | | |
| Example 743 | | 15.0 | | | | | |
| Example 744 | | 20.0 | | | | | |
| Example 745 | MCM-41 | 1.0 | Yes | 1000 | TMABr | 12 | 120 |
| Example 746 | | 1.0 | | 500 | | | |
| Example 747 | | 1.0 | | 200 | | | |
| Example 748 | | 1.0 | | 100 | | | |
| Example 749 | | 1.5 | | | | | |
| Example 750 | | 1.8 | | | | | |
| Example 751 | | 2.0 | | | | | |
| Example 752 | | 2.5 | | | | | |
| Example 753 | | 5.1 | | | | | |
| Example 754 | SBA-1 | 10.2 | | | | | |
| Example 755 | | 15.3 | | | | | |
| Example 756 | | 20.4 | | | | | |
| Example 757 | MCM-41 | 1.0 | None | 1000 | | | |
| Example 758 | | 1.0 | | 500 | | | |
| Example 759 | | 1.0 | | 200 | | | |
| Example 760 | | 1.0 | | 100 | | | |
| Example 761 | | 1.5 | | | | | |
| Example 762 | | 1.8 | | | | | |
| Example 763 | | 2.0 | | | | | |
| Example 764 | | 2.5 | | | | | |
| Example 765 | | 5.1 | | | | | |
| Example 766 | SBA-1 | 10.2 | | | | | |
| Example 767 | | 15.3 | | | | | |
| Example 768 | | 20.4 | | | | | |

TABLE 16-continued

Functional Structural Body

| | Skeletal Body Zeolite-Type Compound | | Functional Substance Metal Oxide Nanoparticles | | | Performance Evaluation | |
|---|---|---|---|---|---|---|---|
| | | Average Inner Diameter of Channels | | Average particle | | | |
| No. | Framework | $D_F$ (nm) | Type | size $D_C$ (nm) | $D_C/D_F$ | Catalytic Activity | Durability |
| Example 721 | MFI | 0.56 | Cu | 0.08 | 0.1 | C | C |
| Example 722 | | 0.56 | | 0.24 | 0.4 | C | C |
| Example 723 | | 0.56 | | 0.40 | 0.7 | B | C |
| Example 724 | | 0.56 | | 0.80 | 1.4 | A | B |
| Example 725 | | 0.56 | | 1.20 | 2.1 | A | B |
| Example 726 | | 0.56 | | 1.44 | 2.6 | A | A |
| Example 727 | | 0.56 | | 1.60 | 2.9 | A | A |
| Example 728 | | 0.56 | | 2.00 | 3.6 | A | A |
| Example 729 | | 0.56 | | 4.00 | 7.1 | B | A |
| Example 730 | | 0.56 | | 8.00 | 14.3 | B | A |
| Example 731 | | 0.56 | | 12.00 | 21.4 | C | A |
| Example 732 | | 0.56 | | 16.00 | 28.6 | C | A |
| Example 733 | | 0.56 | | 0.08 | 0.1 | C | C |
| Example 734 | | 0.56 | | 0.24 | 0.4 | C | C |
| Example 735 | | 0.56 | | 0.40 | 0.7 | B | C |
| Example 736 | | 0.56 | | 0.80 | 1.4 | A | B |
| Example 737 | | 0.56 | | 1.20 | 2.1 | A | B |
| Example 738 | | 0.56 | | 1.44 | 2.6 | B | A |
| Example 739 | | 0.56 | | 1.60 | 2.9 | B | A |
| Example 740 | | 0.56 | | 2.00 | 3.6 | B | A |
| Example 741 | | 0.56 | | 4.00 | 7.1 | C | A |
| Example 742 | | 0.56 | | 8.00 | 14.3 | C | A |
| Example 743 | | 0.56 | | 12.00 | 21.4 | C | A |
| Example 744 | | 0.56 | | 16.00 | 28.6 | C | A |
| Example 745 | FER | 0.57 | | 0.08 | 0.1 | C | C |
| Example 746 | | 0.57 | | 0.24 | 0.4 | C | C |
| Example 747 | | 0.57 | | 0.41 | 0.7 | B | C |
| Example 748 | | 0.57 | | 0.81 | 1.4 | A | B |
| Example 749 | | 0.57 | | 1.22 | 2.1 | A | B |
| Example 750 | | 0.57 | | 1.47 | 2.6 | A | B |
| Example 751 | | 0.57 | | 1.63 | 2.9 | A | A |
| Example 752 | | 0.57 | | 2.04 | 3.6 | A | A |
| Example 753 | | 0.57 | | 4.07 | 7.1 | B | A |
| Example 754 | | 0.57 | | 8.14 | 14.3 | B | A |
| Example 755 | | 0.57 | | 12.21 | 21.4 | C | A |
| Example 756 | | 0.57 | | 16.29 | 28.6 | C | A |
| Example 757 | | 0.57 | | 0.08 | 0.1 | C | C |
| Example 758 | | 0.57 | | 0.24 | 0.4 | C | C |
| Example 759 | | 0.57 | | 0.41 | 0.7 | B | C |
| Example 760 | | 0.57 | | 0.81 | 1.4 | A | B |
| Example 761 | | 0.57 | | 1.22 | 2.1 | A | B |
| Example 762 | | 0.57 | | 1.47 | 2.6 | A | B |
| Example 763 | | 0.57 | | 1.63 | 2.9 | B | A |
| Example 764 | | 0.57 | | 2.04 | 3.6 | B | A |
| Example 765 | | 0.57 | | 4.07 | 7.1 | C | A |
| Example 766 | | 0.57 | | 8.14 | 14.3 | C | A |
| Example 767 | | 0.57 | | 12.21 | 21.4 | C | A |
| Example 768 | | 0.57 | | 16.29 | 28.6 | C | A |

As can be seen from Tables 1 to 16, the functional structural body (Examples 1 to 768), which was confirmed by cross sectional observation to hold the functional substance inside the skeletal body was found to exhibit excellent catalytic activity in the decomposition reaction of butyl benzene and excellent durability as a catalyst compared to the functional structural body in which the functional substance is simply adhered to the outer surface of the skeletal body (Comparative Example 1) or the skeletal body without any functional substances (Comparative Example 2).

In addition, the relationship between the amount of metal (mass %) embedded in the skeletal body of the functional structural body measured in the evaluation [C], and the yield (mol %) of a compound having a molecular weight smaller than that of butyl benzene contained in the production liquid was evaluated. The evaluation method was the same as the evaluation method performed in "(1) catalytic activity" in the [D] "performance evaluation" described above.

As a result, in each example, when the value obtained by converting the added amount of the metal-containing solution added to the precursor material (A) to the ratio of number of atoms Si/M (M=Fe) is from 50 to 200 (content of the metal element (M) of the metal oxide nanoparticies relative to the functional structural body is 0.5 to 2.5 mass %), the yield of the compound having a molecular weight lower than that of butyl benzene contained in the product liquid was 32 mol % or greater, and the catalytic activity in the decomposition reaction of butylbenzene was found to be greater than or equal to the pass level.

On the other hand, although the silicalite of Comparative Example 1 in which the functional substance was attached only to the outer surface of the skeletal body, the catalytic activity in the decomposition reaction of butyl benzene was improved compared to the skeletal body of Comparative Example 2, which did not have any functional substances, but exhibited inferior durability as a catalyst compared to the functional structural body of Examples 1 to 768.

In addition, the skeletal body of Comparative Example 2, which did not have any functional substances, exhibited little catalytic activity in the decomposition reaction of butylbenzene, and both the catalytic activity and the durability were inferior compared to the functional structural body of Examples 1 to 768.

REFERENCE SIGNS LIST

1 Functional structural body
10 Skeletal body
10a Outer surface
11 Channel
11a Pore
12 Enlarged pore portion
20 Functional substance
30 Functional substance
$D_C$ Average particle size
$D_F$ Average inner diameter
$D_E$ Inner diameter

What is claimed is:

1. A functional structural body, comprising;
a skeletal body of a porous structure composed of a zeolite-type compound; and
at least one functional substance present in the skeletal body,
wherein the skeletal body has channels connecting with each other, and
the functional substance is present at least in the channels of the skeletal body,
wherein the channels have any one of a one-dimensional pore, a two-dimensional pore, and a three-dimensional pore defined by the framework of the zeolite-type compound and an enlarged pore portion which has a diameter greater than that of any of the one-dimensional pore, the two-dimensional pore, and the three-dimensional pore and is not defined by the framework of the zeolite-type compound, and the enlarged pore portion is greater than or equal to a diameter of the functional substance,
wherein the functional substance is present at least in the enlarged pore portion, the functional substance is metal oxide nanoparticles,
wherein a particle size of the metal oxide nanoparticles is greater than an inner diameter of any one of the one-dimensional pore, the two-dimensional pore, and the three-dimensional pore defined by the framework of the zeolite-type compound,
wherein the framework of the zeolite-type compound is selected from EAU type, MTW type, MFI type, FER type, LTA type, MWW type, MOR type, LTL type, and BEA type,
the metal oxide nanoparticles are selected from cobalt oxide, nickel oxide, iron oxide, copper oxide, zirconium oxide, cerium oxide, aluminum oxide, niobium oxide, titanium oxide, bismuth oxide, molybdenum oxide, vanadium oxide, and chromium oxide.

2. The functional structural body according to claim 1, wherein the enlarged pore portion causes a plurality of pores that constitute any one of the one-dimensional pore, the two-dimensional pore, and the three-dimensional pore to connect with each other.

3. The functional structural body according to claim 1, wherein
the skeletal body is a support that supports at least one metal oxide nanoparticle of the metal oxide nanoparticles.

4. The functional structural body according to claim 1, wherein an average particle diameter of the metal oxide nanoparticles is greater than an average inner diameter of the channels.

5. The functional structural body according to claim 1, wherein a metal element (M) of the metal oxide nanoparticles is contained in an amount from 0.5 mass % to 2.5 mass % based on the functional structural body.

6. The functional structural body according to claim 1, wherein an average particle size of the metal oxide nanoparticles is from 0.1 nm to 50 nm.

7. The functional structural body according to claim 1, wherein an average particle size of the metal oxide nanoparticles is from 0.5 nm to 14.0 nm.

8. The functional structural body according to claim 1, wherein a ratio of an average particle size of the metal oxide nanoparticles to an average inner diameter of the channels is from 0.06 to 500.

9. The functional structural body according to claim 8, wherein the ratio of the average particle size of the metal oxide nanoparticles to the average inner diameter of the channels is from 0.1 to 36.

10. The functional structural body according to claim 9, wherein the ratio of the average particle size of the metal oxide nanoparticles to the average inner diameter of the channels is from 1.7 to 4.5.

11. The functional structural body according to claim 4, wherein the average inner diameter of the channels is from 0.1 nm to 1.5 nm, and an inner diameter of the enlarged pore portion is from 0.5 nm to 50 nm.

12. The functional structural body according to claim 3, further comprising at least one other metal oxide nanoparticle held on an outer surface of the skeletal body, wherein the at least one other metal oxide nanoparticle is different than the at least one metal oxide nanoparticle.

13. The functional structural body according to claim 12, wherein a content of the at least one metal oxide nanoparticle present in the skeletal body is greater than that of the at least one other metal oxide nanoparticle held on the outer surface of the skeletal body.

14. The functional structural body according to claim 1, wherein the zeolite-type compound is a silicate compound.

15. The functional structural body of claim 1, wherein the inner diameter of any one of the one-dimensional pore, the two-dimensional pore, and the three-dimensional pore is less than 1 nm in diameter.

* * * * *